United States Patent
Messina et al.

(10) Patent No.: US 12,304,333 B2
(45) Date of Patent: May 20, 2025

(54) WIRELESS CHARGING SYSTEM

(71) Applicant: Oshkosh Corporation, Oshkosh, WI (US)

(72) Inventors: Robert Messina, Oshkosh, WI (US); Shashank Bhatia, Oshkosh, WI (US); Ignacy Puszkiewicz, Hagerstown, MD (US); Mike Buhidar, Oshkosh, WI (US); David Lombardo, Oshkosh, WI (US); Peter Gilbert, Oshkosh, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 192 days.

(21) Appl. No.: 18/158,253

(22) Filed: Jan. 23, 2023

(65) Prior Publication Data

US 2023/0234456 A1 Jul. 27, 2023

Related U.S. Application Data

(60) Provisional application No. 63/302,383, filed on Jan. 24, 2022, provisional application No. 63/302,174, (Continued)

(51) Int. Cl.
*B60L 53/12* (2019.01)
*B60L 50/60* (2019.01)
(Continued)

(52) U.S. Cl.
CPC ............... *B60L 53/12* (2019.02); *B60L 50/60* (2019.02); *B60L 58/12* (2019.02); *H01M 10/46* (2013.01);
(Continued)

(58) Field of Classification Search
CPC ....................................................... B60L 53/12
(Continued)

(56) References Cited

U.S. PATENT DOCUMENTS 8,920,082 B2 * 12/2014 Bryant ..................... B60P 3/07
410/4
2015/0033962 A1 2/2015 Schwartz et al.
(Continued)

FOREIGN PATENT DOCUMENTS

| DE | 10 2018 207 768 A1 | 11/2019 |
|---|---|---|
| DE | 10 2019 206 478 A1 | 11/2020 |
| EP | 2 572 922 A1 | 3/2013 |

OTHER PUBLICATIONS

Invitation to Pay Additional Fees issued in connection with PCT Appl. Ser. No. PCT/US2023/061113 dated Apr. 21, 2023.
(Continued)

*Primary Examiner* — Edward Tso
*Assistant Examiner* — Ahmed H Omar
(74) *Attorney, Agent, or Firm* — FOLEY & LARDNER LLP

(57) ABSTRACT

A wireless charging system includes a platform having a substantially horizontal upper surface configured to support a vehicle and an induction coil coupled to the platform. The induction coil is configured to receive electrical energy from an energy source and generate a magnetic field above the upper surface, the magnetic field being positioned to wirelessly transfer the electrical energy to the vehicle while the vehicle is positioned atop the platform.

16 Claims, 41 Drawing Sheets

Related U.S. Application Data filed on Jan. 24, 2022, provisional application No. 63/302,411, filed on Jan. 24, 2022, provisional application No. 63/302,465, filed on Jan. 24, 2022, provisional application No. 63/302,221, filed on Jan. 24, 2022, provisional application No. 63/302,420, filed on Jan. 24, 2022, provisional application No. 63/302,376, filed on Jan. 24, 2022, provisional application No. 63/302,170, filed on Jan. 24, 2022, provisional application No. 63/302,478, filed on Jan. 24, 2022, provisional application No. 63/302,401, filed on Jan. 24, 2022, provisional application No. 63/302,234, filed on Jan. 24, 2022, provisional application No. 63/302,396, filed on Jan. 24, 2022.

(51) Int. Cl.
| | | |
|---|---|---|
| *B60L 58/12* | (2019.01) | |
| *H01M 10/46* | (2006.01) | |
| *H02J 7/00* | (2006.01) | |
| *H02J 50/00* | (2016.01) | |
| *H02J 50/10* | (2016.01) | |
| *H02J 50/90* | (2016.01) | |

(52) U.S. Cl.
CPC .......... *H02J 7/0048* (2020.01); *H02J 50/005* (2020.01); *H02J 50/10* (2016.02); *H02J 50/90* (2016.02); *B60L 2210/30* (2013.01); *H01M 2220/20* (2013.01); *H02J 2207/20* (2020.01)

(58) Field of Classification Search
USPC .......................................................... 320/108
See application file for complete search history.

(56) References Cited

U.S. PATENT DOCUMENTS

| | | | |
|---|---|---|---|
| 2015/0159564 A1 | 6/2015 | Wildgrube et al. | |
| 2015/0175353 A1 | 6/2015 | Gillmore et al. | |
| 2017/0043668 A1* | 2/2017 | Chiyo | B60L 53/122 |
| 2017/0253221 A1 | 9/2017 | Verhoff et al. | |
| 2017/0291802 A1 | 10/2017 | Hao et al. | |
| 2017/0291805 A1 | 10/2017 | Hao et al. | |
| 2017/0297425 A1 | 10/2017 | Wildgrube et al. | |
| 2018/0041053 A1* | 2/2018 | Capizzo | A63H 30/04 |
| 2018/0162704 A1 | 6/2018 | Hao et al. | |
| 2019/0071291 A1 | 3/2019 | Puszkiewicz et al. | |
| 2019/0119088 A1 | 4/2019 | Puszkiewicz et al. | |
| 2019/0121353 A1 | 4/2019 | Datema et al. | |
| 2019/0185077 A1 | 6/2019 | Smith et al. | |
| 2019/0185301 A1 | 6/2019 | Hao et al. | |
| 2019/0322321 A1 | 10/2019 | Schwartz et al. | |
| 2019/0322512 A1 | 10/2019 | Puszkiewicz et al. | |
| 2019/0351883 A1 | 11/2019 | Verhoff et al. | |
| 2019/0352157 A1 | 11/2019 | Hao et al. | |
| 2020/0031641 A1 | 1/2020 | Puszkiewicz et al. | |
| 2020/0094671 A1 | 3/2020 | Wildgrube et al. | |
| 2020/0140248 A1 | 5/2020 | Hackenberg et al. | |
| 2020/0316816 A1 | 10/2020 | Messina et al. | |
| 2020/0317065 A1 | 10/2020 | Lombardo | |
| 2020/0317083 A1 | 10/2020 | Messina et al. | |
| 2020/0317480 A1 | 10/2020 | Shankar et al. | |
| 2020/0317486 A1 | 10/2020 | Puszkiewicz et al. | |
| 2020/0317488 A1 | 10/2020 | Bafile et al. | |
| 2020/0317489 A1 | 10/2020 | Bhatia et al. | |
| 2020/0317491 A1 | 10/2020 | Bafile et al. | |
| 2020/0317492 A1 | 10/2020 | Bhatia et al. | |
| 2020/0317493 A1 | 10/2020 | Lombardo et al. | |
| 2020/0324307 A1* | 10/2020 | Stewart | B05B 12/004 |
| 2020/0346547 A1 | 11/2020 | Rocholl et al. | |
| 2021/0002112 A1 | 1/2021 | Puszkiewicz et al. | |
| 2021/0031611 A1 | 2/2021 | Yakes et al. | |
| 2021/0031612 A1 | 2/2021 | Yakes et al. | |
| 2021/0031649 A1 | 2/2021 | Messina et al. | |
| 2021/0039935 A1 | 2/2021 | Hackenberg et al. | |
| 2021/0124347 A1 | 4/2021 | Datema et al. | |
| 2021/0155463 A1 | 5/2021 | Hao et al. | |
| 2021/0188105 A1 | 6/2021 | Wheatley | |
| 2021/0221216 A1 | 7/2021 | Yakes et al. | |
| 2021/0229755 A1 | 7/2021 | Schwartz et al. | |
| 2021/0252969 A1 | 8/2021 | Wildgrube et al. | |
| 2021/0276423 A1 | 9/2021 | Lombardo et al. | |
| 2021/0276848 A1 | 9/2021 | Miller et al. | |
| 2021/0276850 A1 | 9/2021 | Lombardo et al. | |
| 2021/0279991 A1 | 9/2021 | Shankar et al. | |
| 2021/0323763 A1 | 10/2021 | Koga et al. | |
| 2021/0323764 A1 | 10/2021 | Koga et al. | |
| 2021/0323765 A1 | 10/2021 | Koga et al. | |
| 2021/0325529 A1 | 10/2021 | Koga et al. | |
| 2021/0325911 A1 | 10/2021 | Koga et al. | |
| 2021/0327164 A1 | 10/2021 | Koga et al. | |
| 2021/0345062 A1 | 11/2021 | Koga et al. | |
| 2021/0362696 A1 | 11/2021 | Verhoff et al. | |
| 2021/0362697 A1 | 11/2021 | Verhoff et al. | |
| 2021/0370893 A1 | 12/2021 | Verhoff et al. | |
| 2021/0370894 A1 | 12/2021 | Verhoff et al. | |
| 2021/0373560 A1 | 12/2021 | Koga et al. | |
| 2021/0380085 A1 | 12/2021 | Verhoff et al. | |
| 2021/0380179 A1 | 12/2021 | Smith et al. | |
| 2021/0395058 A1 | 12/2021 | Hao et al. | |
| 2022/0009338 A1 | 1/2022 | Yakes et al. | |
| 2022/0033181 A1 | 2/2022 | Koga et al. | |
| 2022/0097527 A1 | 3/2022 | Koga et al. | |
| 2022/0097961 A1 | 3/2022 | Koga et al. | |
| 2022/0097964 A1 | 3/2022 | Koga et al. | |
| 2022/0135385 A1 | 5/2022 | Lombardo et al. | |
| 2022/0144226 A1 | 5/2022 | Verhoff et al. | |
| 2022/0144227 A1 | 5/2022 | Verhoff et al. | |
| 2022/0176921 A1 | 6/2022 | Verhoff et al. | |
| 2022/0185582 A1 | 6/2022 | Koga et al. | |
| 2022/0185643 A1 | 6/2022 | Messina et al. | |
| 2022/0194333 A1 | 6/2022 | Verhoff et al. | |
| 2022/0194334 A1 | 6/2022 | Verhoff et al. | |
| 2022/0234554 A1 | 7/2022 | Verhoff et al. | |
| 2022/0234555 A1 | 7/2022 | Verhoff et al. | |
| 2022/0234873 A1 | 7/2022 | Miller et al. | |
| 2022/0289152 A1 | 9/2022 | Verhoff et al. | |
| 2022/0332556 A1 | 10/2022 | Kobel et al. | |
| 2022/0348090 A1 | 11/2022 | Lombardo | |
| 2022/0371864 A1 | 11/2022 | Shankar et al. | |
| 2023/0002152 A1 | 1/2023 | Koga et al. | |
| 2023/0049763 A1 | 2/2023 | Messina et al. | |
| 2023/0089417 A1 | 3/2023 | Koga et al. | |
| 2023/0092520 A1 | 3/2023 | Verhoff et al. | |

OTHER PUBLICATIONS

International Search Report and Written Opinion re: Int'l Application No. PCT/US2023/061113, mail date Jun. 13, 2023, 30 pps.

\* cited by examiner

WIRELESS CHARGING SYSTEM

CROSS-REFERENCE TO RELATED PATENT APPLICATIONS

This application claims the benefit of and priority to (a) U.S. Provisional Application No. 63/302,174, filed on Jan. 24, 2022, (b) U.S. Provisional Application No. 63/302,376, filed on Jan. 24, 2022, (c) U.S. Provisional Application No. 63/302,383, filed on Jan. 24, 2022, (d) U.S. Provisional Application No. 63/302,411, filed on Jan. 24, 2022, (e) U.S. Provisional Application No. 63/302,478, filed on Jan. 24, 2022, (f) U.S. Provisional Application No. 63/302,170, filed on Jan. 24, 2022, (g) U.S. Provisional Application No. 63/302,396, filed on Jan. 24, 2022, (h) U.S. Provisional Application No. 63/302,401, filed on Jan. 24, 2022, (i) U.S. Provisional Application No. 63/302,420, filed on Jan. 24, 2022, (j) U.S. Provisional Application No. 63/302,221, filed on Jan. 24, 2022, (k) U.S. Provisional Application No. 63/302,234, filed on Jan. 24, 2022, (l) U.S. Provisional Application No. 63/302,465, filed on Jan. 24, 2022, the entire disclosures of which are hereby incorporated by reference herein.

BACKGROUND

Aerial work platforms (AWPs) and mobile elevating work platforms (MEWPs) are increasingly transitioning to semi-electric or all electric configurations. To support the increasing electrification of these AWPs and MEWPs, the vehicles are equipped with one or more charge storing devices, such as batteries. Because the capacity of charge storing devices is limited, recharging is frequently needed.

SUMMARY

At least one embodiment relates to a wireless charging system including a platform having a substantially horizontal upper surface configured to support a vehicle and an induction coil coupled to the platform. The induction coil is configured to receive electrical energy from an energy source and generate a magnetic field above the upper surface, the magnetic field being positioned to wirelessly transfer the electrical energy to the vehicle while the vehicle is positioned atop the platform.

Another embodiment relates to a vehicle including a chassis, a tractive element coupled to the chassis, a battery pack, and a wireless charging interface configured to supply electrical energy to charge the battery pack. The wireless charging interface is removably coupled to the chassis and selectively repositionable relative to the chassis from a first position to a second position.

Another embodiment relates to a wireless charging system including an energy source, a lift device, a wireless charging unit, and a display. The energy source includes at least one of (a) a battery, (b) a utility source, or (c) a generator. The lift device includes a chassis, a tractive element coupled to the chassis, a battery pack coupled to the chassis, an actuator coupled to the chassis and operatively coupled to the battery pack, and a first wireless charging interface operatively coupled to the battery pack. The wireless charging unit includes a platform having a substantially horizontal upper surface, a first ramp and a second ramp pivotally coupled to the platform, an electrical cabinet pivotally coupled to the platform and containing at least one of (a) the energy source, (b) a connection to the energy source, (c) an inverter, or (d) a transformer, a lifting lug coupled to the electrical cabinet, a first guide rail and a second guide rail coupled to the platform, extending longitudinally along the upper surface, and laterally offset from one another, a second wireless charging interface removably coupled to the platform, a sensor, a visual indicator coupled to the chassis, and a controller. The second wireless charging interface is configured to wirelessly transfer energy from the energy source to the first wireless charging interface to charge the battery pack of the lift device. The sensor is coupled to the platform and configured to initiate transfer of the energy by the second wireless charging interface in response to detecting a presence of the lift device on the platform. The controller is operatively coupled to the second wireless charging interface and the visual indicator and configured to control the visual indicator to provide a visual indication in response to initiation of the transfer of the energy by the second wireless charging interface. The display is configured to provide a graphical user interface including at least one of (a) a rate at which the battery pack of the lift device is charging or (b) a state of charge of the battery pack of the lift device.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which:

FIG. 9 depicts a folding process that facilitates storing and transporting the platform charging unit.

DETAILED DESCRIPTION

Figure 1:
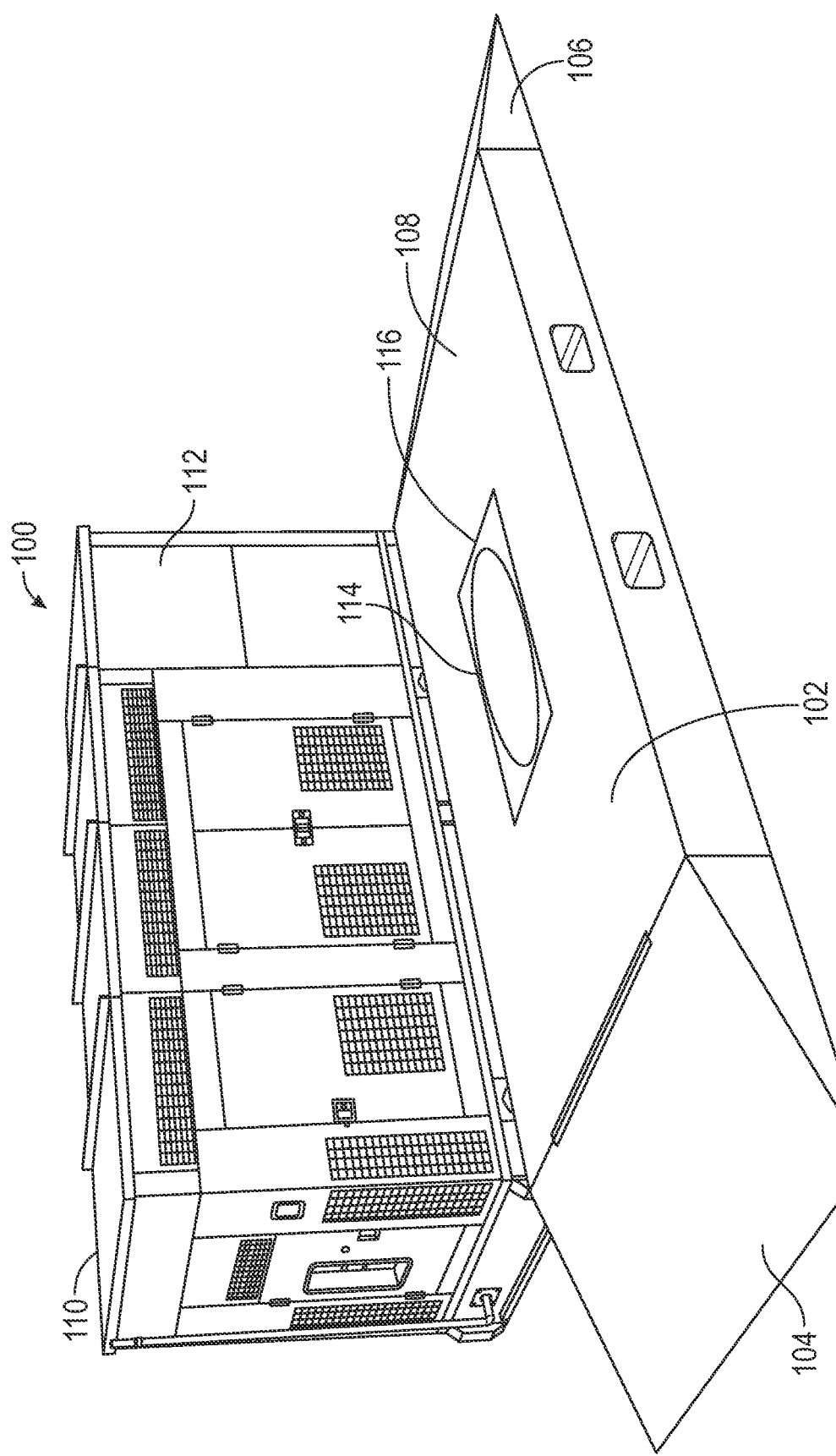
FIG. 1 is a perspective view of a platform charging unit, according to an exemplary embodiment.
Figure 2:
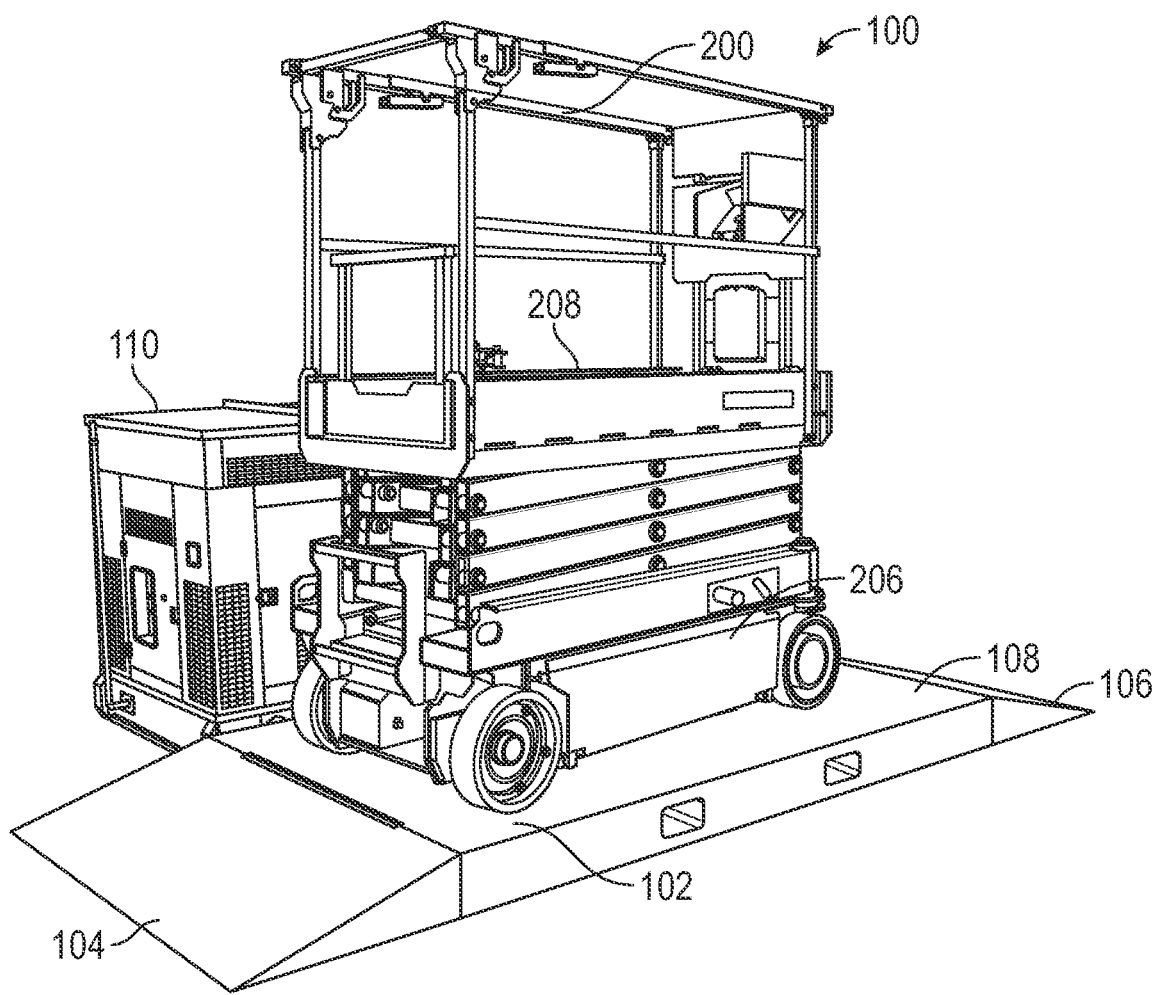
FIG. 2 is a perspective view of the platform charging unit of FIG. 1 interacting with a lift, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring to the figures generally, the various exemplary embodiments disclosed herein relate to systems, apparatuses, and methods for charging a lift device, such as an AWP or MEWP. The system for charging a lift generally includes a platform structure. The platform structure has a generally box-like shape, and includes two ramps positioned on either side of the platform structure to facilitate travel onto and off of the platform. The platform structure includes an induction coil (e.g., a copper coil, etc.) that is configured to receive current from an electrical power source, such as a utility source (e.g., from a wall socket, etc.), generator (e.g., a diesel generator, a natural gas generator, a fuel cell generator), a solar panel array, or battery assembly. When the induction coil is powered, current is supplied from the electrical power source to the induction coil, which generates a magnetic field. The magnetic field extends upwardly and outwardly from the platform, such that a lift or other equipment positioned on the platform can interact with the generated magnetic field. If the lift or other equipment includes an antenna loop (e.g., a copper coil) in communication with its battery or battery assembly, a current will be generated within the antenna loop when the antenna loop is positioned within the magnetic field generated by the induction coil. The current within the antenna loop can then be supplied to the battery or battery assembly within the lift or other equipment to charge the battery or battery assembly without the need for a wired connection. After a sufficient charge level is achieved, the lift or other equipment can drive away from or otherwise be removed from the platform. The system for charging a lift can also include a variety of different charging devices in addition to the platform, including one or more parking bollards or wireless pads. Accordingly, multiple lifts can be charged simultaneously.

The platform structure is operably coupled to a telematics system, where the telematics system is configured to analyze a status of a machine and determine an operational need of the machine. The telematics system may include a cloud-based control system configured to store machine data related to operation of the machine. The cloud based control system may be operatively coupled to the charging system via Bluetooth, Wi-Fi, or the like. The cloud-based control system may further analyze the machine data based on a variable. The variable may be one or more of a time of day data, a charging rate data, a state of charge data, and a current power data.

The platform structure may include a geofence positioned in an outward direction from (e.g., surrounding) the platform structure. The geofence may be a job site boundary, where the lifts positioned within the geofence are operatively coupled to the platform structure. The geofence defines a boundary to signify that lifts within the geofence are coupled to the platform structure positioned within the geofence. The platform structure includes a controller operatively coupled to the lifts. The controller is configured to analyze and monitor a status of the lift. The status of the lift may include a state of charge, where the state of charge designates a current battery life of the lift. The controller may receive that state of charge data and calculate a charge time. The charge time may be a time to fully charge the lift or a time to charge the lift to a recommend amount.

The charging system is also compatible with a camera-based positioning system. The charging system is equipped with a series of visual cues and other indications that can be used by one or more cameras on an AWP or MEWP to position the vehicle in a proper position relative to the charging system to begin a charging process. The one or more cameras can be positioned upon the AWP or MEWP and are in communication with a controller. The controller receives feedback from the cameras on the vehicle and can communicate with a prime mover of the vehicle to drive the vehicle into a desired position on the platform charging system to complete a wireless charging process.

Wireless Charging System

As shown in FIG. 1, a wireless charging system or wireless charging station is shown as charging system 100, according to an exemplary embodiment. The charging system 100 generally includes a platform assembly, shown as platform structure 102 (e.g., a frame, a chassis, etc.). The platform structure 102 has a generally rectangular, box-like shape and is configured to support one or more machines, vehicles, or lifts, shown as lift devices 200, as discussed in additional detail below. Two ramps 104, 106 are positioned either side of the platform structure 102 to direct a vehicle onto and off of the upper surface 108 of the platform structure 102. In some examples, the ramps 104, 106 are pivotally or removably coupled to the platform structure 102 so that the platform structure 102 can transition to a more compact shape for travel.

FIGS. 1-42 illustrate a variety of different features for use with the charging system 100. Although certain features may have been omitted from some of the figures to avoid overcrowding the images, it should be understood that FIGS. 1-42 may all represent a single embodiment of the charging system 200. It should also be understood that the position and combination of features shown in FIGS. 1-42 is exemplary only and not intended to be limiting.

The charging system 100 further includes an electrical cabinet 110. The electrical cabinet 110 can support a variety of different electrical components, including transformers that are configured to step down and/or step up voltage received from a secondary source. In some examples, the electrical cabinet 110 also receives one or more inverters. The inverters are configured to transition direct current electricity stored within an energy storage device or battery pack, shown as battery assembly 112, into alternating current electricity for use by the platform structure 102, as discussed below. The battery assembly 112 may include one or more batteries.

The electrical cabinet 110 stores or is coupled to an electrical power source. For example, in some embodiments, the electrical cabinet 110 is placed in communication with a utility source (e.g., a power grid). The utility source can supply standard utility alternating current electrical power at 120 V and 60 Hz, for example. In other embodiments, the electrical cabinet 110 is placed in communication with a 240 V or 480 V power source instead. Additionally or alternatively, the electrical cabinet 110 can support (e.g., contain) the battery assembly 112. In some examples, the battery assembly 112 includes a series of rechargeable batteries (e.g., lithium-ion, nickel-cadmium, lead-acid, etc.) received within the electrical cabinet 110. The batteries are configured to receive electrical energy from the utility source through the inverter, which converts the AC utility source power into DC power which can be stored within the battery. In some examples, the battery assembly 112 can also be charged from other equipment on the platform structure 102. The battery assembly 112 can be arranged in a modular battery unit that is removable from and replaceable into the electrical cabinet 110. In still other embodiments, the electrical cabinet 110 houses an internal combustion engine and a generator that are configured to produce and supply power as a secondary power source.

Figure 5:
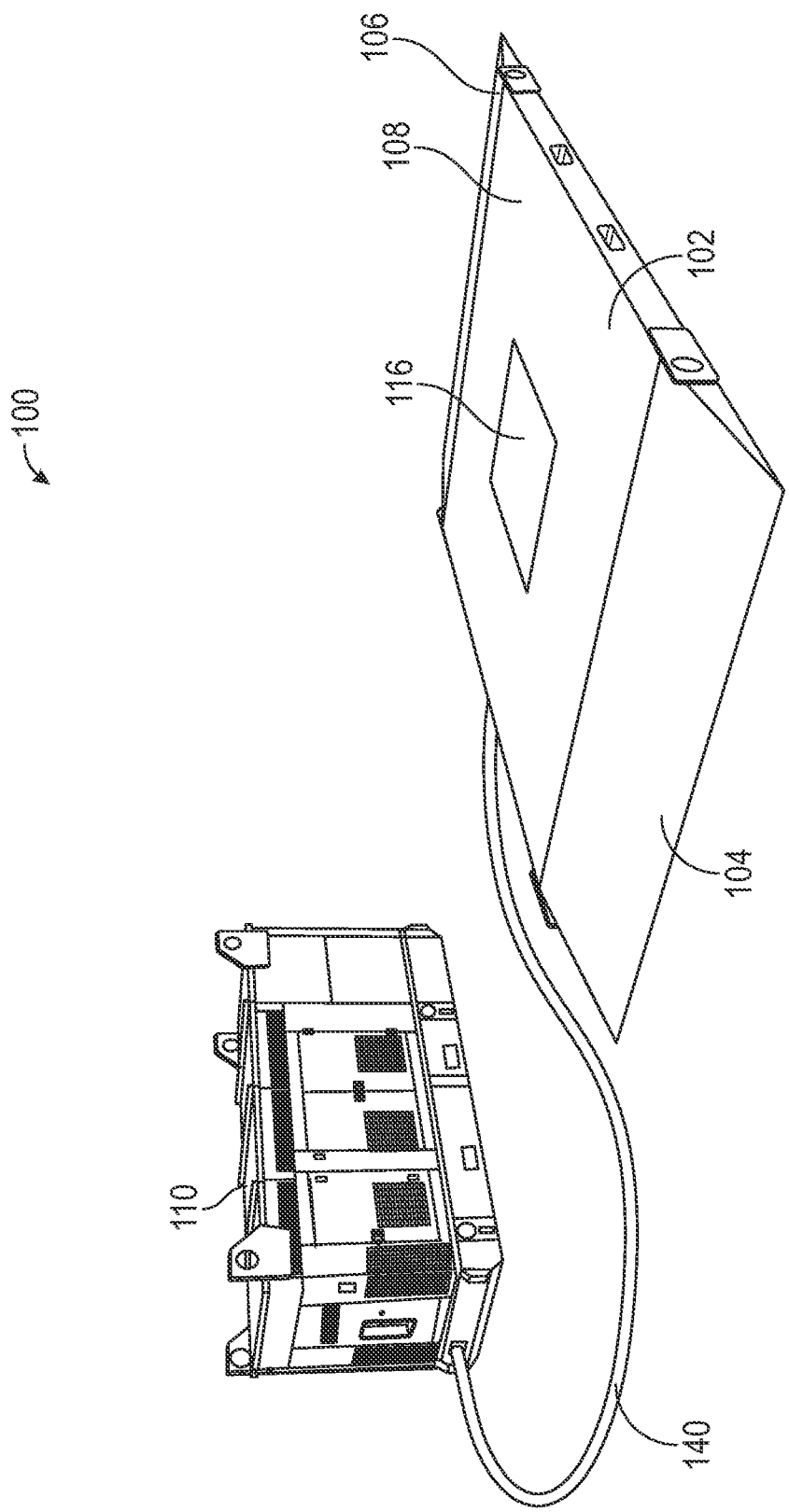
FIG. 5 is a perspective view of the platform charging unit of FIG. 1, shown with a platform structure positioned remotely, away from an electrical cabinet.
Figure 6:
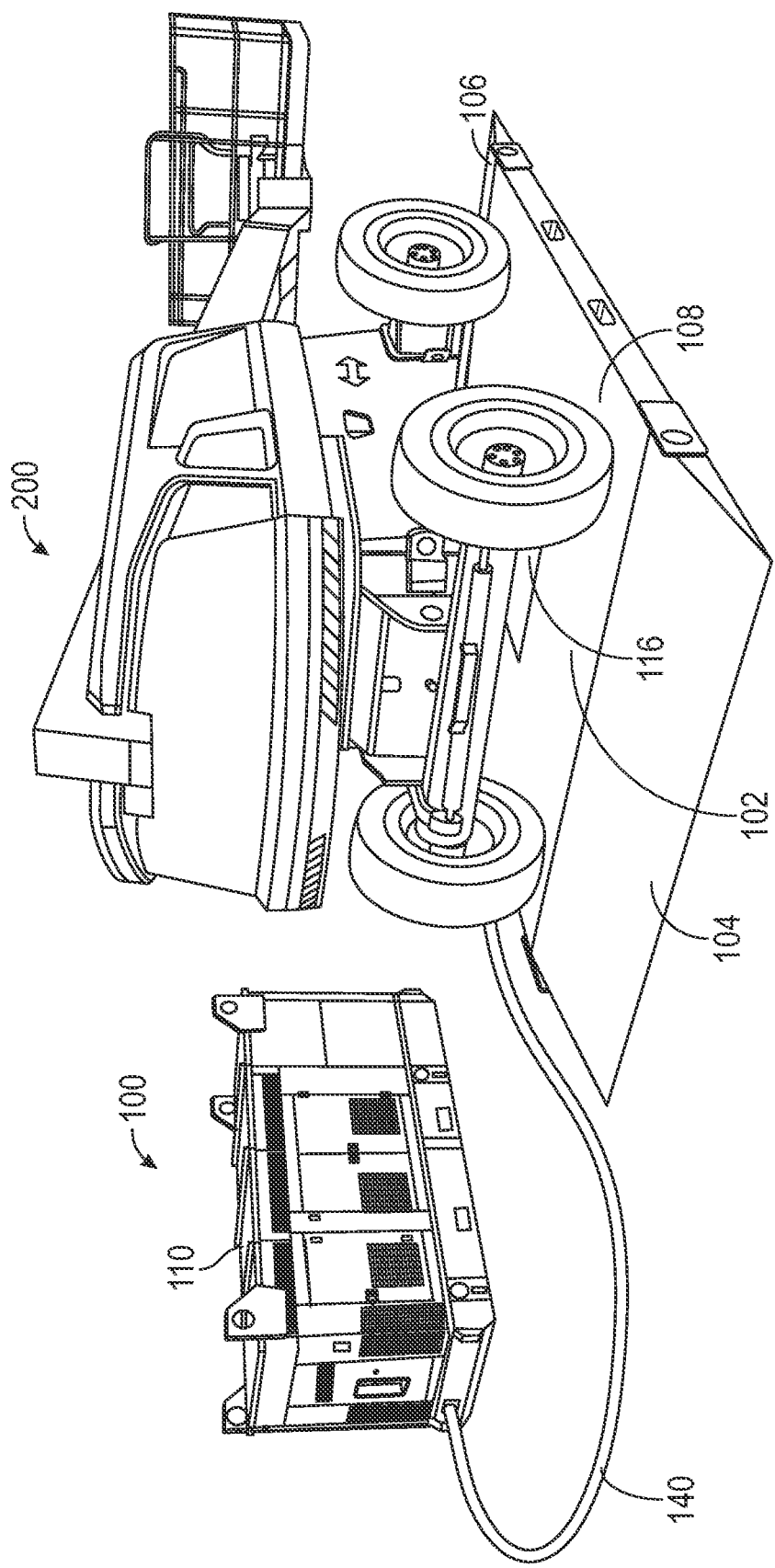
FIG. 6 is a perspective view of the platform charging unit of FIG. 5 interacting with lift, according to another exemplary embodiment.
Figure 7:
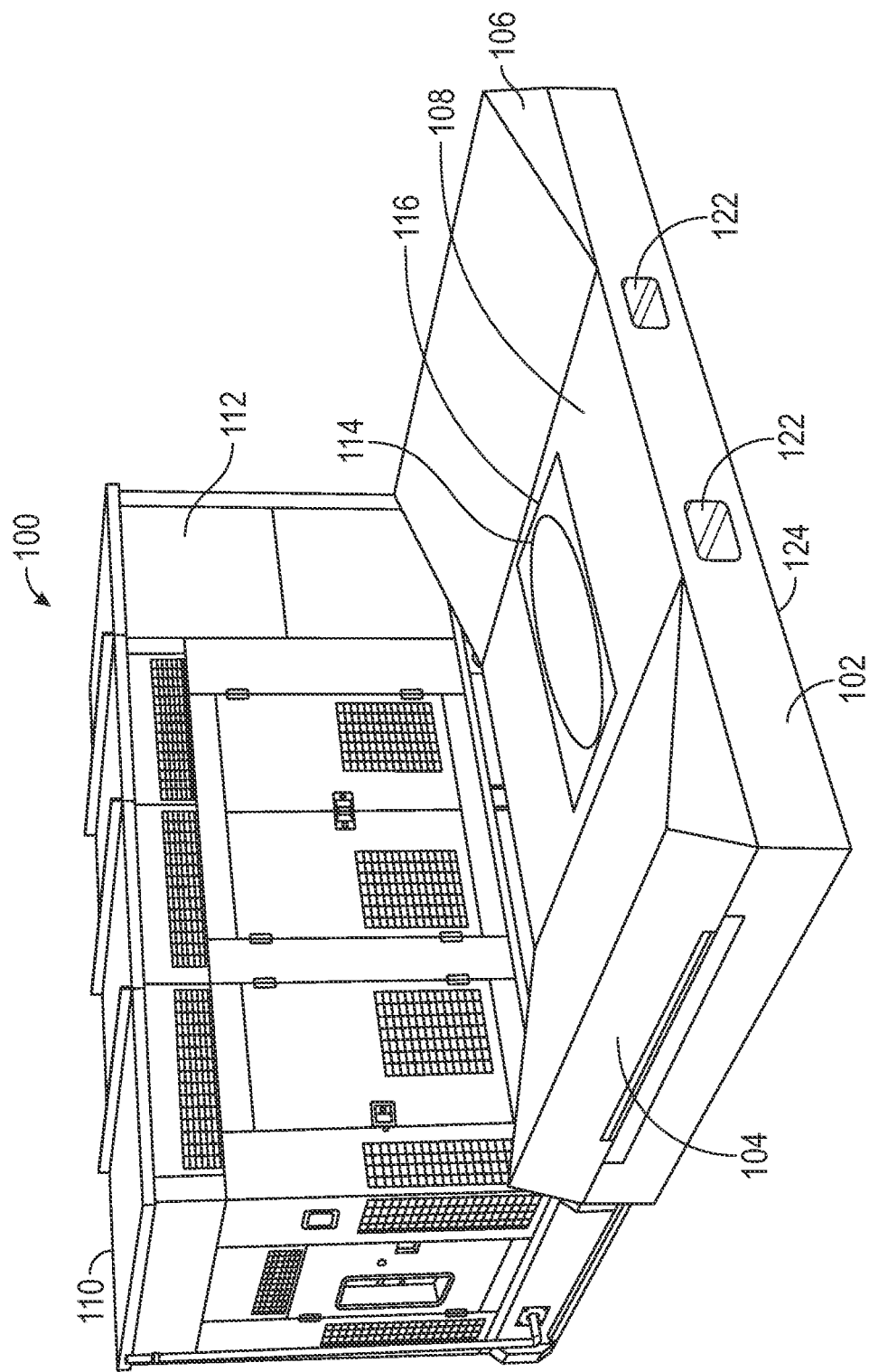
FIG. 7 is a perspective view of the platform charging unit of FIG. 1 in a first folded orientation.

As depicted in FIGS. 5 and 6, the electrical cabinet 110 is spaced from (e.g., positioned remotely from) the platform structure 102 while remaining electrically coupled to the platform structure 102 such that the electrical cabinet 110 supplies electrical current to the platform structure 102. The electrical current is provided from the electrical cabinet 110 to the platform structure 102 by one or more of the power sources in communication with the electrical cabinet 110. In some examples, a wired connection of one or more cables 140 and/or a plug is formed between the electrical cabinet 110 and the platform structure 102 so that electrical current can be efficiently transmitted between the electrical cabinet 110 and the platform structure 102. The electrical power transmitted from the electrical cabinet 110 can be preconditioned depending on the electrical supply source. For example, electrical power supplied to the platform structure 102 by the utility source can be passed through a transformer before being supplied to the platform structure 102. Alternatively, electrical power provided from the battery assembly 112 can be passed to an inverter before being supplied to the platform structure 102, such that alternating current is always provided to the platform structure 102.

Electrical current received by the platform structure 102 is routed to an induction coil 114 received within the platform structure 102. The induction coil 114 can be formed of copper, for example, and includes one or more turns (e.g., coils, loops, etc.). When current is provided to the induction coil 114, the current travels around the wire structure in a circular manner. Movement of the current through the induction coil 114 generates a magnetic field that extends vertically upward, through the upper surface 108 of the platform structure 102 and above the platform structure 102, generally. The magnetic field generated by the induction coil 114 can then be used to generate and wirelessly charge lifts and other equipment positioned within the magnetic field, as explained in additional detail below.

The induction coil 114 is positioned within a charging area 116 formed by the platform structure 102. As depicted in FIG. 1, the charging area 116 can be visually marked on the platform structure 102 (e.g., with different coloration, or another type of visual indicator, etc.) so that an operator of a lift device or other vehicle can easily identify the location in which the induction coil 114 is positioned. In some examples, the charging area 116 is centrally located within the platform structure 102. In other examples, the charging area 116 is offset to one side of the platform structure 102. In still other examples, multiple charging areas 116 are provided on a single platform structure 102, such that multiple lifts or vehicles can be charged simultaneously by the same platform structure 102.

With additional reference now to FIGS. 2-6, a process for wirelessly charging a vehicle or mobile work equipment, shown as lift device 200, using the charging system 100 is depicted. To begin the wireless charging process, the lift device 200 first drives onto the platform structure 102 using one of the ramps 104, 106. Although shown as a scissor lift, the lift device 200 can be a variety of different lift devices, including a boom lift, telehandler, electric scissor lift, forklift, or other suitable devices that include one or more battery-operated or electrical components. In other embodiments, the charging system 100 performs the charging process with another type of vehicle or work equipment (e.g., a refuse vehicle, a concrete mixer truck, a towtruck, a passenger vehicle, a military vehicle, etc.).

Figure 4:
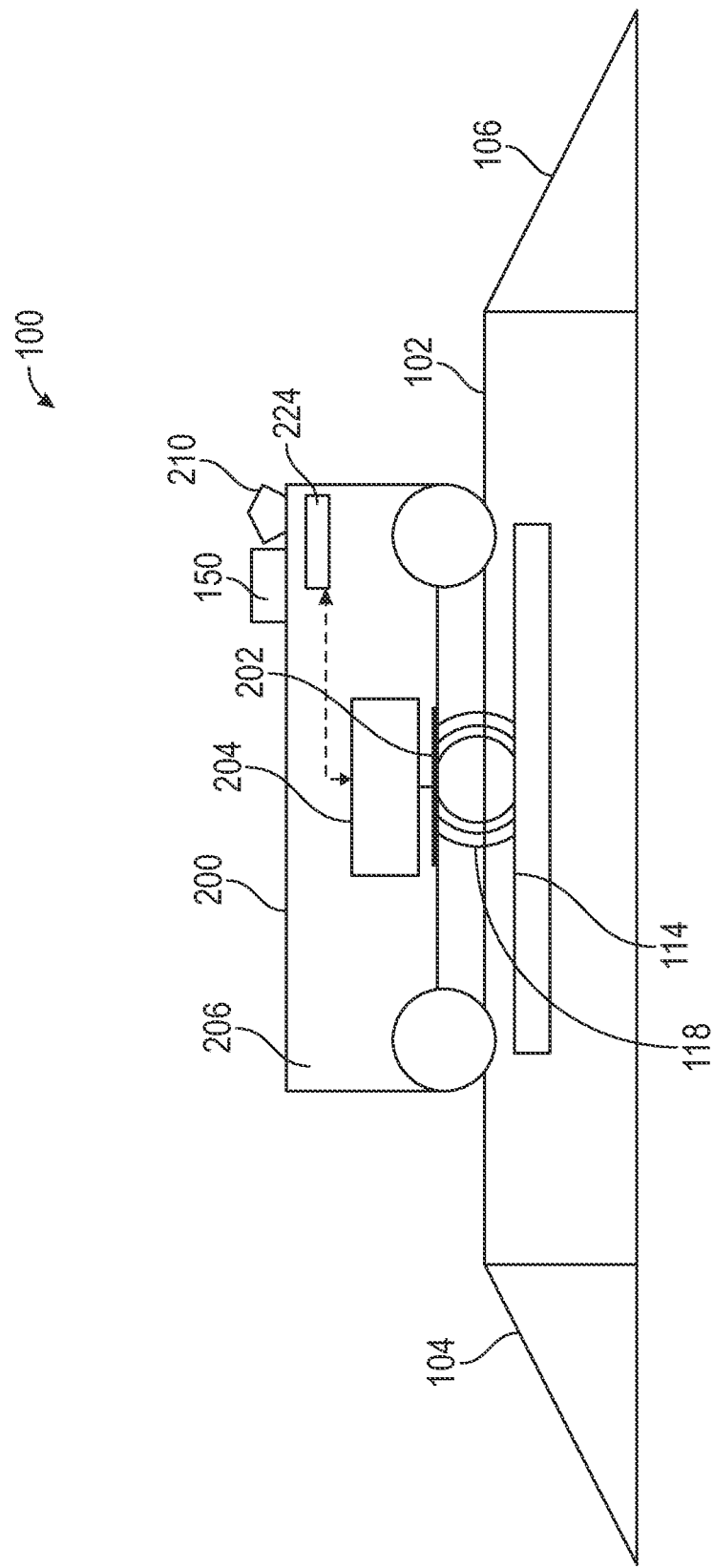
FIG. 4 is a schematic view of the lift of FIG. 2 positioned on the platform charging unit of FIG. 1.

To interact with the charging system 100 and as depicted in FIG. 4, the lift device 200 includes an antenna coil 202 or loop that is electrically coupled with an energy storage device, shown as battery 204, of the lift device 200. The antenna coil 202, like the induction coil 114, is formed of copper wire that includes a series of turns. When the antenna coil 202 is positioned within a magnetic field, a current in generated within the antenna coil 202 that can then be provided to the battery 204 to help charge the battery 204. Accordingly, to better position the antenna coil 202 within magnetic fields (e.g., such as the magnetic field created by the induction coil 114), the antenna coil 202 is positioned at or near a base of a chassis 206 of the lift device 200. Accordingly, the antenna coil 202 will be positioned at or near an absolute bottom of the chassis 206 of the lift device 200, such that the antenna coil 202 faces downward from the chassis 206.

The lift device 200 drives forward onto the platform structure 102 until the lift device 200 is positioned directly or approximately directly above the induction coil 114 and the charging area 116, more generally. In such a position, the antenna coil 202 may be substantially aligned with the induction coil 114. Although shown centered above the charging area 116 and the induction coil 114 in FIG. 4, certain versions of the lift device 200 may have an antenna coil 202 offset to a different side of the lift device 200. For example, in some embodiments, the antenna coil 202 is offset to one of the corners of the chassis 206. Such a configuration may help an operator within a platform 208 of the lift device 200 to direct the lift device 200 into the necessary charging area 116, given the more visible nature of the charging area relative to an edge of the vehicle. In other examples, the lift device 200 includes a visual indicator 210 (e.g., a light) on the chassis 206 or platform 208 that illuminates when the antenna coil 202 is positioned within the charging area 116 and the battery 204 is receiving power (e.g., indicating that the battery 204 is charging).

With the lift device 200 positioned so that the antenna coil 202 is above the induction coil 114 and the charging area 116, the antenna coil 202 is positioned within a magnetic field 118 created by the current passing through the induction coil 114. The antenna coil 202 within the magnetic field 118 generates a current within the antenna coil 202, which is then passed upwardly, to the battery 204 of the lift device to charge the battery 204. In some examples, the indicator 210 can provide a visual indication that charging is complete, or that charging has reached a threshold level.

Figure 3:
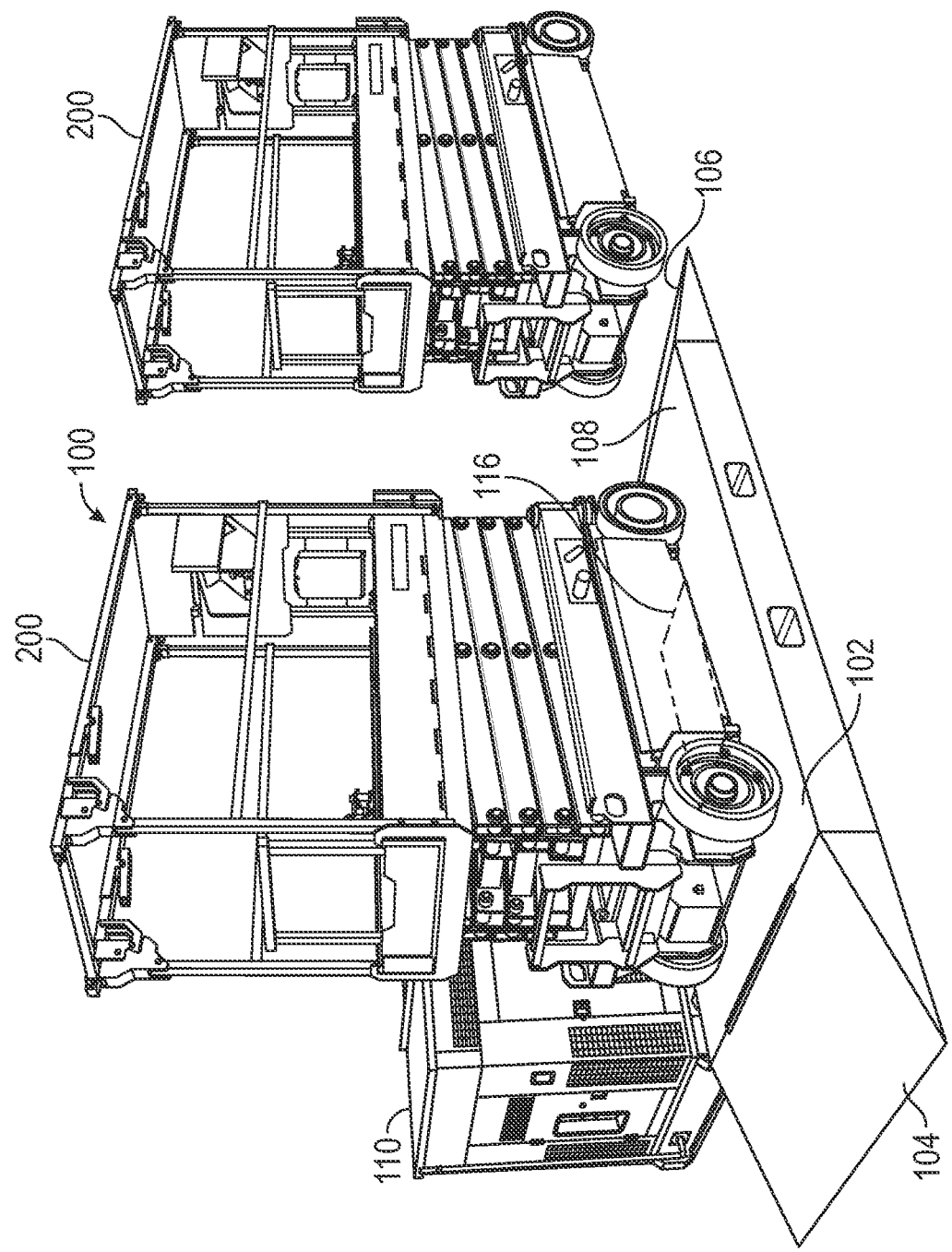
FIG. 3 is a perspective view of the platform charging unit of FIG. 1, shown interacting with a second lift after the lift of FIG. 2 has moved off the platform charging unit, according to an exemplary embodiment.

When a desired charge level has been reached, an operator (or a controller within the lift device 200, if the lift is autonomous or semi-autonomous) can drive or otherwise move the lift device 200 off of the platform structure 102. The lift device 200 can drive in either direction, down one of the ramps 104, 106, until the lift device 200 has been entirely moved from the charging system 100. Accordingly, and as depicted in FIG. 3, a second lift device 200 can be moved onto the platform structure 102 to complete a similar charging process.

Platform Mobility Features

With additional reference to FIGS. 7-11, the charging system 100 is designed with a variety of different features that improve the mobility of the charging system 100. For example, and as depicted in FIG. 5, each of the ramps 104, 106 can be hingedly (e.g., pivotably) coupled to the platform structure 102. Accordingly, the ramps 104, 106 can be rotated between a first, or deployed position (shown in FIGS. 1-4) and a second, or stowed position (shown in FIG. 5). In the deployed position, the ramps 104, 106 extend outwardly, beyond an outer perimeter of the electrical cabinet 110 and beyond an outer perimeter of the platform structure 102. In the stowed position, the ramps 104, 106 fold inward, to a position where the ramps 104, 106 are positioned within the outer perimeter of the platform structure 102 and on top of the upper surface 108 of the platform structure 102.

In the stowed position, the platform structure 102 and charging system 100, as a whole, can be more easily transported. In some examples, one or more transporting features are also included into the platform structure 102. As depicted in FIG. 5, one or more passages 122 (e.g., forklift passages) can be formed within one of the faces of the platform structure 102. The passages 122 can be formed as rectangular channels that extend inwardly and through (e.g., partially through, completely through, etc.) the platform structure 102, and are sized to receive forks from a material handling vehicle. In some examples, the passages 122 can be formed as grooves within a bottom of the platform structure 102. In other examples, and as depicted in the figures, the passages extend into the platform structure 102, between the upper surface 108 and a bottom surface 124 of the platform structure 102.

Figure 9:
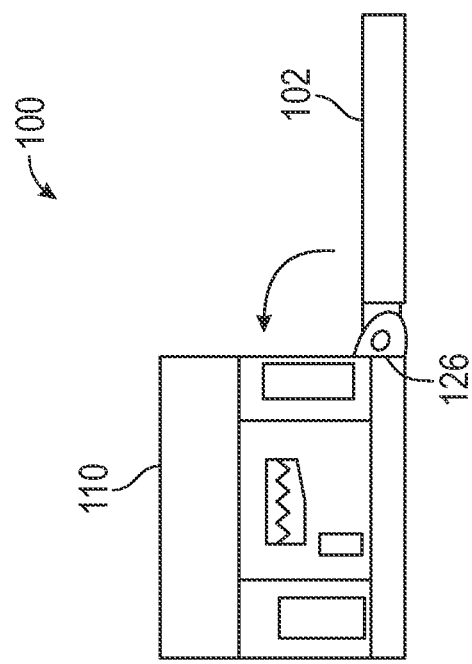
FIG. 9 is a schematic view of the platform charging unit of FIG. 1.
Figure 8:
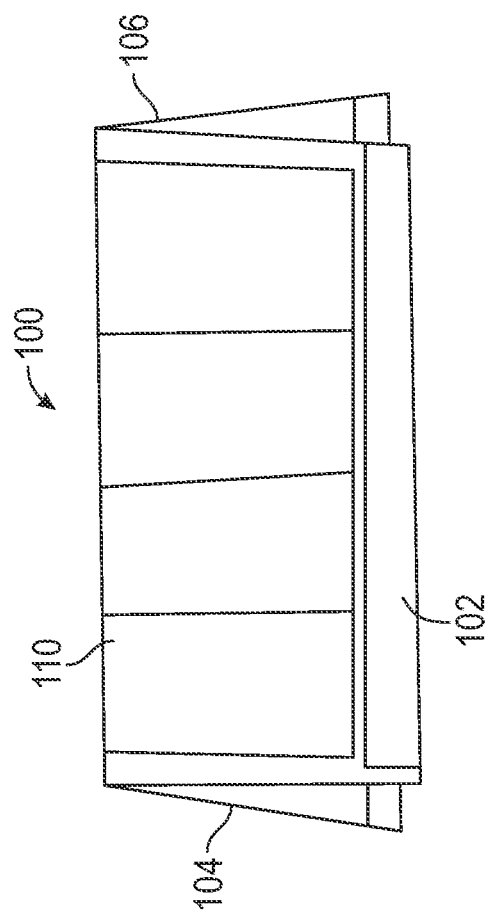
FIG. 8 is a schematic view of the platform charging unit of FIG. 1 in a second folded orientation.
Figure 10:
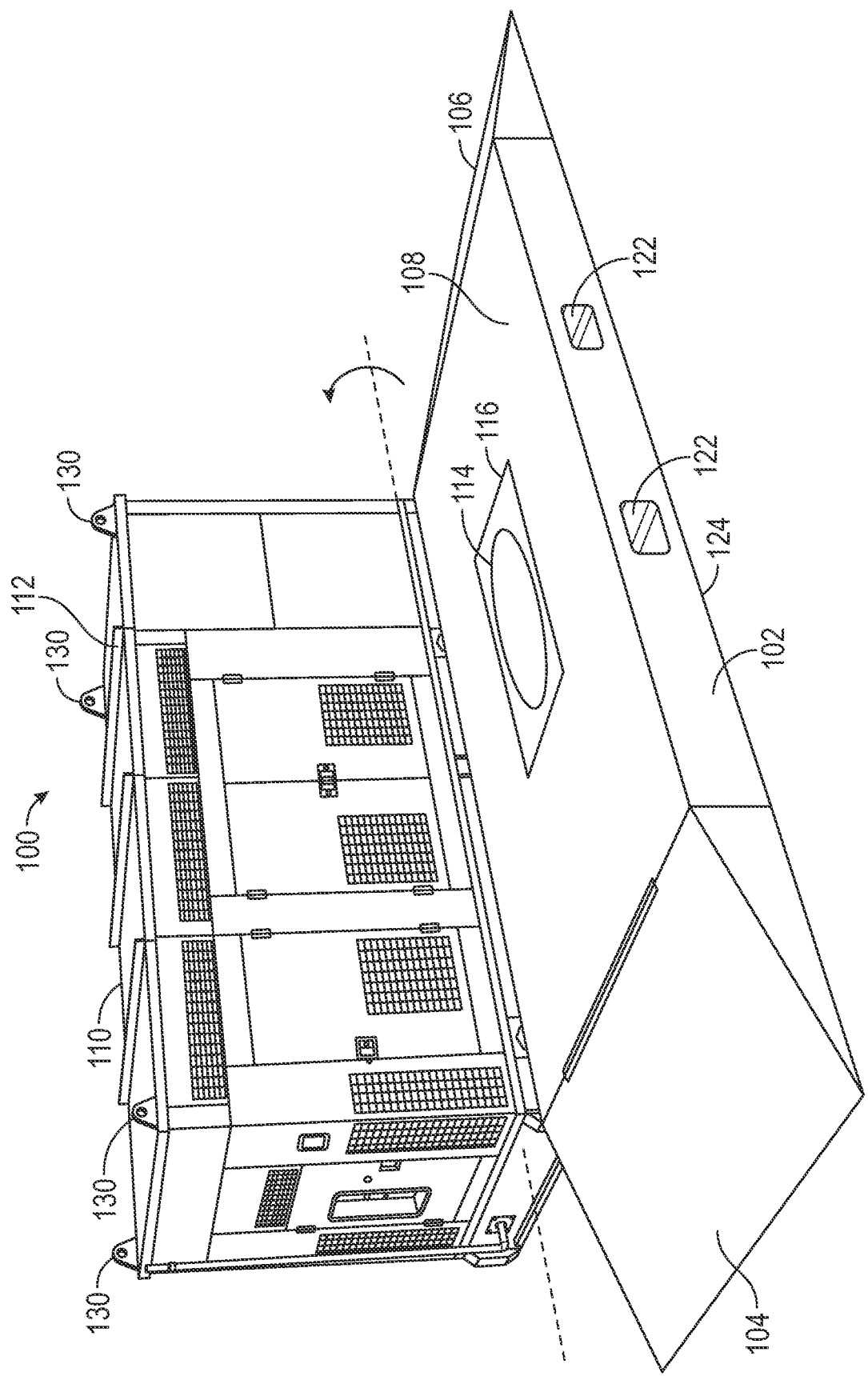
FIG. 10 is a perspective view of the platform charging unit of FIG. 1 incorporating lifting lugs to facilitate transportation of the platform charging unit, according to an exemplary embodiment.
Figure 11:
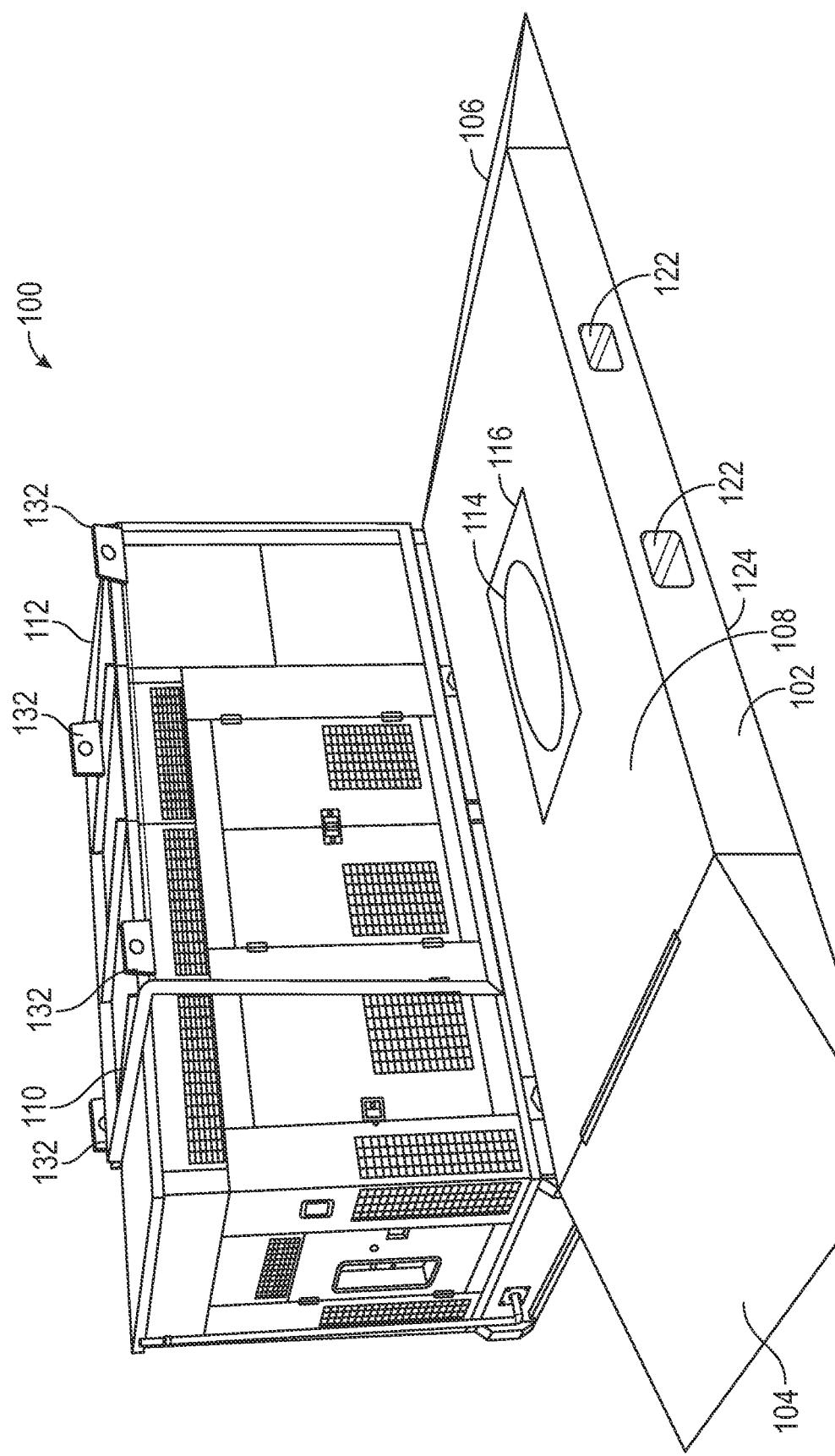
FIG. 11 is a perspective view of the platform charging unit of FIG. 1 incorporating lifting lugs to facilitate transport of a portion of the platform charging unit, according to an exemplary embodiment.

Various other folding mechanisms can be included within the charging system 100 as well to improve mobility. For example, and as depicted in FIG. 8, a vertical folding mechanism can be included. The ramps 104, 106 can fold upward, to a position where a top surface of each ramp 104, 106 extends approximately parallel with outer walls of the electrical cabinet 110 and approximately vertically. As depicted in FIG. 8, each of the first ramp 104 and second ramp 106 can be positioned laterally outside the outer walls of the electrical cabinet 110. With the first ramp 104 and the second ramp 106 each positioned in the stowed position shown in FIG. 8, the platform structure 102 can then be folded upward, toward the electrical cabinet 110 as depicted in FIGS. 9 and 10. The platform structure 102 can be hingedly or otherwise rotatably coupled to the electrical cabinet 110 using one or more hinges 126. Accordingly, the platform structure 102 (along with the ramps 104, 106) can be rotated between a deployed position, where the platform structure 102 extends perpendicularly away from the electrical cabinet 110 and a stowed position, where the platform structure 102 extends approximately parallel to and alongside the electrical cabinet 110. In this configuration, the electrical cabinet 110 may be received between the ramps 104b 106.

With the platform structure 102 and ramps 104, 106 in the stowed positions, the charging system 100 can be readily transported by a material handling vehicle, crane, tractor trailer, or the like. In some examples, and as depicted in FIG. 10, the electrical cabinet 110 includes a series of tow interfaces or lifting interfaces, shown as lugs 130, that are positioned along an upper surface of the electrical cabinet 110. The lugs 130 can define a series of lifting points (e.g., apertures sized to receive hooks or chains) that can be used to raise the electrical cabinet 110 (and platform structure 102 with the ramps 104, 106). For example, a lifting strap or lifting chain can be passed between one or more lugs 130 to create a balanced support for lifting the entirety of the charging system 100 or the electrical cabinet 110. In some examples, the electrical cabinet 110 sits upon a pallet-like structure that includes passages for being raised by a forklift or telehander. Accordingly, the electrical cabinet 110 can be lifted from both above and below the electrical cabinet 110, allowing for compatibility with a wide variety of different lifting equipment.

Figure 12:
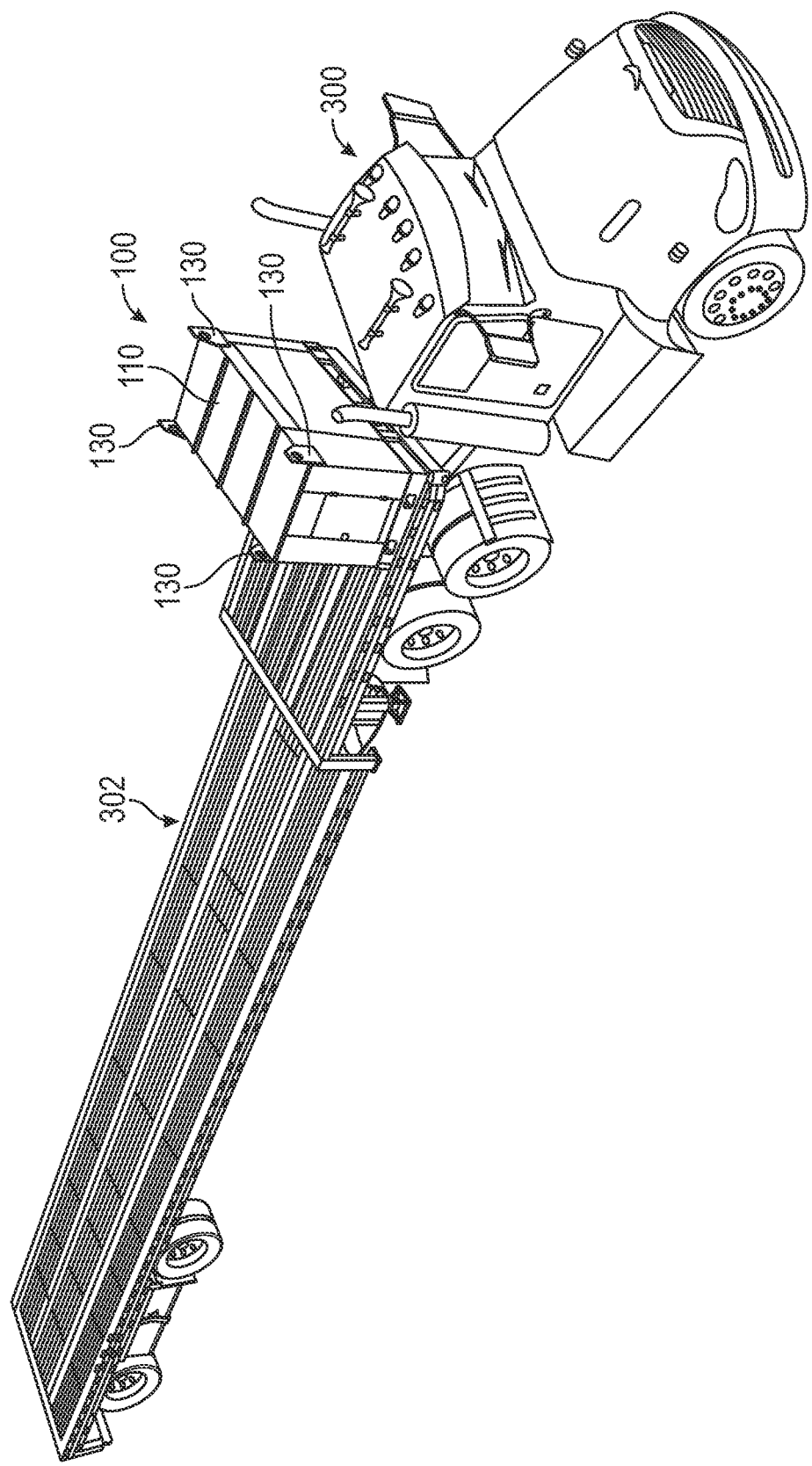
FIG. 12 is a perspective view of the platform charging unit of FIG. 1 positioned on a trailer of a truck, according to an exemplary embodiment.

Referring to FIG. 12, the electrical cabinet 110 is shown positioned on and coupled to a trailer 192 being hauled by a truck 190. To facilitate transport over the road, the electrical cabinet 110 can be sized to be approximately the width of a standard trailer, or around 8.5 feet. Using the lugs 130, the electrical cabinet 110 can be easily positioned atop the trailer 192 for transport to various different jobsites.

User Interface

Figure 13:
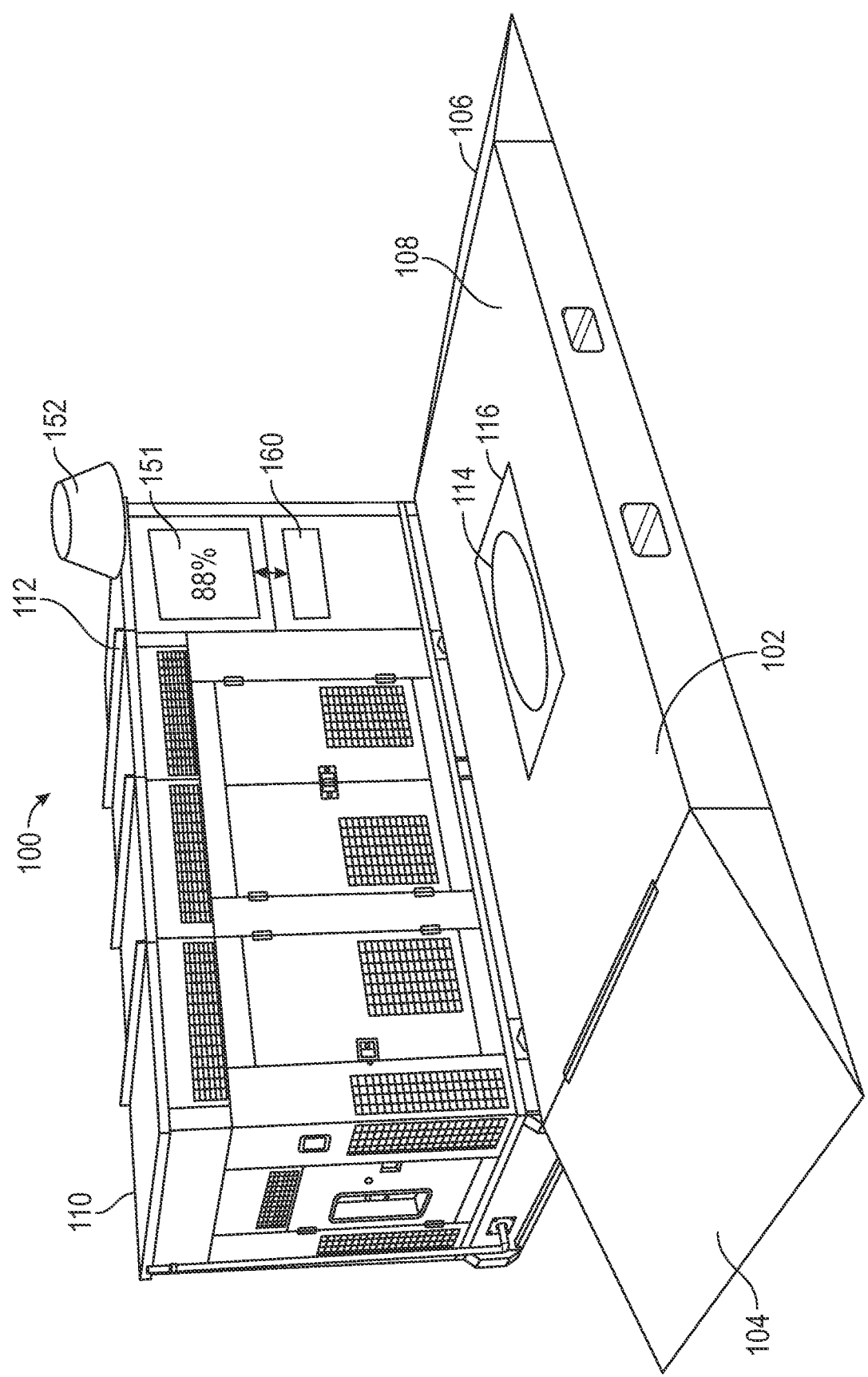
FIG. 13 is a perspective view of the platform charging unit of FIG. 1 including a display and status indicating unit, according to an exemplary embodiment.
Figure 14:
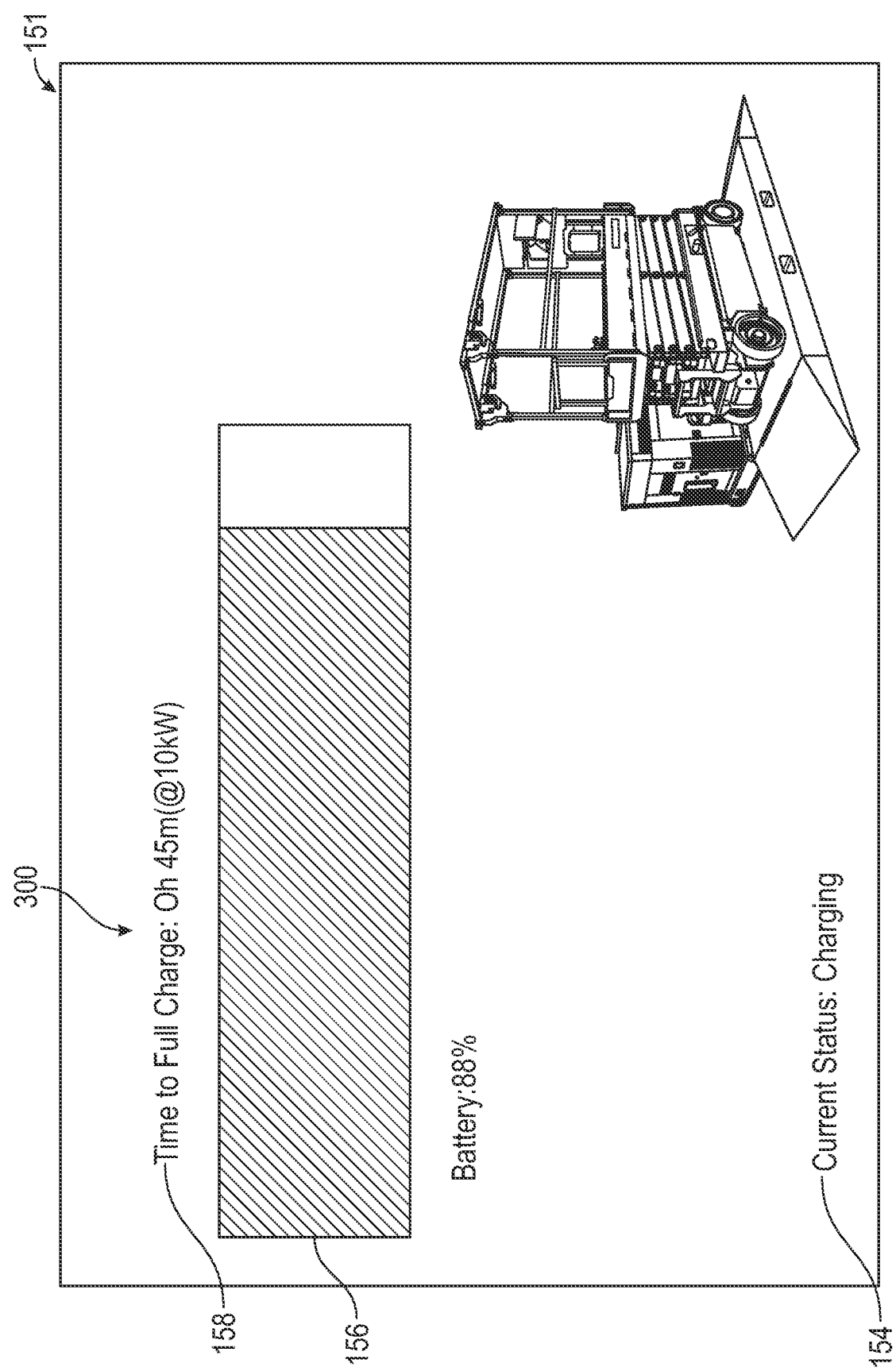
FIG. 14 is a schematic view of a graphical user interface that can be presented on the display of FIG. 13, according to an exemplary embodiment.

Referring now to FIGS. 13 and 14, the electrical cabinet 110 and/or the battery assembly 112 can include a user interface, shown as display 151. The display 151 can be, among other things, a liquid crystal display (LCD) or light emitting diode (LED) display that is configured to project a variety of helpful information to an operator or to persons near the charging system 100. In addition to the display 151, the electrical cabinet 110 and/or battery assembly 112 further includes a visual indicator, shown as beacon 152, that can be used to indicate a charging status of the lift device 200. For example, when no lift device 200 is being charged, the beacon 152 can illuminate red. When a lift device 200 is being charged, the beacon 152 can illuminate yellow, and can optionally pulse. When a lift device 200 has reached a fully-charged state, the beacon 152 can illuminate a steady green.

As depicted in FIG. 14, the display 151 presents a graphical user interface (GUI) that provides a variety of different helpful pieces of information associated with the wireless charging process. For example, the GUI includes a current status 154 of the charging system 100. The current status 154 can include a variety of different statuses depending on different factors associated with the lift device 200 and charging system 100. Different statuses can be displayed in the current status 154 indicator, including "charging," "low battery," "inactive," "fully charged," and the like. The GUI can further include a battery indicator 156 that indicates a current charge level of the battery 204. In some examples, the battery indicator 156 is populated using information retrieved from the lift device 200. A controller 224 of the lift device 200 (e.g., shown in FIG. 4), which is in communication with the battery 204, can wirelessly transmit information to the electrical cabinet 110 and/or a secondary controller or processor 160 within the electrical cabinet 110 and/or battery assembly 112. The processor 160 can then communicate received information from the lift device 200, including information about the battery 204, via the display 151. The shared information includes, among other things, a current charge level of the battery 204. In some examples, the battery indicator 156 is displayed in the form of a battery shape on the GUI that gradually fills as the charge level increases.

The GUI can also display an estimated time to full charge 158. The estimated time to full charge 158 can be particularly useful information to a user, as planning jobs throughout a worksite can be better performed with exact timing information. The estimated time to full charge 158 can be calculated by one or more of the controller 224 and/or the processor 160, and is based upon the current charge level of the battery 204 and the rate of charging currently being experienced by the battery 204 from the charging system 100. In some examples, the rate of charging is also displayed on the GUI. In some examples, observing a low rate of charging on the GUI can inform an operator that a minor readjustment to the position of the lift device 200 on the platform structure 102 is needed to align the antenna coil 202 and the induction coil 114 for optimal power transfer.

Although depicted and described as being a part of the electrical cabinet 110 and/or battery assembly 112, the display 151 can be positioned at various other places within the charging system 100. For example, in some embodiments, the display is a separately operable item that is positioned apart from the electrical cabinet 110 but powered by the battery assembly 112. In still other examples, the display 151 is incorporated into the lift device 200 itself. Accordingly, an operator on the platform 208 of the lift device can readily observe helpful information about the charging rate of the lift device 200 and can determine when to exit the lift device 200 or exit the platform structure 102 to allow for another lift device 200 to perform the charging process. In yet other embodiments, the display 151 is provided as part of a separate user device (e.g., a smartphone, a laptop, a tablet, etc.).

Coordinate System

Figure 15:
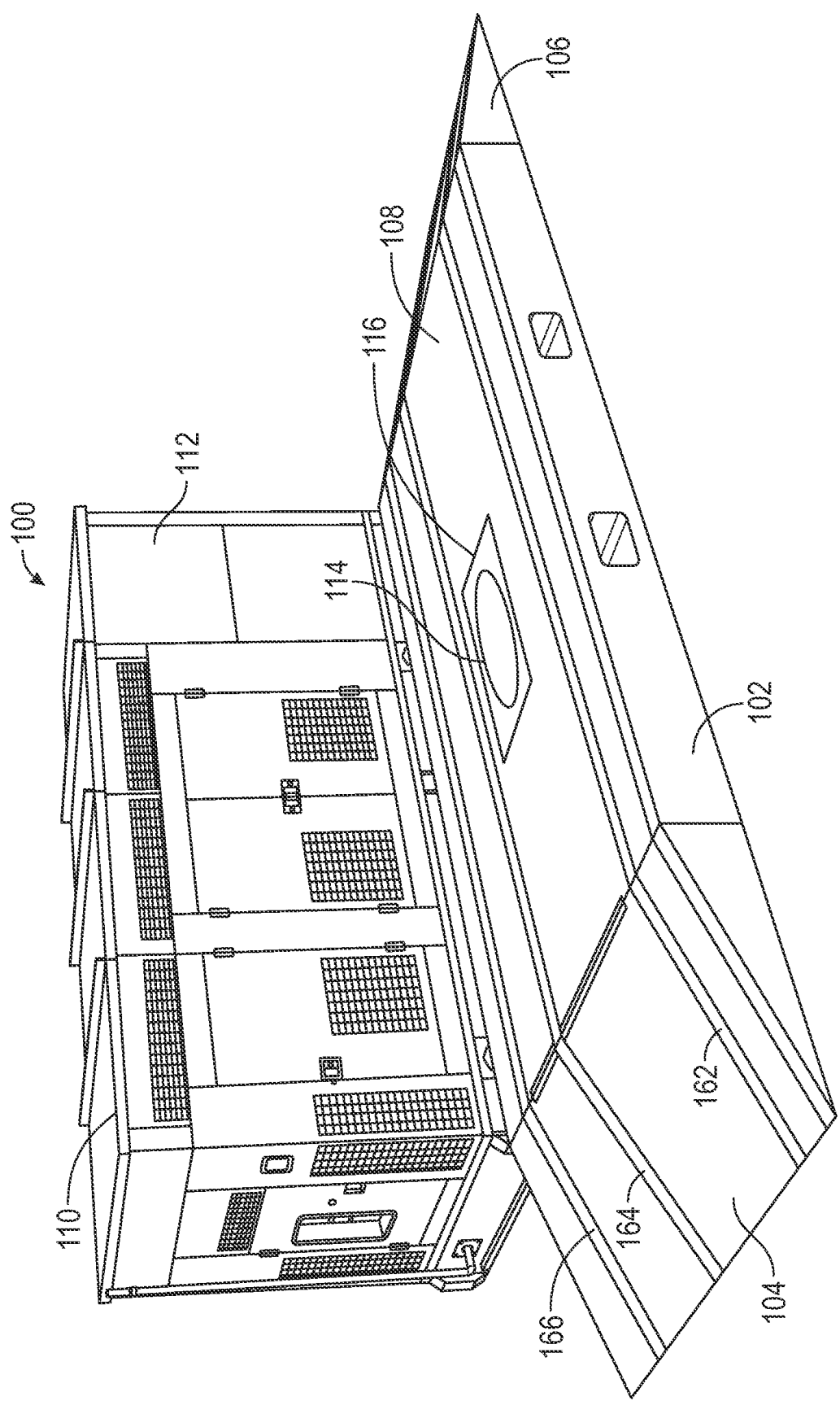
FIG. 15 is a perspective view of the platform charging unit of FIG. 1 including tracks for guiding a lift, according to an exemplary embodiment.
Figure 16:
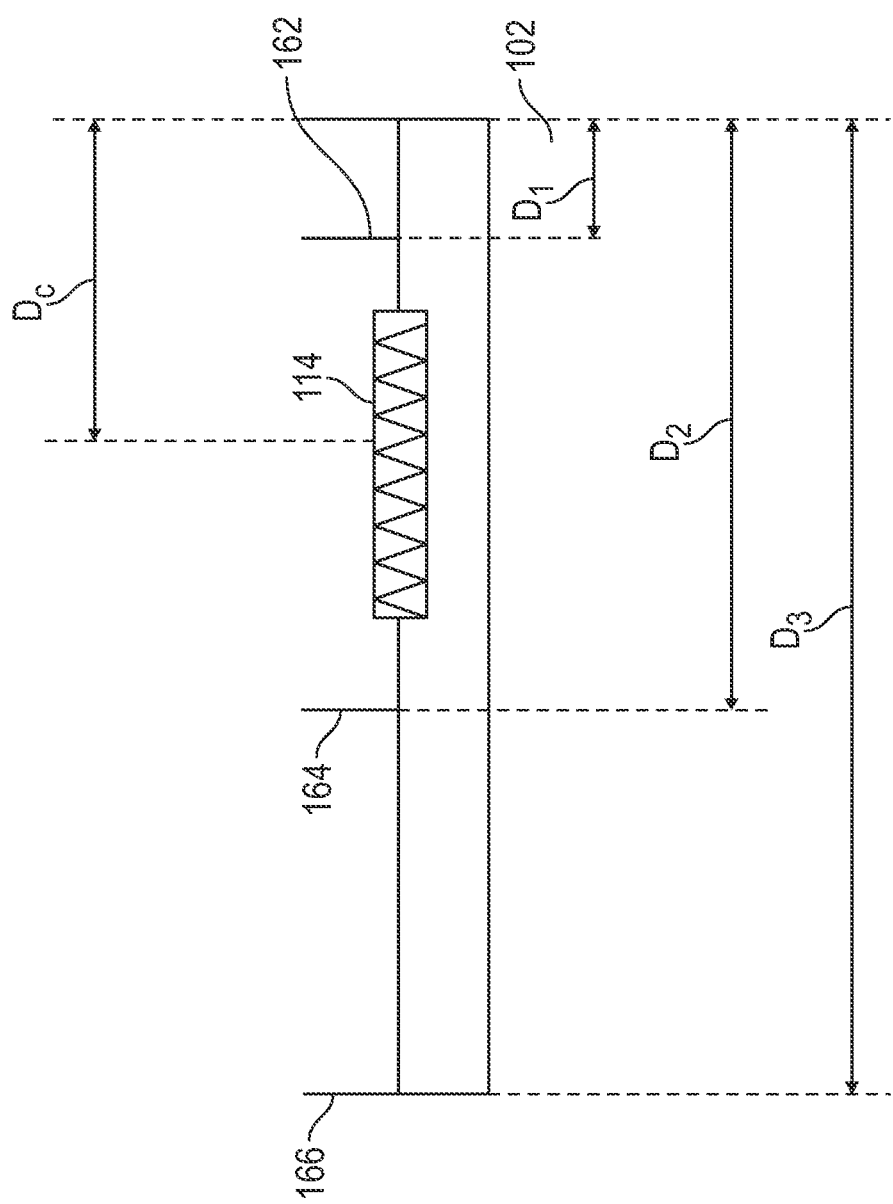
FIG. 16 is a schematic view of the spacing of the tracks of FIG. 15.
Figure 17:
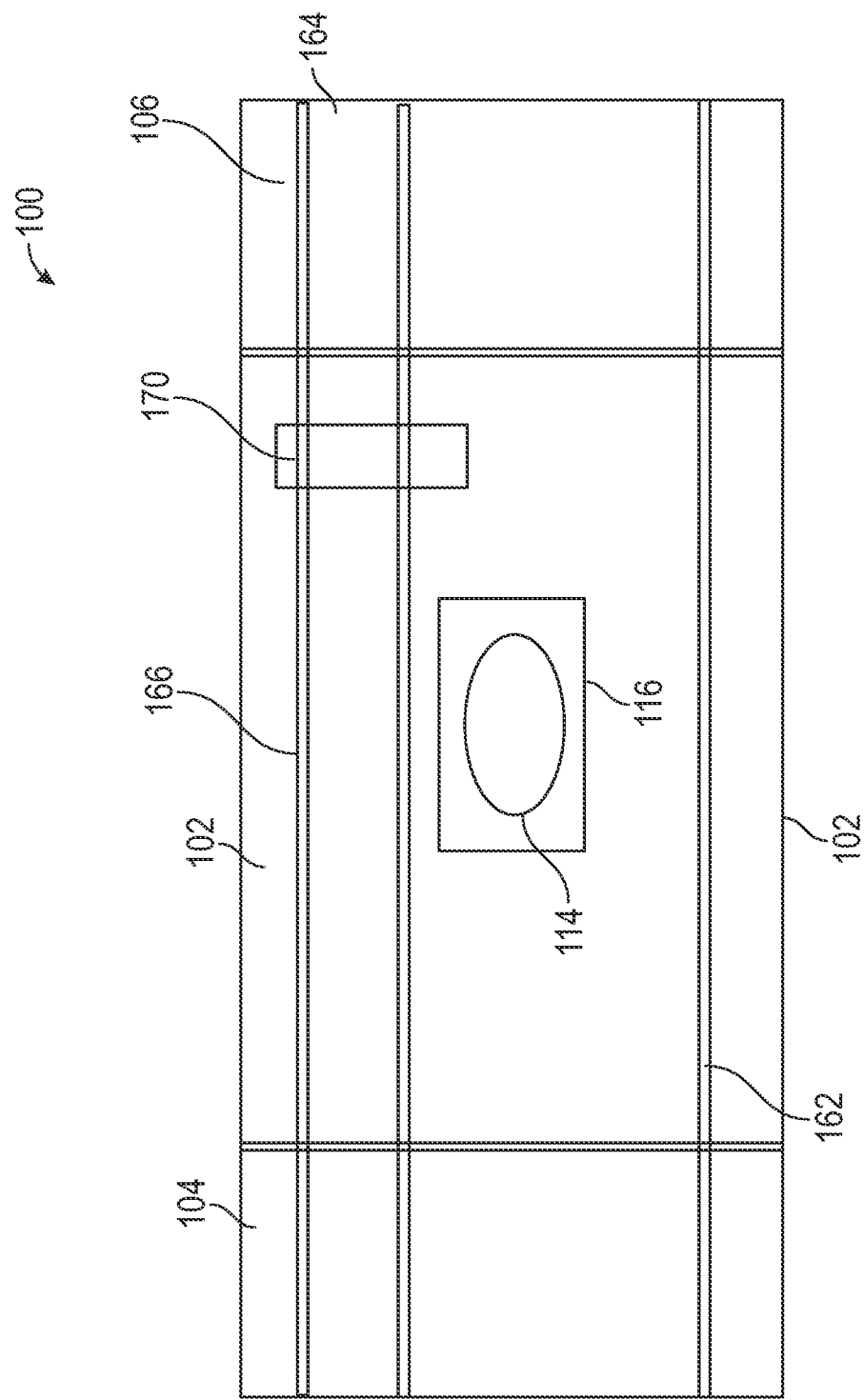
FIG. 17 a schematic view of the platform charging unit of FIG. 15 including a pad lever positioned on the platform charging unit, according to an exemplary embodiment.

Referring now to FIGS. 15 and 16, the platform structure 102 and the ramps 104, 106 include guide markings or rails, shown as guide rails 162, 164, 166. The guide rails 162, 164, 166 extend upwardly from the platform structure 102 and ramps 104, 106 to define tracks that guide a lift device 200 in an approximately straight and centered path above the induction coil 114 and charging area 116. As depicted in FIG. 15, the charging system 100 includes three or more guide rails 162, 164, 166 elevated or otherwise indicated on the platform structure 102 and ramps 104, 106 to accommodate different types and sizes of lift device 200.

The guide rails 162, 164, 166 are designed (e.g., sized and positioned) to accommodate the most frequently-used sizes of lift device 200, and direct the lift devices 200 directly or close to directly over the charging area 116 to maximize the wireless charging efficiency. For example, the two most common sizes of scissor lift are defined by platform 208 widths of 30-32 inches and 46-48 inches, respectively. The guide rails 162, 164, 166 may be positioned on the platform structure 102 and ramps 104, 106 to center each of these two different sizes approximately above the charging area 116.

For example, and as depicted in FIG. 15, the first guide rail 162 and the second guide rail 164 can be spaced apart appropriately to direct a slab scissor or other lift device 200 having an approximate width of 30-32 inches. In some examples, the first guide rail 162 is positioned approximately 4-6 inches (e.g., shown as $D_1$ in FIG. 16) away from an edge or outer surface of the platform structure 102 (e.g., from the side of the platform structure 102 that is not positioned adjacent the electrical cabinet 110) and ramps 104, 106. The center of the induction coil 114 and charging area 116 can then be positioned approximately 15-16 inches (e.g., shown as $D_C$ in FIG. 16) inward from the outer surface of the platform structure 102. The second guide rail 164 is positioned about 30-32 inches (e.g., shown as $D_2$ in FIG. 16) away from the outer surface of the platform structure 102. The spacing between guide rails 162, 164 is approximately 24-28 inches. Accordingly, when a scissor or other lift device 200 having an outer perimeter with a width of about 30-32 inches approaches the platform structure 102 of the charging system 100, the lift device 200 is positioned such that the wheels straddle the first guide rail 162 and second guide rail 164. As the wheels of the lift device 200 are typically positioned at the perimeter of the lift device 200, the spacing of about 24-28 inches places the wheels laterally outward from each of the guide rails 162, 164. If the guide rails 162, 164 are elevated on the ramps 104, 106 and/or the platform structure 102, the guide rails 162, 164 prevent deviation of the lift device 200 off the guide rails 162, 164 as the lift device 200 approaches the charging area 116, which is approximately centered below.

The third guard rail 166 and the first guard rail 162 can together define a track for a larger scissor lift or other lift devices 200. As depicted in FIG. 16, the third guide rail 166 is positioned approximately 46-48 inches (e.g., shown as $D_3$ in FIG. 16) away from the edge or outer surface of the platform structure 102. Accordingly, the spacing between the first guide rail 162 and the third guide rail 166 is about 40-44 inches (e.g., distance $D_3$ minus distance $D_1$). When a scissor or other lift device 200 having an outer perimeter of about 46-48 inches approaches the platform structure 102 of the charging system 100, the lift device 200 is positioned such that the wheels of the lift device 200 straddle the first guide rail 162 and third guide rail 166. As the wheels of the lift device 200 are typically positioned at the perimeter of the lift device 200, the spacing of between about 40-44 inches places the wheels laterally outward from each of the guide rails 162, 166. If the guide rails 162, 166 are elevated on the ramps 104, 106 and/or platform structure 102, the guide rails 162, 166 can then prevent deviation of the lift device 200 off the guide rails 162, 166 as the lift device 200 approaches the charging area 116, which is approximately centered below. In some examples, the target charging area 116 is slightly offset to one side of the chassis 206.

In some embodiments, the lift device 200 is configured to interact with the guide rails 162, 164, 166 to arrive at the charging area 116 to initiate the wireless charging process. For example, and as depicted in FIG. 4, the lift device 200 is equipped with one or more sensors 150 (e.g., a camera) in communication with the controller 224. The controller 224 receives feedback from the sensors 150 and communicate control a prime mover and/or a steering system of the lift device 200. The one or more sensors 150 scan, continuously, for the one or more guide rails 162, 164, 166. Upon detecting a guide rail 162, 164, 166, the controller 224 adjusts the position of the lift device 200, using feedback from the sensors 150, until the lift device 200 is positioned in a desired relationship with the one or more guide rails 162, 164, 166. For example, if the lift device 200 has a platform 208 and chassis 206 width of approximately 30-32 inches, the controller 224 adjusts the position of the lift device until the wheels straddle the first and second guide rails 162, 164. If the lift device 200 has a platform 208 and chassis 206 width of approximately 46-48 inches, the controller 224 adjusts the position of the lift device until the wheels of the lift device 200 straddle the first and third guide rails 162, 166. Once the appropriate lateral positioning relative to the guide rails 162, 164, 166 has been achieved, the controller 224 can continue to operate the lift device 200 to move longitudinally until the lift device 200 is correctly positioned above the charging area 116 and is receiving energy from the induction coil 114.

In some examples, and as depicted in FIG. 9, the platform structure 102 includes a pressure sensor or presence sensor, shown as mechanical actuator 170, that can activate the induction coil 114 upon detection of a lift device 200 above the charging area 116. The mechanical actuator 170 (e.g., a lever, a spring-biased input, pressure sensor, load sensor, etc.) can be positioned offset from the charging area 116, and corresponds with a position where one of four wheels of the lift device 200 would rest if the lift device 200 was positioned above the charging area 116. Accordingly, the mechanical actuator 170 can extend across both the second guide rail 164 and third guide rail 166, such that lift devices 200 of either prominently used size (e.g., 30-32 inches or 46-48 inches) will actuate or otherwise activate the mechanical actuator 170, which indicates to a controller 161 of the electrical cabinet 110 (see FIG. 19) that a lift device 200 is present and requires charging. In other embodiments, the mechanical actuator 170 is otherwise positioned (e.g., extending laterally across the entire width of the platform structure 102. In other embodiments, the charging system 100 uses a different type of sensor to identify the presence of a vehicle on the platform structure 102 and trigger activation of the induction coil 114 (e.g., a hall effect sensor, a break beam sensor, an ultrasonic distance sensor, a camera, etc.).

In response to receiving an indication that a lift device 200 is present on the platform structure 102 and within the charging area 116 from the mechanical actuator 170, the controller 161 of the electrical cabinet 110 executes a series of steps to begin the wireless charging process. For example, the controller 161 may control the power source (e.g., the battery assembly 112) to begin providing current to the induction coil 114. In some examples, the mechanical actuator 170 acts as a switch that closes a circuit to provide current to the induction coil 114 until the lift device 200 is moved from the mechanical actuator 170.

Figure 18:
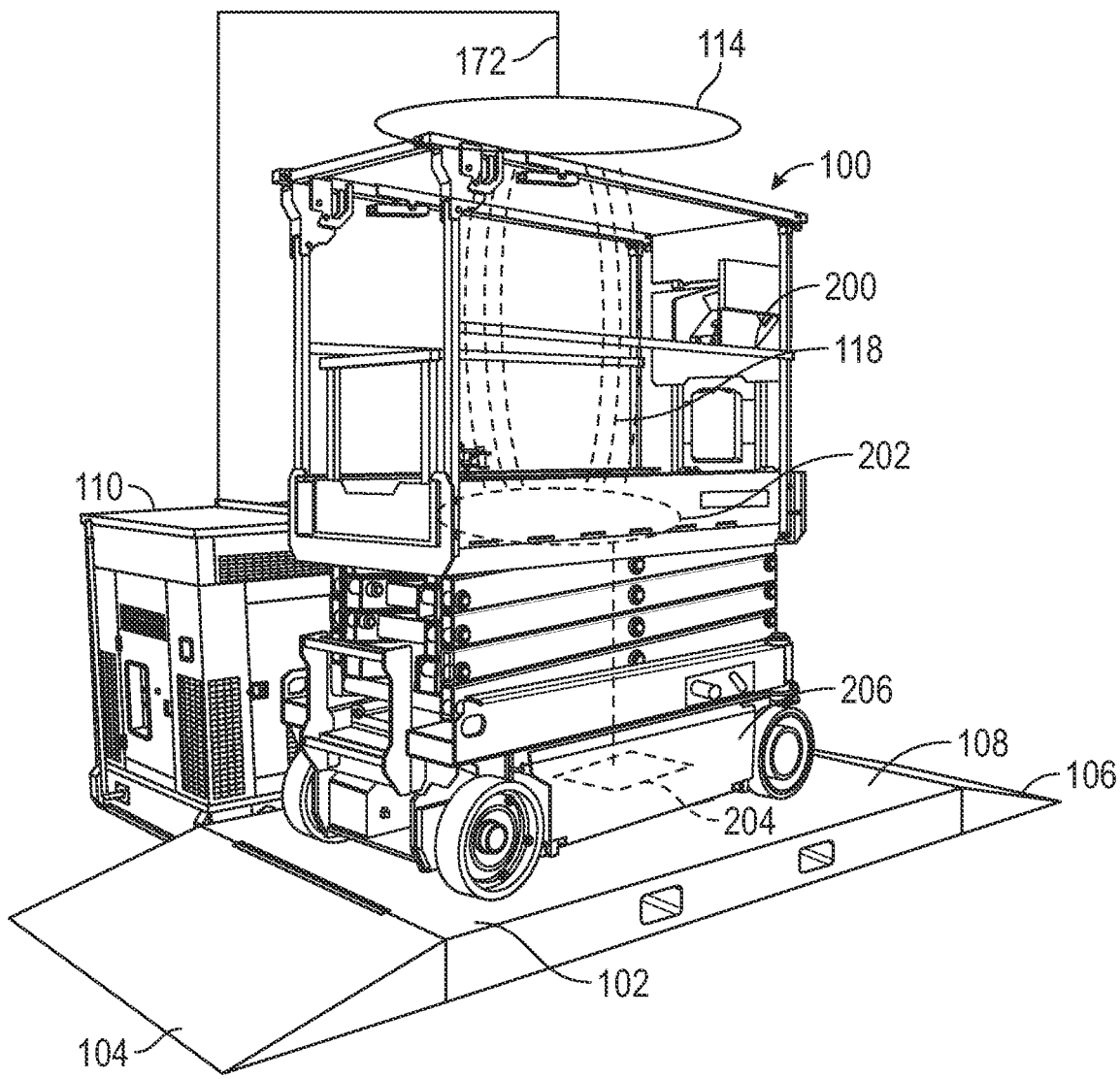
FIG. 18 is a perspective view of the platform charging unit of FIG. 15 including a hanging induction coil for charging a lift device, according to an exemplary embodiment.

In some embodiments, and as shown in FIG. 18, actuation of the mechanical actuator 170 can trigger the deployment and activation of a hanging induction coil 114. The hanging induction coil 114 may be powered by the electrical cabinet 110 and/or the battery assembly 112. The hanging induction coil 114 may be suspended from a ceiling, a support coupled to the electrical cabinet 110, or another elevated structure by a cable 172. Like the induction coil 114 positioned within the platform structure 102, the induction coil 114 is configured to receive current from a power source within or coupled with the electrical cabinet 110 and produce a magnetic field 118 that can be used by a lift device 200 or other equipment to wirelessly charge a battery 204 of the lift device 200.

The hanging induction coil 114 can be configured to interact with antenna coils 202 positioned at various different places on a lift device 200. For example, and as depicted in FIG. 18, the antenna coil 202 can be positioned upon or within the platform 208 of the lift device 200. In some embodiments, the hanging induction coil 114 can extend downwardly, into a safety rail structure, to a position near the platform 208. In some embodiments, a position of the hanging induction coil 114 is controlled by a winch that is powered by the electrical cabinet 110, such that a vertical position of the induction coil 114 can be adjustable. By way of example, the cable 172 may be wrapped around a drum coupled to an electric motor. The electric motor may be driven in a first direction to raise the hanging induction coil 114 and in a second direction to lower the hanging induction coil 114.

The hanging induction coil 114 and the induction coil 114 positioned within the platform structure 102 can be aligned along a common axis (e.g., the Z-axis). Accordingly, when the lift device 200 is positioned upon the platform structure 102 and above the charging area 116 (e.g., as detected by the mechanical actuator 170), the antenna coil 202 on the platform 208 is also positioned within a magnetic field 118 generated by the hanging induction coil 114. The current induced within the antenna coil 202 by the magnetic field 118 created by the hanging induction coil 114 can then be supplied to the battery 204 to charge the battery 204.

The charging system 100 can include both the hanging induction coil 114 and the embedded induction coil 114 positioned within the platform structure 102, which can increase the charging rate of the battery 204 by providing two separate current streams to the battery 204. In other examples, the embedded induction coil 114 is omitted and the hanging induction coil 114 is the only induction coil 114 used to perform the wireless charging function. In some examples, the electrical cabinet 110 can detect whether antenna coils 202 are positioned within a charging range of the embedded induction coil 114 and the hanging induction coil 114. Accordingly, the battery assembly 112 can selectively provide current to one or both of the induction coils 114, depending on the type and positioning of the lift device 200.

Figure 19:
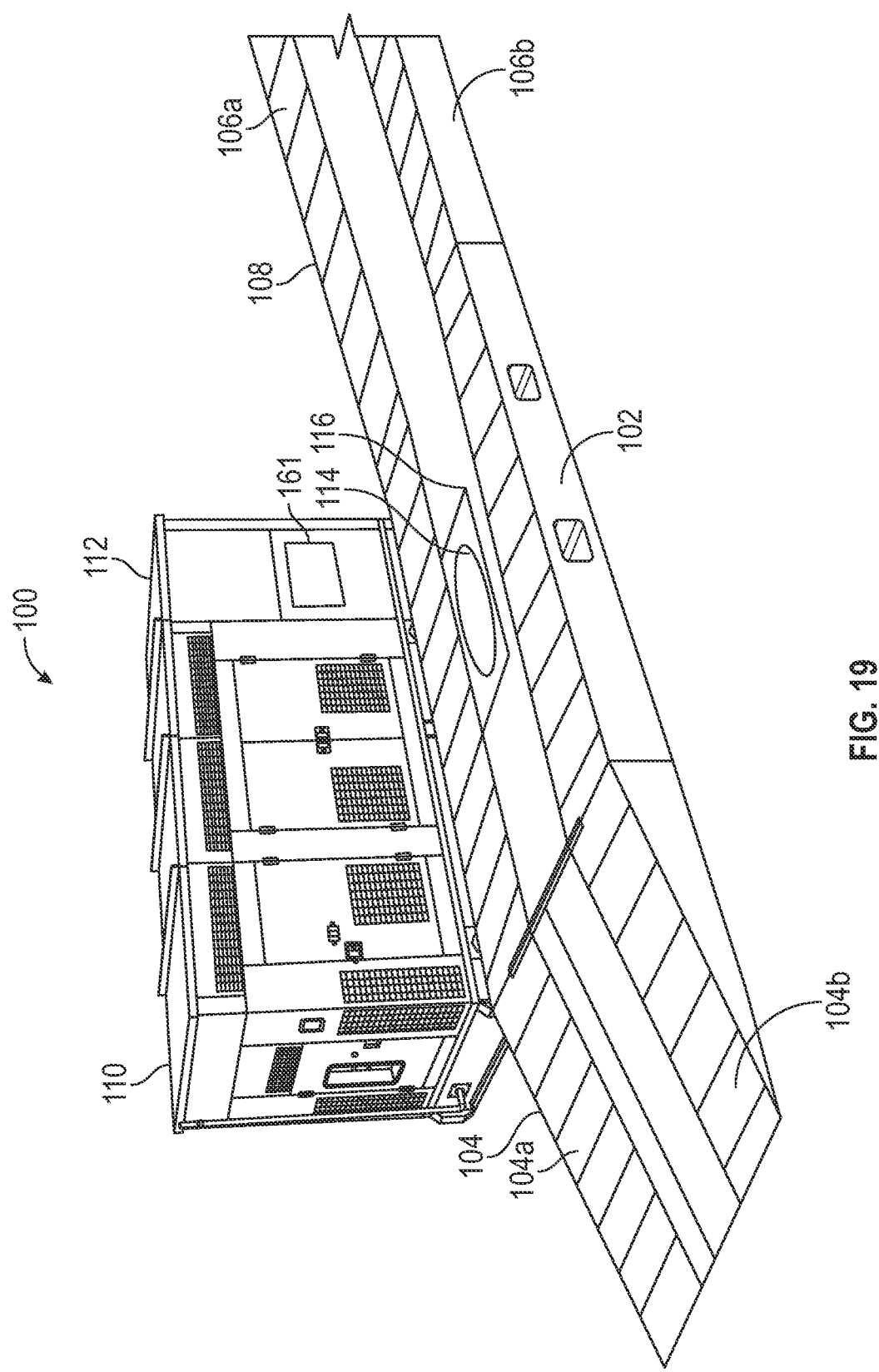
FIG. 19 is a perspective view of the platform charging unit of FIG. 1 including an endless track assembly, according to an exemplary embodiment.
Figure 20:
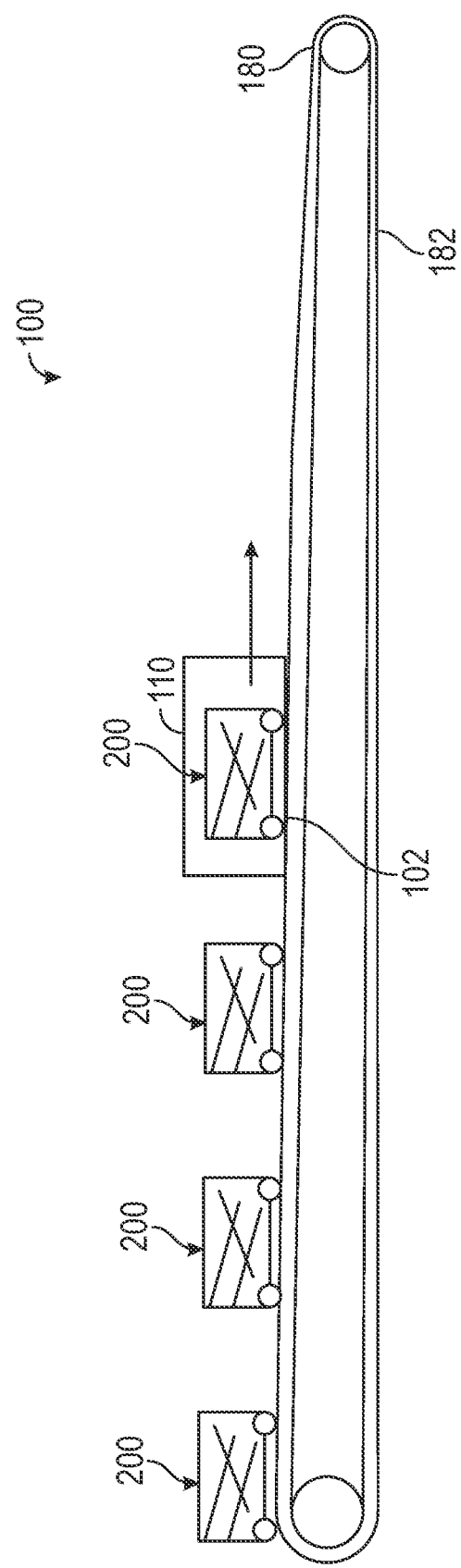
FIG. 20 is a schematic view of the platform charging unit of FIG. 19.

The platform structure 102 and ramps 104, 106 may include other locating features as well, as depicted in FIGS. 19 and 20. For example, the ramps 104, 106 and the platform structure 102 may include a set of continuous belts or tracks, which can be used by both the lift device 200 and the charging system 100 to locate a lift device 200 relative to the charging area 116. Like the guide rails 162, 164, 166, the controller 224 of the lift device 200 can adjust a position of the lift device 200 relative to the charging system to a desired location. In some examples, and as depicted in FIG. 19, the desired location is a position in which each of the wheels are positioned on one of the two tracks 104a, 104b, 106a, 106b extending along each ramp 104, 106 and across the platform structure 102.

The tracks 104a, 104b, 106a, 106b can then be used to position the lift device 200 relative to the charging area 116 to execute the wireless charging function. For example, and as depicted in FIG. 20, the tracks 104a, 104b, 106a, 106b may be driven by a winch 180. The winch 180 may be in communication with the controller 161 of the electrical cabinet, and may rotate the tracks 104a, 104b, 106a, 106b to pull a lift device 200 toward the charging area 116. As depicted in FIG. 20, the tracks 104a, 104b, 106a, 106b can be formed as two separate and endless tracks 182 that are each driven by a common winch 180 or sprocket system in a belt-style manner. The controller 161 can monitor a charging level of the lift device 200 positioned above the charging area 116 and can activate the winch 180 to move the lift device 200 being charged away from the charging area 116 so that another lift device 200 having a lower level of charge can then be positioned above the induction coil 114. In some examples, a series of lift devices 200 can be placed (e.g., parked) on the tracks 104a, 104b at the end of a workday. The controller 161 can then operate the winch 180 to position each of the lift devices 200 above the charging area 116 to complete the charging process overnight. Continued rotation of the winch 180 will then have each of the lift devices 200 positioned on the tracks 106a, 106b by the following morning, with all lift devices 200 charged and ready for daily use. Although shown as a winch 180 and tracks, various other towing mechanisms can be used with the charging system 100 as well. For example, in some embodiments, a tow rope is used to pull each lift device 200 relative to the platform structure 102. In still other examples, a floor chain interacts with an underside of the lift devices 200 and can pull the lift devices 200 onto and off of the platform structure 102. The tracks 104a, 104b, 106a, 106b can include raised boundaries to keep lift devices 200 aligned relative to the platform structure 102.

Modular Approach to Wireless Charging

Figure 21:
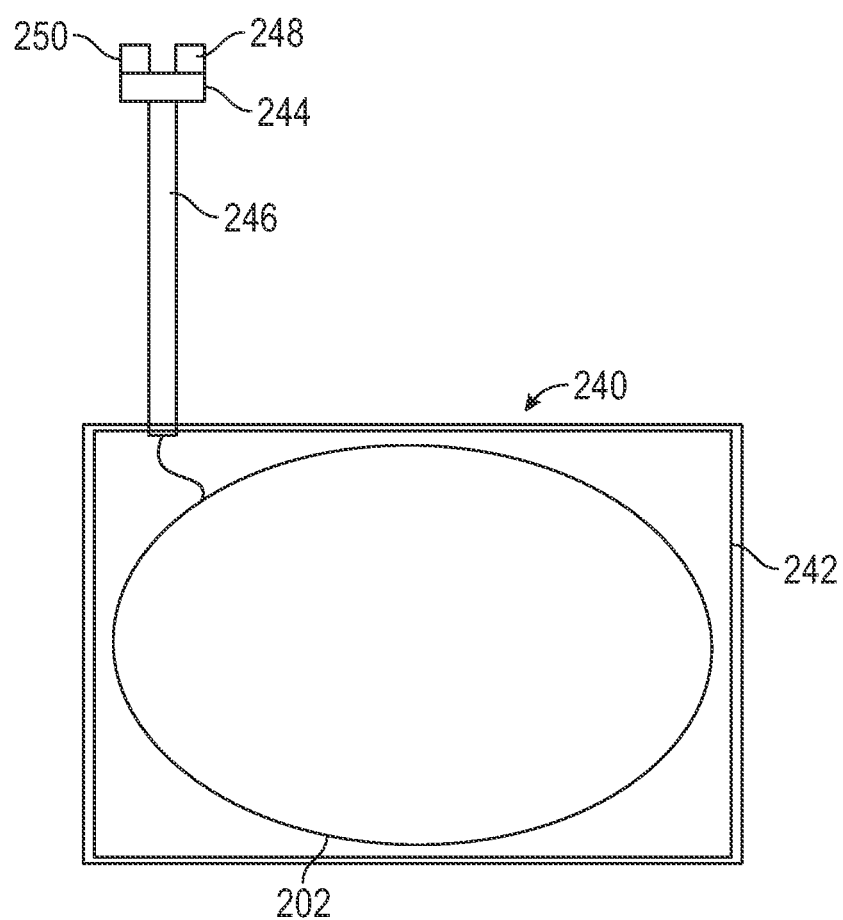
FIG. 21 is a schematic view of a modular antenna loop assembly that can be coupled to the lift of FIG. 2, according to an exemplary embodiment.

In some examples, and with reference to FIG. 21, the lift device 200 is customizable based upon characteristics of the charging system 100. For example, the antenna coil 202 can be part of a modular wireless charging assembly 240 or wireless charging interface that is supported by and selectively electrically coupled to the lift device 200. In some examples, the antenna coil 202 is received within a housing 242. The housing 242 can be formed from a hard polymer or other suitably electrically neutral material that does not significantly interfere with the magnetic field generated by the induction coil 114 within the charging system 100.

The housing 242 has a rectangular shape and is coupled (e.g., removably or fixedly) to a chassis 206 of a lift device 200. Specifically, the housing 242 is configured to be coupled to various different locations along the chassis 206 to facilitate a variety of wireless charging strategies. In some examples, the housing 242 includes one or more mounting flanges configured to receive fasteners that facilitate mounting the housing 242 at various locations on a lift device 200. For example, to configure the modular wireless charging assembly 240 for use with the charging system 100, the housing 242 can be mounted to an underside of the chassis 206 (e.g., such that the antenna coil 202 faces downward from the chassis 206). In some examples, multiple modular wireless charging assemblies 240 are coupled to a single lift device 200.

The modular wireless charging assembly 240 may be electrically coupled to the battery 204 of a lift device 200. For example, and as depicted in FIG. 9, the modular wireless charging assembly 240 includes a plug 244 that selectively electrically couples the antenna coil 202 to the battery 204. The plug 244 generally includes a positive terminal 248 (e.g., a first conductor) and a negative terminal 250 (e.g., a second conductor), and is positioned at a distal end of a cable 246 extending away from the housing 242. The plug 244 may be coupled to the battery 204 through a corresponding connector (e.g., a terminal or bus) that receives the plug 244. Because the plug 244 is in electrical communication with the antenna coil 202, placing the plug 244 in electrical communication with the induction coil 114 creates electrical communication between the antenna coil 202 and the battery 204 (e.g., through an inverter or other power converter that converts electrical energy between alternating current and direct current). Accordingly, current generated by the antenna coil 202 (e.g., by being present within the magnetic field generated by the induction coil 114) can be transmitted to the battery 204, which can then be recharged.

The modular wireless charging assembly 240 can also be arranged on the underside of a slab scissor lift device 200 or other type of lift device 200 based upon the size of the device. For example, and again with reference to FIG. 16, positioning of the modular wireless charging assembly 240 can be selected to so that modular wireless charging assembly 240 will be positioned adjacent and/or above the charging area 116. For example, the charging area 116 can be positioned approximately 15-16 inches (e.g., shown as $D_C$ in FIG. 16) from an edge of the platform structure 102 or from an edge of a guide rail on the platform structure 102. Accordingly, for lift devices 200 having a width between 30 and 32 inches, the modular wireless charging assembly 240 is positioned approximately centered upon the chassis 206. To accommodate this positioning of the charging area 116, the modular wireless charging assemblies 240 for larger slab scissors and/or other lift devices 200 can be offset to one side of the chassis 206. For example, lift devices 200 having a width of approximately 46-48 inches may offset the modular wireless charging assembly 240 approximately 15-16 inches inwardly from one side of the chassis 206. By laterally offsetting the position of the wireless charging assembly 240 in some lift devices 200, a single platform structure 102 having a consistent location of the charging area 116 may be suitable for charging many different sizes of lift device 200.

Camera-Based Positioning System

According to an exemplary embodiment, a charging system for a lift includes platform assembly having a platform structure and a ramp, where the ramp is coupled to a first side of the platform structure and extends away from the platform structure. The charging system includes an induction coil received within the platform structure and positioned near an upper surface of the platform. The induction coil is configured to receive electricity from an energy source and generate a magnetic field that extends upwardly, through the upper surface of the platform. The upper surface of the platform, above the induction coil, includes a visual indicator to identify a location of the induction coil within the platform.

Figure 22:
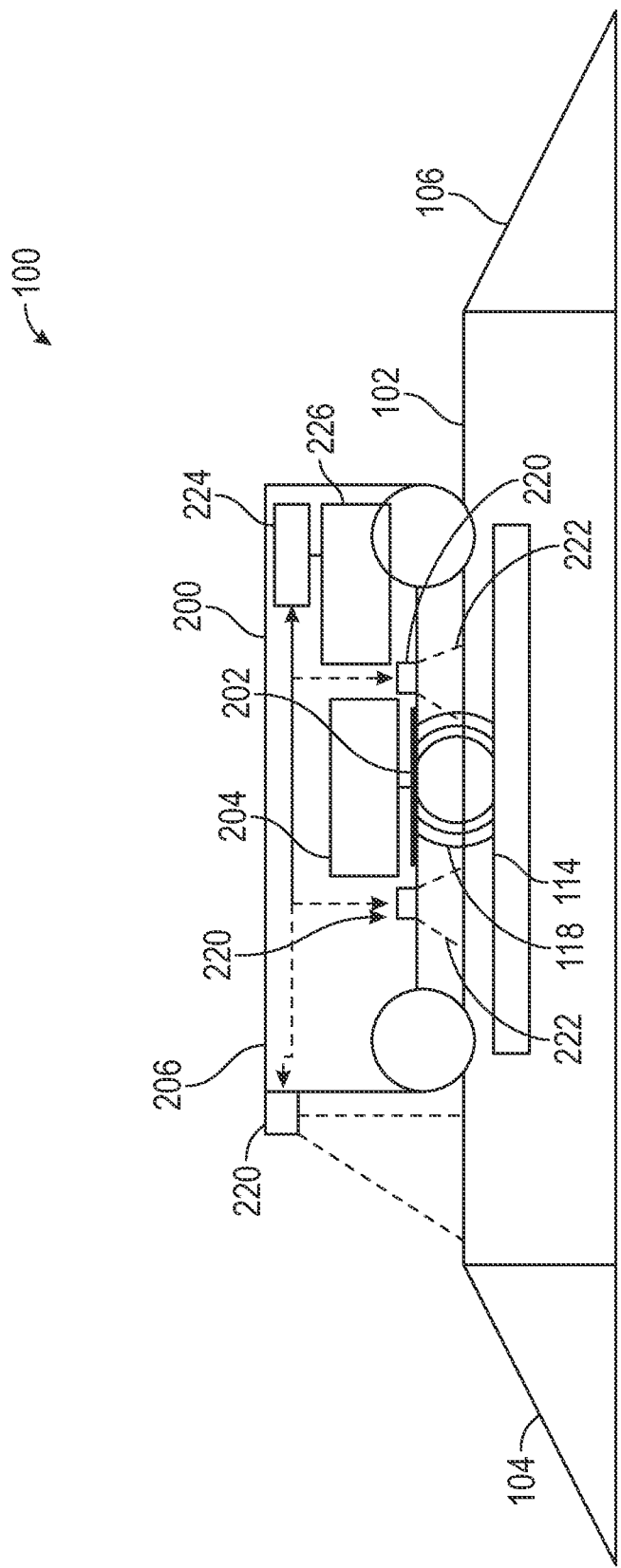
FIG. 22 is a schematic view of the lift of FIG. 2 including a camera positioning system to position the lift within a charging area of the platform charging unit of FIG. 1, according to an exemplary embodiment.

Referring now to FIG. 22, the lift device 200 is depicted with a camera positioning system to facilitate orienting the lift device 200 in a proper or desired position relative to the charging area 116 to perform a wireless charging function using the induction coil 114 and antenna coil 202. The camera positioning system facilitates automatically or semi-automatically directing the lift device 200 to a position above the charging area 116 so that an optimal charging function can be performed.

The camera positioning system includes one or more image sensors or image capturing devices, shown as cameras 220, positioned about the chassis 206 of the lift device 200. The cameras 220 can be positioned at various different places about the lift device 200, including below the lift device 200, on top of the lift device 200, and/or on one or more corners of the chassis 206. The cameras 220 generally have a field of view 222 that extends away from the camera 220 and downward, toward an area below the lift device 200. The field of view 222 is directed downward to try to capture visual indicators on the charging system 100 and platform structure 102 to execute a charging function.

The cameras 220 are all in communication with a controller 224. The controller 224 can be a central processing unit (CPU) or processor that serves as a master controller for the lift device 200. The controller 224 is configured to receive information from the one or more cameras 220 and control the lift device 200 to move based upon the feedback received from the cameras 220. The controller 224 may be in communication with a prime mover 226 (e.g., an electric motor, etc.) and a steering system of the lift device 200, such that the controller 224 can adjust a relative position of the lift device 200 based upon feedback received from the cameras 220.

The cameras 220 and the controller 224 cooperate to position the lift device 200 relative to the charging system 100 to execute a wireless charging process in an autonomous or semi-autonomous fashion. The cameras 220 monitor, via their fields of view 222, the ground below the lift device 200 for visual indications that a charging area 116 is nearby. In some examples, the cameras 220 continuously monitor for indications that a charging system 100 is nearby. In other examples, a user can provide an input to the lift device 200 that a charging process will soon be performed, and the cameras 220 will activate upon receiving this input. In still other examples, the cameras 220 automatically initiate and begin scanning when the charge level of the battery 204 falls below a threshold level (e.g., 10% remaining lift, 5% remaining life, etc.). In still other examples, the cameras 220 activate when the lift device passes into a range nearby a charging system 100, as detected by a sensor (e.g., a global positioning system, etc.).

Upon activation, the cameras 220 and controller 224 begin to monitor for indications that a charging system 100 is nearby. When the coloration or pattern associated with a charging area is detected by one of the cameras 220, the lift device 200 can transition to an autonomous driving mode to complete the positioning process. The cameras 220 provide feedback to the controller 224, which can determine necessary adjustments needed by the lift device 200 in order to arrive at the appropriate position on the charging system 100.

A variety of different visual signals (e.g., visual indicators) can be provided on the charging system 100 to facilitate performing the positioning process using the cameras 220. For example, the charging area 116 may be provided with a different color and/or pattern that signals the location of the charging area 116. In other examples, specific patterns can be used to provide a direction and position of the charging area 116 to the cameras 220 relative to the lift device 200. For example, arrows or other insignias can be painted or otherwise applied to the ramps 104, 106 and/or the upper surface 108 of the platform structure 102 to facilitate locating the exact location of the charging area 116. In still other examples, a variety of signals can be provided on the electrical cabinet 110 as well.

As the lift device 200 approaches the charging area 116, the controller 224 can control different components of the lift device 200 to complete the positioning process. The controller 224 can continuously monitor a relative position of the lift device 200 relative to the charging area 116. If the positioning of the lift device 200 relative to the charging area 116 is outside of a threshold value, the controller 224 will activate the prime mover 226 and adjust a steering system of the lift device 200 to drive the lift device 200 forward, backward, or in a direction toward the charging area 116. The controller 224 can continue to move the lift device 200 until it arrives at a location within the charging area 116, as detected by the cameras 220 and/or determined by the controller 224. In some examples, the controller 224 also monitors the battery 204 and can determine when the battery 204 begins charging. Accordingly, when the battery 204 begins charging above a threshold rate, the controller 224 determines that the lift device 200 has reached a designated charging area 116 and does not need to move, and the prime mover 226 can be deactivated.

In some examples, the cameras 220 can project a live feed to the operator, who may be positioned on the platform 208 of the lift device 200. A display positioned within the platform area can be used to project the live feed of the cameras 220, which can then be used by the operator to steer the lift device 200 to the charging area 116. The operator can control the prime mover 226 and steering system from the platform 208, such that an operator can manually position the lift device 200 if needed.

In some examples, the camera positioning system can be configured to store information related to the charging system 100. For example, the camera positioning system can be configured to recognize distinctive features associated with the target charging area 116 and can then subsequently control the operation of the lift device 200 based upon recognized and learned checkpoints. For example, if the camera positioning system detects that the charging area 116 is denoted by an orange area, the controller 224 can then store this information and search for an orange area in the future to help position the lift device 200 relative to the target area. The controller 224 can further command the cameras 220 to capture images of the surrounding location upon receiving an indication that the battery 204 is charging.

Parking Ballard

At least one embodiment relates to a charging system for a lift that includes a platform assembly having a platform structure and a ramp. The ramp is coupled to a first side of the platform structure and extends away from the platform structure. The charging system includes a first induction coil received within the platform structure and positioned near an upper surface of the platform. The first induction coil is configured to receive electricity from an energy source and generate a magnetic field that extends upwardly, through the upper surface of the platform. A parking bollard is electrically coupled to the energy source and includes a second induction coil. The second induction coil is configured to receive electricity from the energy source and generate a magnetic field that extends away from the parking bollard.

In some embodiments, the charging system includes a second parking bollard, the second parking bollard including a third induction coil electrically coupled to the energy source.

In some embodiments, the parking bollard and the second parking bollard are each coupled to the platform assembly.

At least one embodiment relates to a charging system for a lift including a platform assembly having a platform structure and a ramp. The ramp is coupled to a first side of the platform structure and extends away from the platform structure. A first induction coil is received within the platform structure and positioned near an upper surface of the platform. The first induction coil is configured to receive electricity from an energy source and generate a magnetic field that extends upwardly, through the upper surface of the platform. A parking bollard is electrically coupled to the energy source and includes a second induction coil. The second induction coil is configured to receive electricity from the energy source and generate a magnetic field that extends away from the parking bollard.

Figure 23:
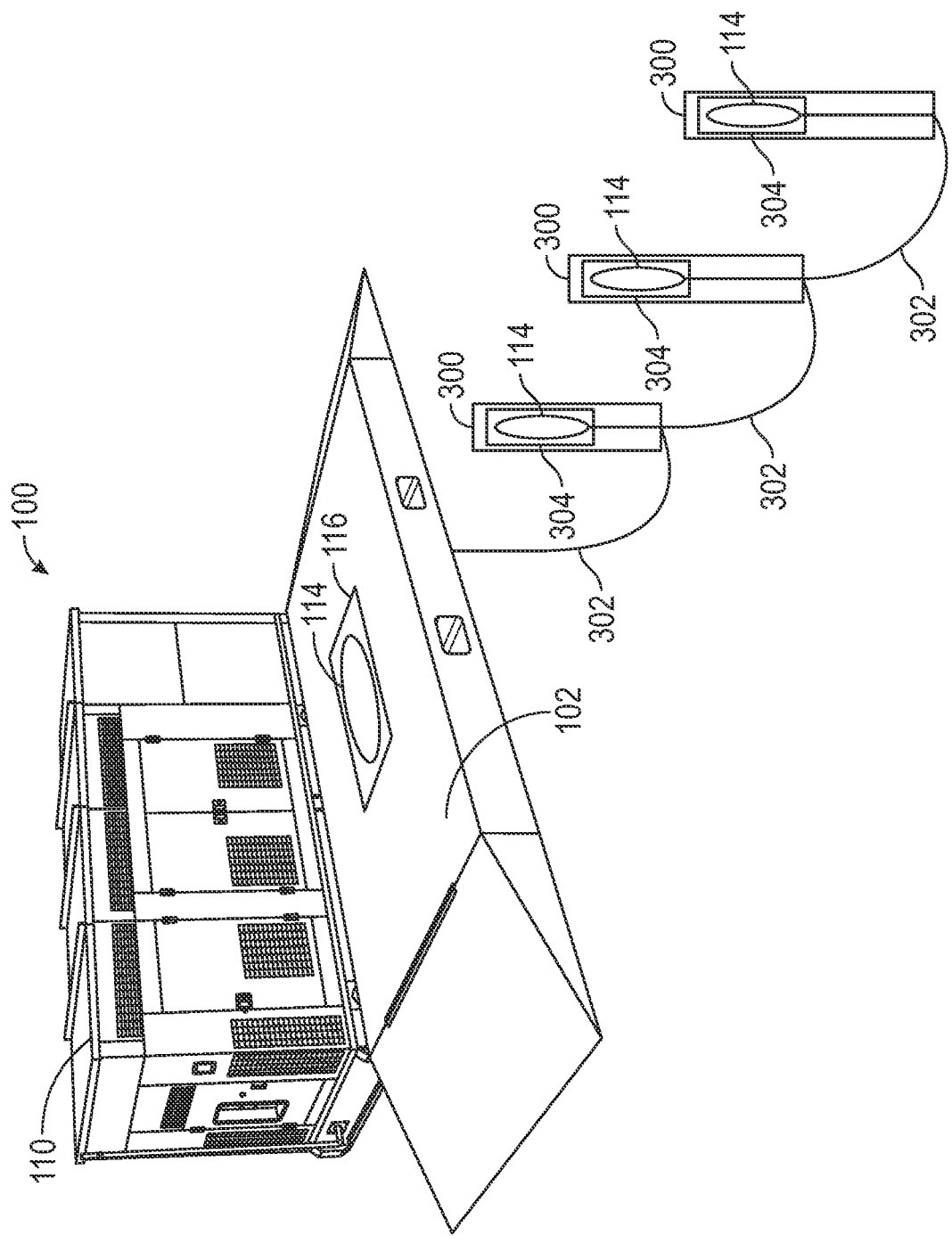
FIG. 23 is a perspective view of the platform charging unit of FIG. 1 including a series of parking bollards each having wireless charging capabilities, according to an exemplary embodiment.

Referring now to FIG. 23, the charging system 100 can also include one or more parking bollards 300. The parking bollards 300 can have a generally cylindrical shape, and extend upwardly, away from a ground surface. In some examples, the parking bollards 300 can be rigidly coupled to the ground surface (e.g., using cement, etc.). In other examples, the parking bollards 300 can be freely movable relative to the platform structure 102, such that the spacing and positioning of the parking bollards 300 is readily adjustable. The parking bollards 300 can each be coupled to the platform structure 102 and electrical cabinet 110 using one or more cables 302, which can create a wired connection between a power source (e.g., the battery assembly 112 or utility source) and the parking bollards 300.

The parking bollards 300 can each be designed to perform a wireless charging process with one or more lift devices 200. As depicted in FIG. 23, the parking bollards 300 each extend upwardly, to a similar height. The parking bollards 300 each include an induction coil 114 that is positioned within a housing 304. The housing 304 can be formed within the parking bollard 300 or can be removably or otherwise coupled to the parking bollard 300. The induction coil 114 is electrically coupled with the electrical cabinet 110 using the cable 302, so that current from the power source can be supplied to the induction coils 114 within the bollard 300.

Figure 24:
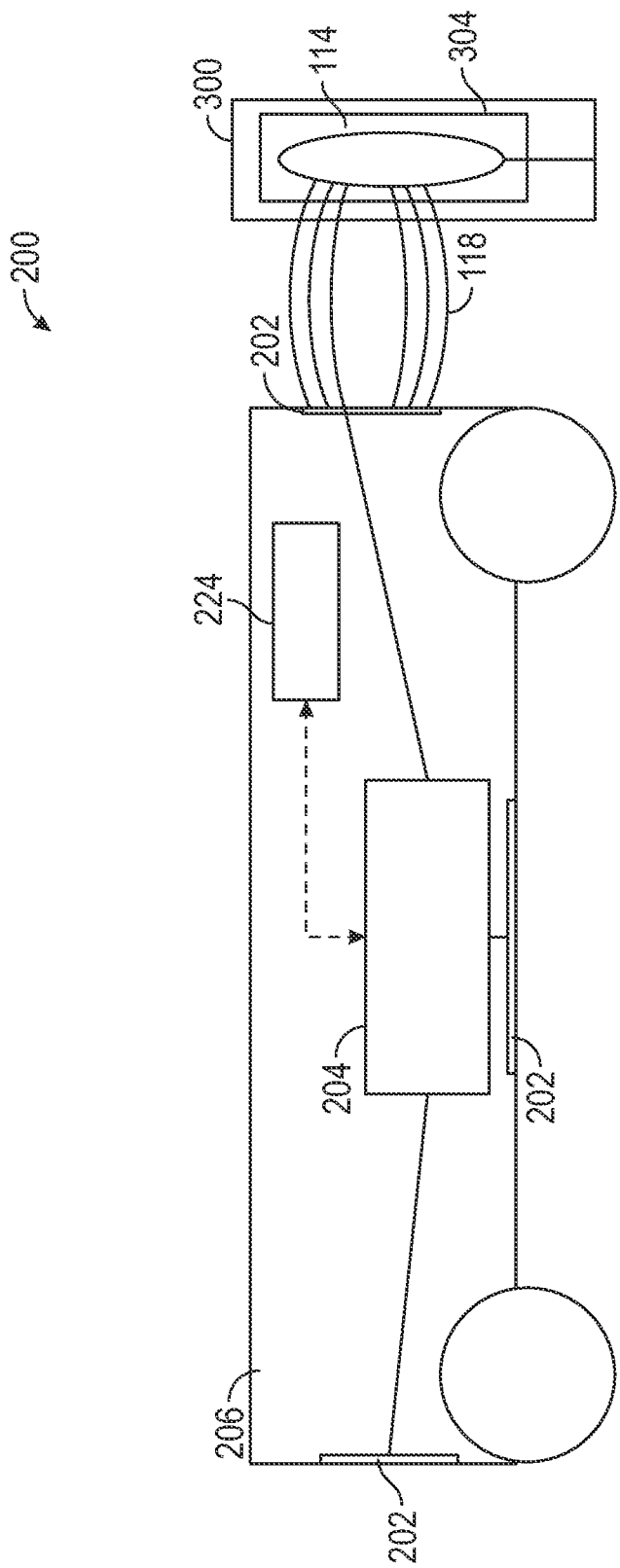
FIG. 24 is a schematic view of the lift of FIG. 2 interacting with a parking bollard of FIG. 23.

The parking bollard 300 performs the wireless charging process in a manner similar to the platform structure 102. As depicted in FIG. 24, a lift device 200 approaches the parking bollard 300. As the lift device 200 approaches the parking bollard 300, the induction coil 114 within the parking bollard 300 can be supplied with electrical current. In some examples, the parking bollard 300 can communicate the presence of a lift device 200 within range, as the antenna coil 202 on the lift device 200 may induce a back current in the induction coil 114 of the parking bollard 300. When the lift device 200 is positioned in close proximity to the parking bollard 300 (e.g., within about 1 foot, within 6 inches, etc.), the induction coil 114 can be energized. Energizing the induction coil 114 generates a magnetic field 118, which extends toward and into an area occupied by the antenna coil 202 that is positioned on the chassis 206 of the lift device 200. The antenna coil 202 can be positioned in multiple different locations about the chassis 206, including the bottom of the chassis 206, a front of the chassis 206, rear of the chassis 206, a side of the chassis 206, an underside of or within the platform 208, or other suitable locations. When one of the antenna coils 202 is positioned within the magnetic field generated by the induction coil 114 of the parking bollard 300, a current is induced within the antenna coil 202 that can then be transmitted to and stored by the battery 204 to perform a charging process. In some examples, the lift device 200 includes a controller 224 that is configured to monitor a charging status of the battery 204, and can move the lift device 200 in response to detecting that the battery 204 is not charging correctly or has reached a full charge. In some examples, multiple parking bollards 300 can be positioned in an array that will allow multiple antenna coils 202 on the same lift device 200 to be positioned within separate magnetic fields 118 simultaneously. By inducing current in multiple antenna coils 202 on the lift device 200 simultaneously, the rate of recharge can be increased.

Figure 25:
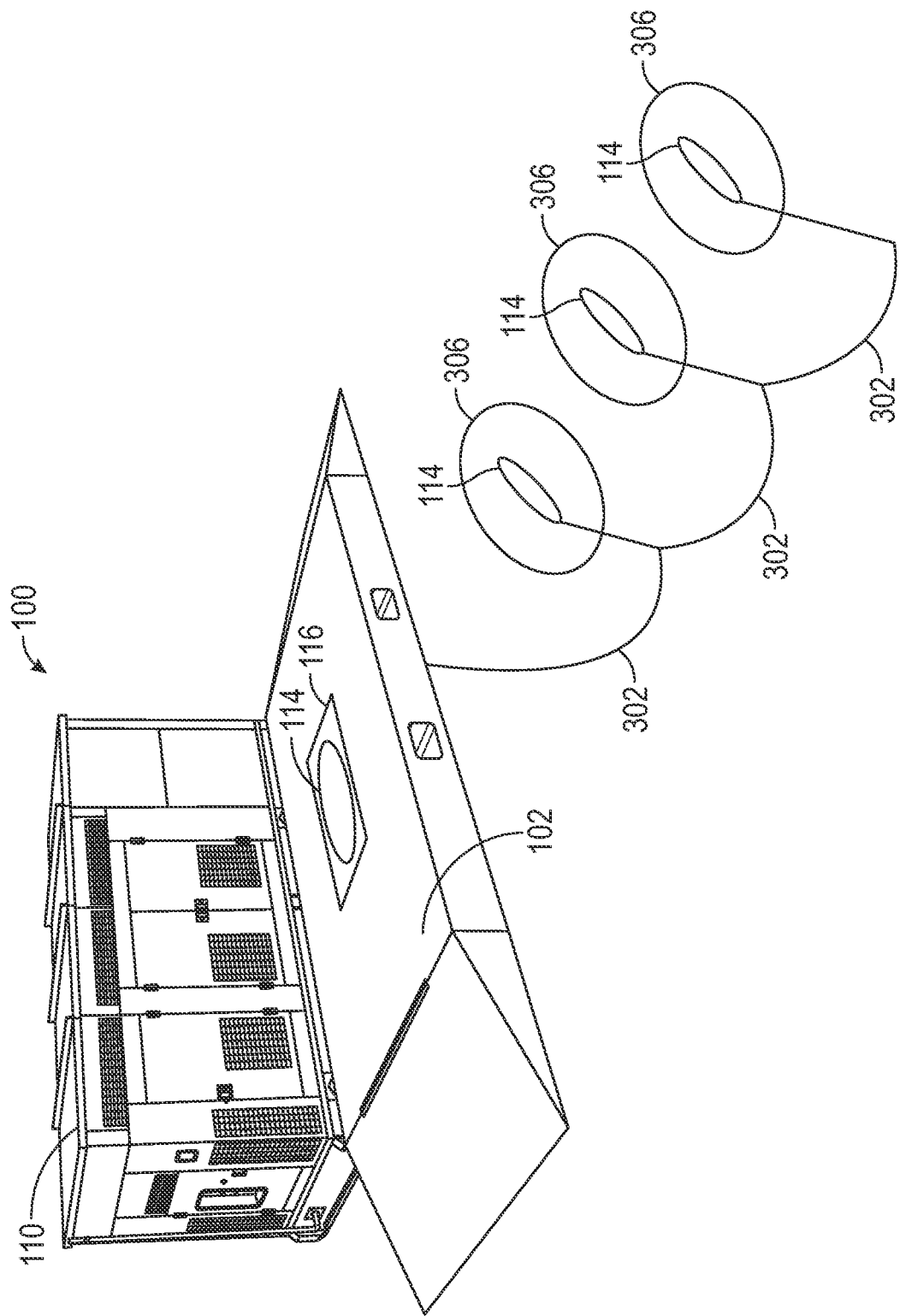
FIG. 25 is a perspective view of the platform charging unit of FIG. 1 including a series of wireless charging pads, according to an exemplary embodiment.
Figure 26:
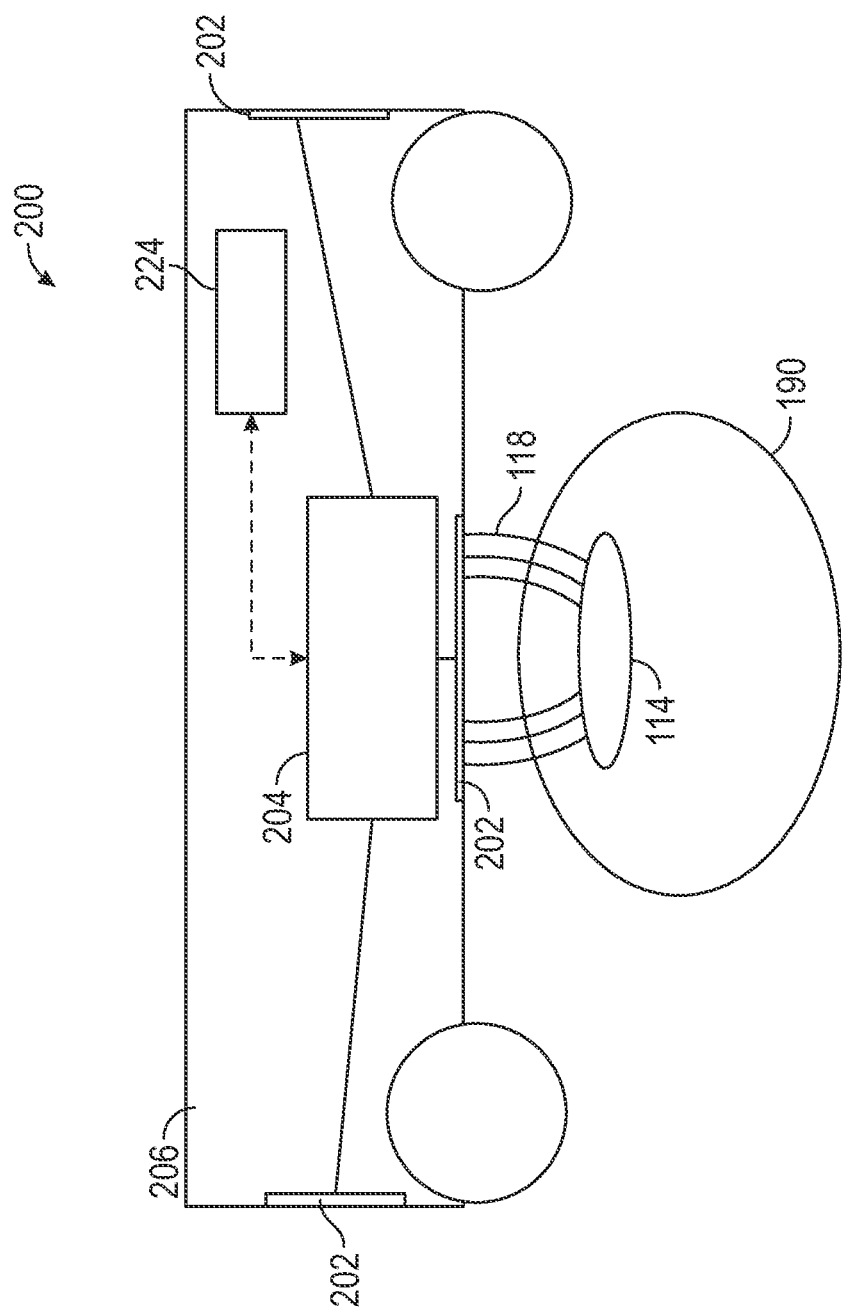
FIG. 26 is a schematic view of the lift of FIG. 2 interacting with the wireless charging pad of FIG. 25.

Referring now to FIGS. 25 and 26, the charging system 100 can also include additional auxiliary charging systems. For example, one or more charging pads 306 can have a generally circular shape, and can be spaced apart from one another and from the platform structure 102 to define a series of additional charging areas. In some examples, the charging pads 306 can be rigidly coupled to the ground surface (e.g., using cement, etc.). In other examples, the charging pads 306 can be freely movable relative to the platform structure 102, such that the spacing and positioning of the charging pads 306 is readily adjustable. The charging pads 306 can each be coupled to the platform structure 102 and electrical cabinet 110 using one or more cables 302, which can create a wired connection between a power source (e.g., the battery assembly 112 or utility source) and the charging pads 306.

The charging pads 306 can each be designed to perform a wireless charging process with one or more lift devices 200. As depicted in FIG. 25, the charging pads 306 are each formed as a generally flat mat. The charging pads 306 each include an induction coil 114 that is positioned within the charging pad 306 (e.g., embedded or formed integrally within, for example). The induction coil 114 is electrically coupled with the electrical cabinet 110 using the cable 302, so that current from the power source can be supplied to the induction coils 114 within the charging pad 306.

The charging pad 306 performs the wireless charging process in a manner similar to the parking bollard 300 and the platform structure 102. As depicted in FIG. 26, a lift device 200 approaches the charging pad 306. As the lift device 200 approaches the charging pad 306, the induction coil 114 within the charging pad 306 can be supplied with electrical current. In some examples, the charging pad 306 can communicate the presence of a lift device 200 within range, as the antenna coil 202 on the lift device 200 may induce a back current in the induction coil 114 of the charging pad 306. When the lift device 200 and an antenna coil 202 of the lift device 200 is positioned in close proximity to the charging pad 306 (e.g., within about 1 foot, within 6 inches, etc.), the induction coil 114 can be energized. Energizing the induction coil 114 generates a magnetic field 118, which extends toward and into an area occupied by the antenna coil 202 that is positioned on the chassis 206 of the lift device 200. The antenna coil 202 can be positioned along or near a bottom of the chassis 206 or along or near a bottom of the platform 208 to accommodate charging with the charging pad 306. When one of the antenna coils 202 is positioned within the magnetic field 118 generated by the induction coil 114 of the charging pad 306, a current is induced within the antenna coil 202 that can then be transmitted to and stored by the battery 204 to perform a charging process. In some examples, the lift device 200 includes a controller 224 that is configured to monitor a charging status of the battery 204, and can move the lift device 200 in response to detecting that the battery 204 is not charging correctly or has reached a full charge. In some examples, multiple charging pads 306 can be positioned in an array that will allow multiple antenna coils 202 on the same lift device 200 to be positioned within separate magnetic fields 118 simultaneously. By inducing current in multiple antenna coils 202 on the lift device 200 simultaneously, the rate of recharge can be increased.

Figure 27:
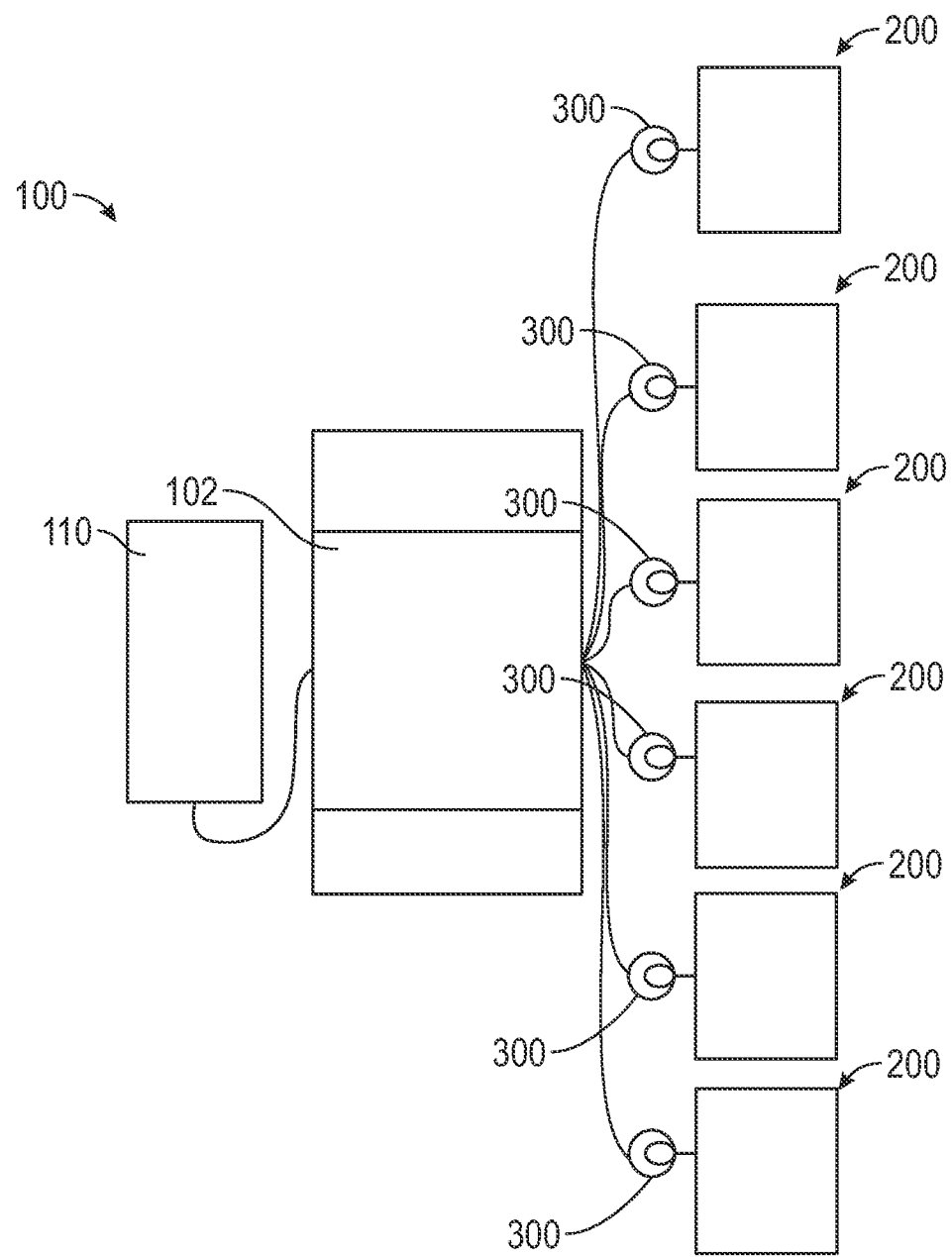
FIG. 27 is a schematic view of multiple lifts of FIG. 2 interacting with the platform charging unit of FIG. 25.
Figure 28:
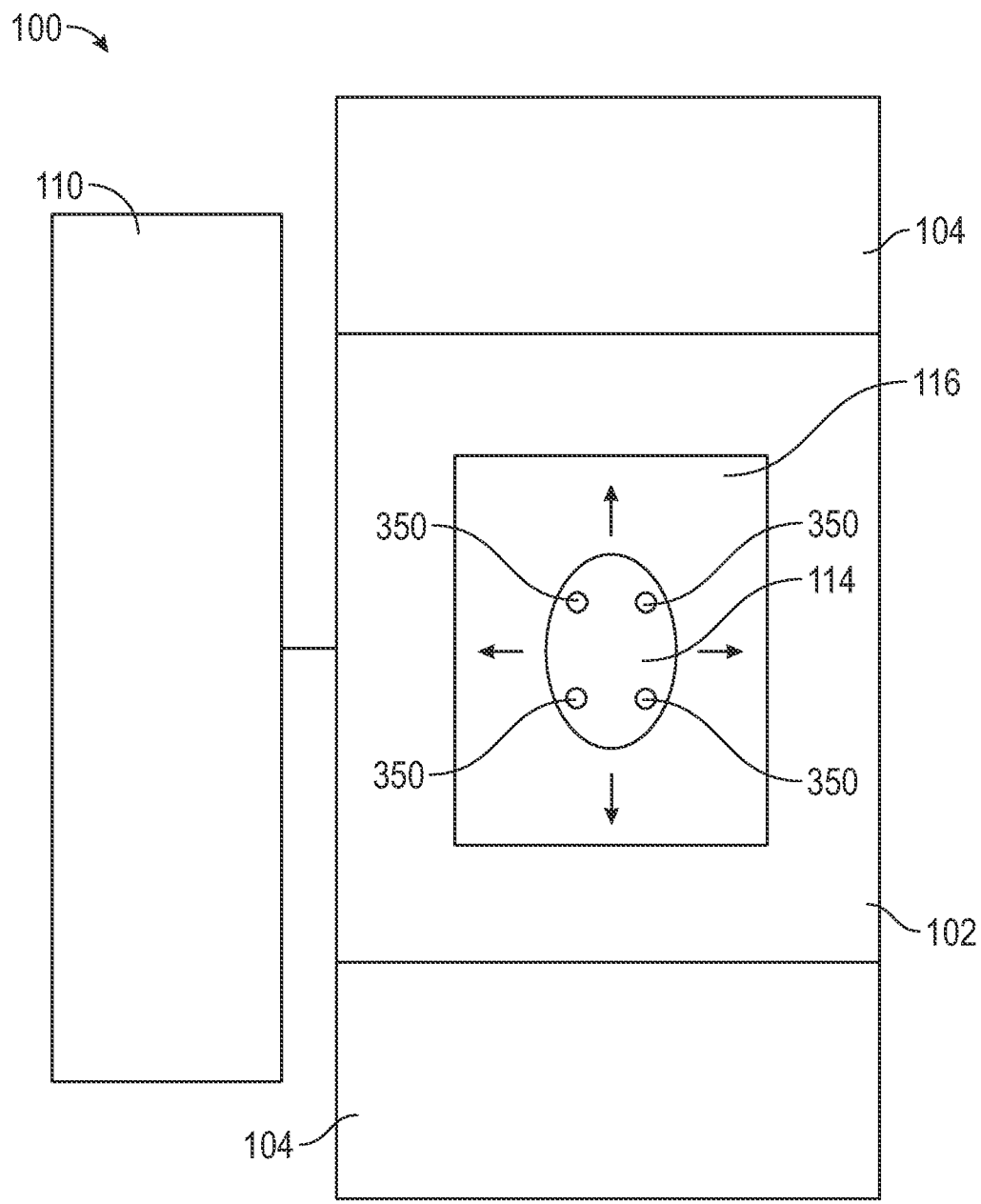
FIG. 28 is a top view of the platform charging unit of FIG. 1 including a magnetic positioning system, according to an exemplary embodiment.

Referring now to FIG. 27, the charging system 100 can be used to recharge a fleet of lift devices 200 simultaneously. Six or more lift devices 200 can each be aligned adjacent to a parking bollard 300 (or charging pad 306) to be wirelessly charged by the charging system 100. As depicted, the parking bollards 300 can be spaced apart from one another approximately evenly so that each lift device 200 can have a dedicated parking bollard 300 for wireless charging. Additionally, although shown with a platform structure 102, in some embodiments, the charging system 100 can omit the platform structure 102 altogether, such that the parking bollards 300 are each coupled directly to the electrical cabinet 110 and are directly powered by the energy source (e.g., the battery assembly 112). Additionally, although depicted with six parking bollards 300, the charging system 100 can be equipped with more or less bollards 300 or charging pads 306. In some examples, the charging system 100 can include both parking bollards 300 and charging pads 306.

Self-Aligning Charging Interface

At least one embodiment relates to a charging system for a lift including a platform assembly having a platform structure and a ramp. The ramp is coupled to a first side of the platform structure and extends away from the platform structure. An induction coil is received within the platform structure and positioned near an upper surface of the platform. The induction coil is configured to receive electricity from an energy source and generate a magnetic field that extends upwardly, through the upper surface of the platform. The lift includes a chassis, a battery pack, and an antenna loop positioned near a bottom of the chassis. The antenna loop is configured to induce a current upon exposure to the magnetic field. The antenna loop is configured to transmit the induced current to the battery pack to charge the battery pack.

In some embodiments, the charging system includes a height adjuster coupled to the induction coil. The height adjuster is configured to raise the induction coil above and away from the surface of the platform assembly to reduce an air gap between the induction coil and the antenna loop.

In some embodiments, the charging system includes a height adjuster coupled to the antenna loop. The height adjuster is configured to lower the antenna loop down and away from the bottom of the chassis to reduce an air gap between the induction coil and the antenna loop.

At least one embodiment relates to a charging system for a lift including a platform assembly having a platform structure and a ramp. The ramp is coupled to a first side of the platform structure and extends away from the platform structure. An induction coil is received within the platform structure and positioned near an upper surface of the platform. The induction coil is configured to receive electricity from an energy source and generate a magnetic field that extends upwardly, through the upper surface of the platform. The charging system includes an alignment system including a first magnet positioned on the induction coil, a second magnet positioned on the antenna loop and with a magnetic pole facing the first magnet that opposed a magnetic pole of the first magnet, such that the first and second magnets attract one another. The first magnet and second magnet have a stable position in which the antenna loop is positioned within the magnetic field generated by the induction coil.

In some embodiments, the platform assembly further includes a charging area containing the induction coil. The induction coil is configured to freely move within a plane of the charging area.

Referring now to FIGS. 28-31, the induction coil 114 and the antenna coil 202 can be configured to align themselves using passive or active measures to ensure proper positioning. Because the efficiency of the wireless charging system and the strength of the induced current in antenna coil 202 depends on its position relative to the induction coil 114, accurate positioning may facilitate a strong and stable induced current is generated/received by the induction coil 114 and the antenna coil 202, respectively. In some examples, proper alignment facilitates reduced coil size while transmitting the same level of power as compared to a system with more flexible alignment demands. In such a system without proper alignment, the coils must be enlarged and the magnetic field itself enlarged to ensure sufficient power is still being provided to the improperly aligned receiving antenna.

In some examples, passive alignment of the induction coil 114 and the antenna coil 202 can performed using one or more magnets, shown as magnets 350 and 352. The induction coil 114 and/or the antenna coil 202 may be configured to freely move within the charging area 116, such that the attractive magnetic force 230 between the corresponding magnet pairs passively moves the induction coil 114 and antenna coil 202 into proper alignment. In some examples, the antenna coil 202 is located in a fixed position, and only the induction coil 114 is permitted to move to ensure properly. Still in other examples, the antenna coil 202 is configured to move while the induction coil 114 is stationary. While FIG. 27 shows an arrangement of four magnets 350 in a rectangular pattern, it should be understood that the number and arrangement of the magnets 350 (and corresponding magnets 352) can vary without departing from the scope of this disclosure.

During operation, the antenna coil 202 may be roughly positioned by a user (via movement of the lift device 200) over the charging area 116, at which point the magnets 350 can align the induction coil 114 with the antenna coil 202, which may include a corresponding set of magnets 352. The corresponding magnet pairs can be positioned with opposing polls facing each other to generate the attractive magnetic force 230 between the corresponding magnets in a pairing. The magnets 350, 352 may be manufactured alignment magnet pairs that have stable preferred positions relative to one another. An alignment magnet may include multiple sections where the polarity differs between each section according to a pattern that is mirrored in the corresponding magnet. Specific arrangements of the polarities in an alignment magnet pair can result in a pair of magnets with a preferred positioning and orientation. As the lift device, including the antenna coil 202 moves into the charging area 116, the alignment magnets 352 of the lift device and the alignment magnets 350 of the induction coil 114 can move into their preferred stable positioning which in turn can properly align the coils. The magnets 350, 352 may also include permanent magnets (neodymium ion boron, samarium cobalt, alnico, and ceramic/ferrite magnets), temporary magnets, electromagnets, or any combination thereof. For example, the induction coil 114 may include a set of permanent magnets while the antenna coil 202 may only include a set of temporary magnets. For another example, when magnets 350, 352 are electromagnets, the magnets 350, 352 may be configured to be magnetized only during an initial alignment phase, for example when the lift device 200 is first roughly positioned on the platform structure 102. The electromagnets 350, 352 can then be magnetized and precisely align the induction coil 114 and the antenna coil 202. The magnets 350, 352 may be then be demagnetized, which can ensure they do not interfere with the wireless charging.

In some examples, the induction coil 114 and the antenna coil 202 may use active positioning methods to ensure proper alignment. Active positioning can involve sensing one or more charging parameters and actively adjusting the position of the coils to until the parameter meets a desired level. For example, active positioning methods may include measuring the induced current generated by antenna coil 202 and actively adjusting the position of the induction coil 114, the antenna coil 202, or both, until the measured induced current is at a desired level. Other measured parameters may be the strength of the magnetic field, the power draw, the data transfer rate, etc. For example, referring to FIG. 27, induction coil 114 may move along an x-axis and a y-axis within the charging area 116 based on the measured current produced by the antenna coil 202 when positioned at least partially over the induction coil 114. In some examples, this motion may be provided by one or more magnets, such as magnets 350, 352. In some examples, the induction coil 114 and/or the antenna coil 202 may be motorized to facilitate movement. Movement may also be achieved via a system of belts, pulleys, tracks, etc. In some examples, active alignment can include the wireless charging system assuming control over the movement of lift device 200 and using its tractive elements (wheels, tracks, etc.) to accurately position the antenna coil 202 over the induction coil 114 after being roughly positioned by an operator (i.e., human, autopilot system, etc.).

Figure 29:
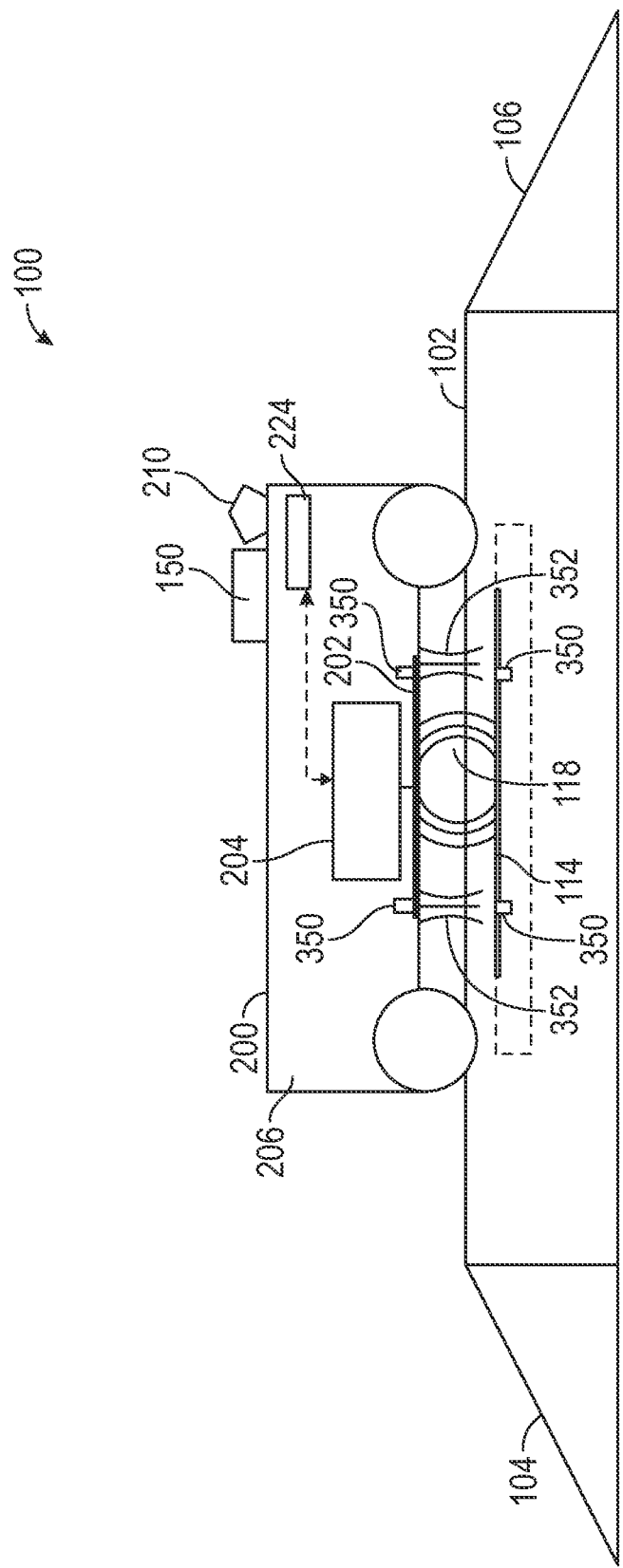
FIG. 29 is a schematic view of the lift of FIG. 2 positioned on the platform charging unit of FIG. 28.
Figure 30:
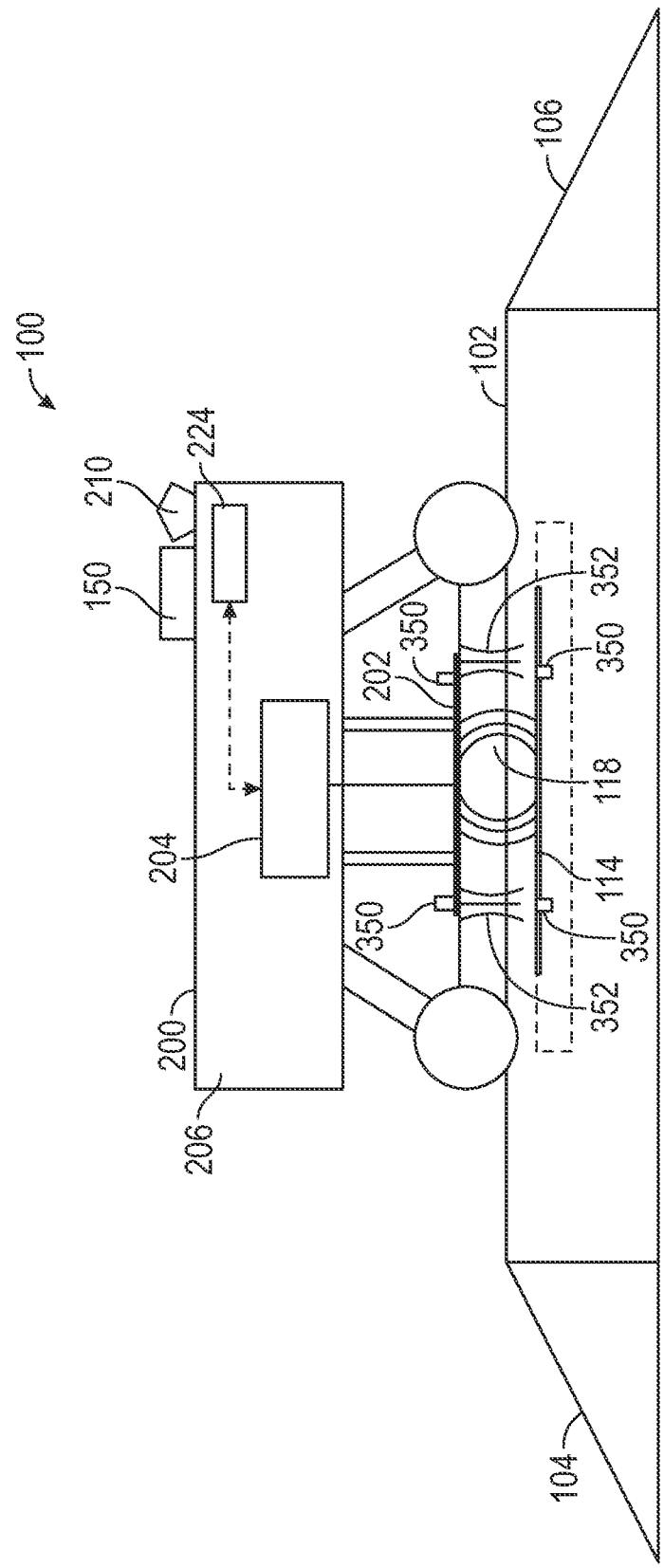
FIG. 30 is a schematic view of the lift of FIG. 2 positioned on the platform charging unit of FIG. 1 including a height adjustment system, according to an exemplary embodiment.
Figure 31:
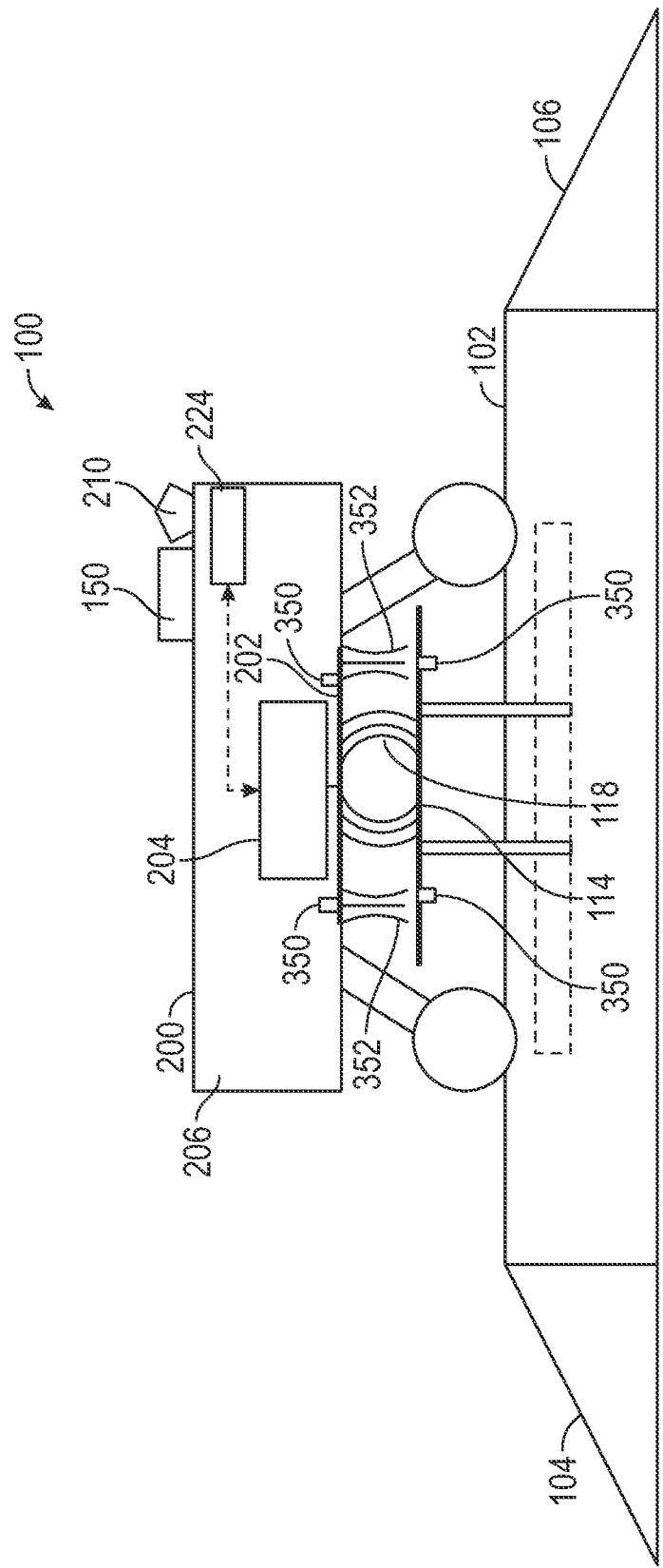
FIG. 31 is a schematic view of the lift of FIG. 2 positioned on the platform charging unit of FIG. 1, shown with a another embodiment of a height adjustment system.

Referring specifically to FIGS. 29 and 30, the charging system 100 can additionally or alternatively include mechanisms for movement of the induction coil 114 and/or the antenna coil 202 in a vertical direction (a z-axis) to ensure they are positioned near enough for desired power transfer speeds. Ensuring the air gap between the induction coil 114 and the antenna coil 202 is not too large can vastly improve the proper and efficient functioning of the charging system 100 and allow for reducing of the coil sizes, for example of induction coil 114 and antenna coil 202. In some examples where the lift device 200 cannot include the antenna coil 202 in a permanent position such that when positioned over the induction coil 114 on the platform structure 102 the induction coil 114 and the antenna coil 202 are properly aligned (such as in work machines which require extended ground clearance), the charging system 100 can be configured to adjust the z-axis position of one or both of the coils to ensure the proper air gap distance is reached. As depicted in FIG. 29, the antenna coil 202 may be connected to a height adjustment mechanism 234 for lowering the antenna coil 202 down towards the upper surface 108 of the platform structure 102. The height adjustment mechanism 234 is configured to lower the antenna coil 202 until a desired point is reached. The desired point may be a predetermined height off of the upper surface 108, determined from a desired current level being generated by the antenna coil 202, etc. In some embodiments, alternatively and/or additionally the lift device 200 may be configured to lower the antenna coil 202 nearer to the induction coil 114 by lowering the entire chassis 206. The chassis 206 can be lowered by using the suspension system (not shown) of the lift device 200 to reduce the distance between the bottom of the chassis 206 and the platform structure 102. For example, air bags in a suspension system of lift device 200 may be deflated to reduce its high off the ground. Alternatively, and as depicted in FIG. 30, the height adjustment mechanism 234 can be connected to the induction coil 114 of platform structure 102 and configured to raise the induction coil up towards the lift device 200. The charging system can include both active and passive positioning measures to optimize the positioning between induction coil 114 and the antenna coil 202. In some examples, the height adjustment mechanism includes a rack and pinion system, a pulley system, etc.

Telematics

At least one embodiment relates to a charging system for a lift including a platform assembly having a platform structure and a ramp. The ramp is coupled to a first side of the platform structure and extends away from the platform structure. An induction coil is received within the platform structure and positioned near an upper surface of the platform. The induction coil is configured to receive electricity from an energy source and generate a magnetic field that extends upwardly, through the upper surface of the platform. A telematics system is operably coupled to the charging system and configured to determine a state of the lift. The telematics system includes a controller configured to process status data received from the lift.

In some embodiments, the controller is a cloud-based controller that is operable coupled to the telematics system and configured to receive the status data.

In some embodiments, the controller includes an algorithm configured to analyze and process the status data.

In some embodiments, the algorithm analyzes the status data based on a time of day data.

In some embodiments, the algorithm analyzes the status data based on a charging rate data.

In some embodiments, the algorithm analyzes the status data based on a state of charge data.

In some embodiments, the algorithm analyzes the status data based on a current power data.

At least one embodiment relates to a lift including a chassis, a battery pack, and a telematics system operably coupled to the lift and configured to receive a lift data. The telematics system includes a cloud-based controller configured to analyze and store the lift data.

At least one embodiment relates to a charging system for a lift including a platform assembly having a platform structure and a ramp. The ramp is coupled to a first side of the platform structure and extends away from the platform structure. An induction coil is received within the platform structure and positioned near an upper surface of the platform. The induction coil is configured to receive electricity from an energy source and generate a magnetic field that extends upwardly, through the upper surface of the platform. The lift includes a chassis, a battery pack, and a telematics system operably coupled to the lift and configured to receive a lift data. The telematics system includes a cloud-based controller configured to analyze and store the lift data. The cloud-based controller includes an algorithm configured to analyze the lift data based an independent variable.

Figure 32:
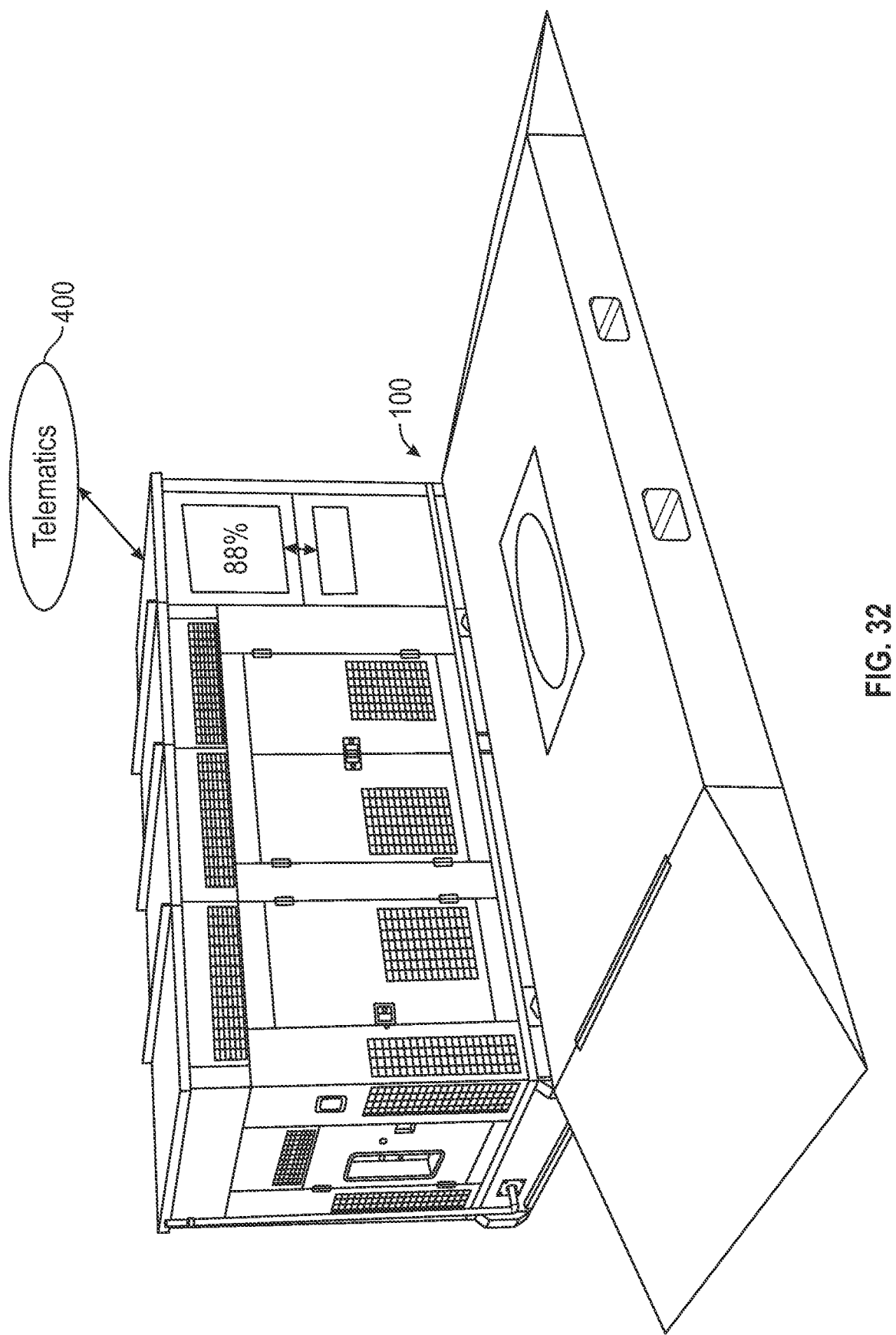
FIG. 32 is a perspective view of the platform charging unit of FIG. 1 interacting with a telematics system, according to an exemplary embodiment.
Figure 33:
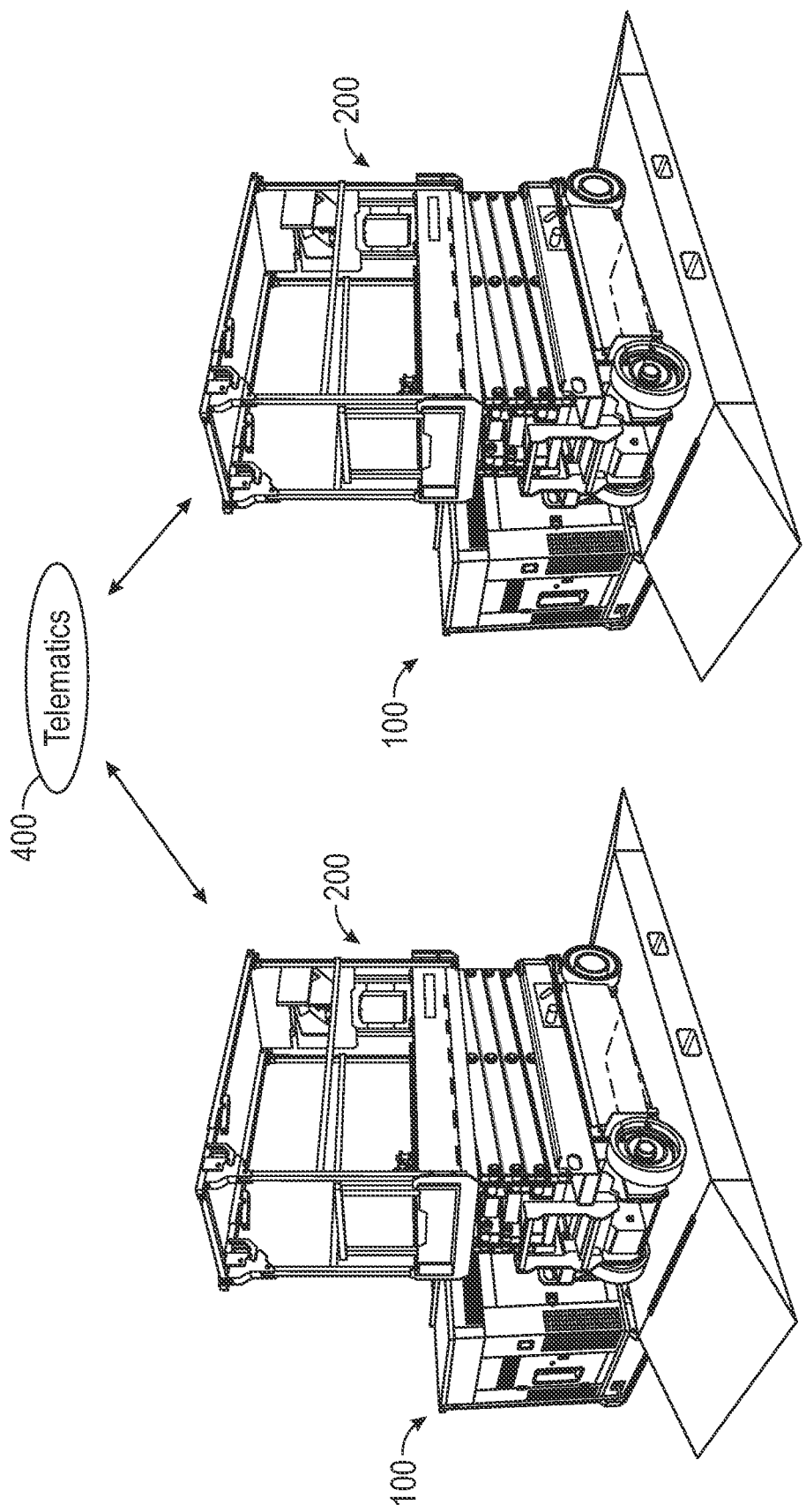
FIG. 33 is a perspective view of two of the platform charging units of FIG. 32 interacting with the telematics system of FIG. 32.

Referring now to FIGS. 32 and 33, the charging system 100 is operably coupled to a telematics system 400. In other embodiments, the charging system 100 may be operably coupled to a communication system, telecommunication system, computer system, or the like. The telematics system 400 may be a system configured to monitor the charging system 100. Specifically, the telematics system 400 may be configured to monitor a charge status, machine status, machine location, machine optimization, or the like. By way of example, the telematics system 400 may be operably coupled to the charging system 100 to monitor at least one of the charge status and the machine status of the machines during the charging process. The telematics system 400 may be located at a central location between one or more charging systems 100, where the telematics system 400 receives individual data from each of the charging systems 100. In other embodiments, one or more charging systems 100 may provide data to an individual telematics system 400. In still other embodiments, the telematics system 400 may be positioned within an inner housing of the charging system 100, where each charging system 100 may include an individual telematics system 400.

Referring specifically to FIG. 32, the telematics system 400 may be operably coupled to an individual charging system 100 and/or machine. By way of example, when the machine is positioned within the charging area 116, the machine sends data to the telematics system 400, where the telematics system 400 may determine operational needs (e.g., maintenance, charge, etc.) of the machine. In response to receiving the data, the telematics system 400 determines the needs of the individual machine and provides that information back to the charging system 100. If the machine has a low state of charge, the machine can delay charging based upon the time of day. As can be appreciated, if it is towards an end of the operational day, the machine may delay charging until the night. Likewise, if it is towards the middle of the operational day, the machine may choose to undergo a charge to maintain operation throughout the day.

Referring specifically to FIG. 33, the telematics system 400 may be operably coupled to more than one charging system 100 and/or machine. By way of example, when the machine is positioned within the charging area 116, the machine sends data to the telematics system 400, where the telematics system 400 may determine operational needs of the machine. In response to receiving the data, the telematics system 400 determines the needs of the more than one machine and provides that information back to the more than one charging system 100. If the machine has a low state of charge, the machine can delay charging based upon the time of day. As can be appreciated, if it is towards an end of the operational day, the machine may delay charging until the night. Likewise, if it is towards the middle of the operational day, the machine may choose to undergo a charge to maintain operation throughout the day. By way of example, when the more than one machines interact with the more than one charging systems 100, the telematics system 400 receives all the data for the machines and can thereon sequence the machines. As can be appreciated, the telematics system 400 may set the machines to be on the same charging schedule, where the telematics system 400 can better monitor each of the machines.

Figure 34:
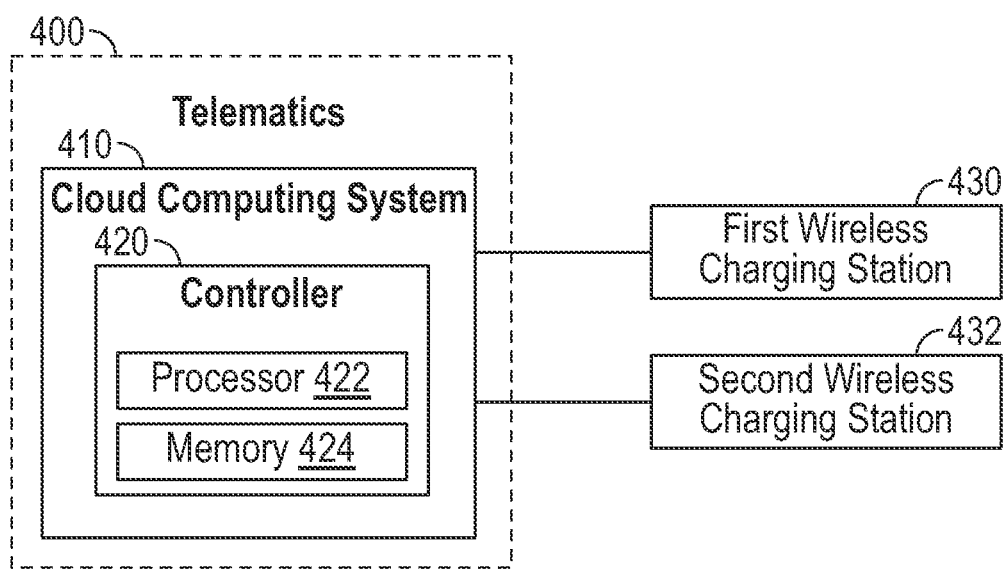
FIG. 34 is a block diagram of a telematics system of FIG. 32, according to an exemplary embodiment.

Referring to FIGS. 32-34, the telematics system 400 may utilize a cloud based computing system, referred to as cloud computing system 410, to manage and store data from the telematics system 400. The telematics system 400 may receive machine data via the machine and, in response, provide the data to the cloud computing system 410 to manage and store the data. In other embodiments, the telematics system 400 may receive charging station data and machine data via the charging system 100 and, in response, provide the data to the cloud computing system 410 to manage and store the data. The cloud computing system 410 may be configured to manage and store data using Wi-Fi, internet, Bluetooth, or the like. In some embodiments, the cloud computing system 410 may further manage the received data using visualization techniques, where the cloud computing system 410 can perform optimization analysis, cost savings, fleet management, etc. The telematics system 400 may be operably coupled to one or more charging systems 100, where the telematics system 400 can further utilize data received from the one or more machines to identify operational needs of the charging station. The operational needs may be a power input for the charging station, machine diagnostic for the machine, power input for the machine, or the like.

In some embodiments, the telematics system 400 may function without being operably coupled to a cloud computing system 410. In such an embodiment, the telematics system 400 may include at least a processing circuit that is configured to manage and store data received from the charging system 100 and the machine. The processing circuit may include an ASIC, one or more FPGAs, a DSP, circuits containing one or more processing components, circuitry for supporting a microprocessor, a group of processing components, or other suitable electronic processing components (e.g., processor). In some embodiments, the processing circuit is configured to execute computer code stored in memory to facilitate the activities described herein. The memory may be any volatile or non-volatile computer-readable storage medium capable of storing data or computer code relating to the activities described herein. According to an exemplary embodiment, the memory includes computer code modules (e.g., executable code, object code, source code, script code, machine code, etc.) configured for execution by the processing circuit.

The cloud computing system 410 further includes a controller 420. The controller 420 is configured to process the data received by the cloud computing system 410. The controller 420 includes a processor 422 and a memory 424. The memory 424 may store one or more instructions (e.g., algorithms) that, when executed by the processor 422, cause the controller 420 to perform the processes described herein. The controller 420 may be configured to analyze the received data and generate an appropriate response based on the received data. The controller 420 may further analyze the received data based upon independent variables. For example, the controller 420 may receive data from the machine signifying that the machine is in need of a charge, and based upon the current status of charge, the controller 420 may send a command to one of a first charging station 430 and a second charging station 432. By way of example, the controller 420 may send a command to the charging system 100 that designates the machine in need of service.

According to an exemplary embodiment, the independent variable of the controller 420 may be a time of day. In such an embodiment, the controller 420 may utilize time of day data to determine charge time of the machines. For example, the telematics system 400 may delay charging based upon a time of day data received. Alternatively, the telematics system 400 may engage charging based upon a time of day data received.

According to an exemplary embodiment, the independent variable of the controller 420 may be a charging rate. In such an embodiment, the controller 420 may utilize charging rate data to determine a charge time of the machines. For example, the telematics system 400 may delay charging based upon a charge rate data received. Alternatively, the telematics system 400 may engage charging based upon a time of day data received.

According to an exemplary embodiment, the independent variable of the controller 420 may be a state of charge. In such an embodiment, the controller 420 may utilize a state of charge data to determine a charging time of the machines. For example, the telematics system 400 may delay charging based on a state of charge data received signifying that the machine may have capacity to work for an extended period of time. Alternatively, the telematics system 400 may engage charging based on the state of charge data received signifying that the machine may not have capacity to work for an extended period of time.

According to an exemplary embodiment, the independent variable of the controller 420 may be a current power. In such an embodiment, the controller 420 may utilize a current power data to determine a charging time of the machines. For example, the telematics system 400 may delay charging based on a current power data received signifying that the charging system 100 may not have capacity to charge the machines. Alternatively, the telematics system 400 may engage charging based on the current power data received signifying that the charging system 100 may have capacity to charge the machines.

According to an exemplary embodiment, the controller 420 may utilize any combination of the independent variables previously discussed to determine a charging time of the machines. For example, the controller 420 may utilize any combination of time of day data, charging rate data, state of charge data, and current power data to determine a charging time of the machines. In other embodiments, the controller 420 may utilize variables other than the independent variables discussed herein.

The cloud computing system 410 may utilize one or more of the independent variables given to the controller 420 to determine a number of machines at which to charge. The telematics system 400 can receive a command from the cloud computing system 410 signifying a number of the one or more machines to charge, and, in response, send a command to the one or more charging systems 100 to charge the machines. For example, the cloud computing system 410 may receive data signifying that two machines have a low state of charge data, and, in response, send a command to the telematics system 400 to actuate the charging systems 100 correspondent to the two machines. In another example, the cloud computing system 410 may receive data signifying that one machine has a low state of charge data and that the time of day is later in the day, and, in response, send a command to the telematics system 400 to actuate the charging system 100 correspondent to the one machine.

Machine to Pad Protocol

At least one embodiment relates to a charging system for a lift including a platform assembly having a platform structure and a ramp. The ramp is coupled to a first side of the platform structure and extends away from the platform structure. An induction coil is configured to receive electricity from an energy source and generate a magnetic field that extends upwardly, through the upper surface of the platform. A geofence is located proximate the charging system and defines a boundary of the charging system. A machine is selectively coupled to the charging system and located within the geofence. The machine is operably coupled to the charging system when the machine is located within the geofence to provide a state of charge status to the charging system.

In some embodiments, the charging system further includes a controller operably coupled to the charging system and the machine.

In some embodiments, the controller is configured to monitor the state of charge of the machine.

In some embodiments, the controller determines an estimated time of charge for the machine based upon the state of charge of the machine.

In some embodiments, the geofence defines a boundary of a job site.

In some embodiments, the geofence defines a zoning boundary.

In some embodiments, multiple charging systems are located within the geofence.

In some embodiments, the charging systems are located at a single location within the geofence.

In some embodiments, the charging systems are located at different locations within the geofence.

At least one embodiment relates to a charging system for a lift including a platform assembly having a platform structure and a ramp. The ramp is coupled to a first side of the platform structure and extends away from the platform structure. An induction coil is received within the platform structure and positioned near an upper surface of the platform. The induction coil is configured to receive electricity from an energy source and generate a magnetic field that extends upwardly, through the upper surface of the platform. A geofence is located proximate the charging system and configured to define a boundary of the charging system. The lift is positioned within the geofence. The lift includes a chassis and a battery pack.

Figure 35:
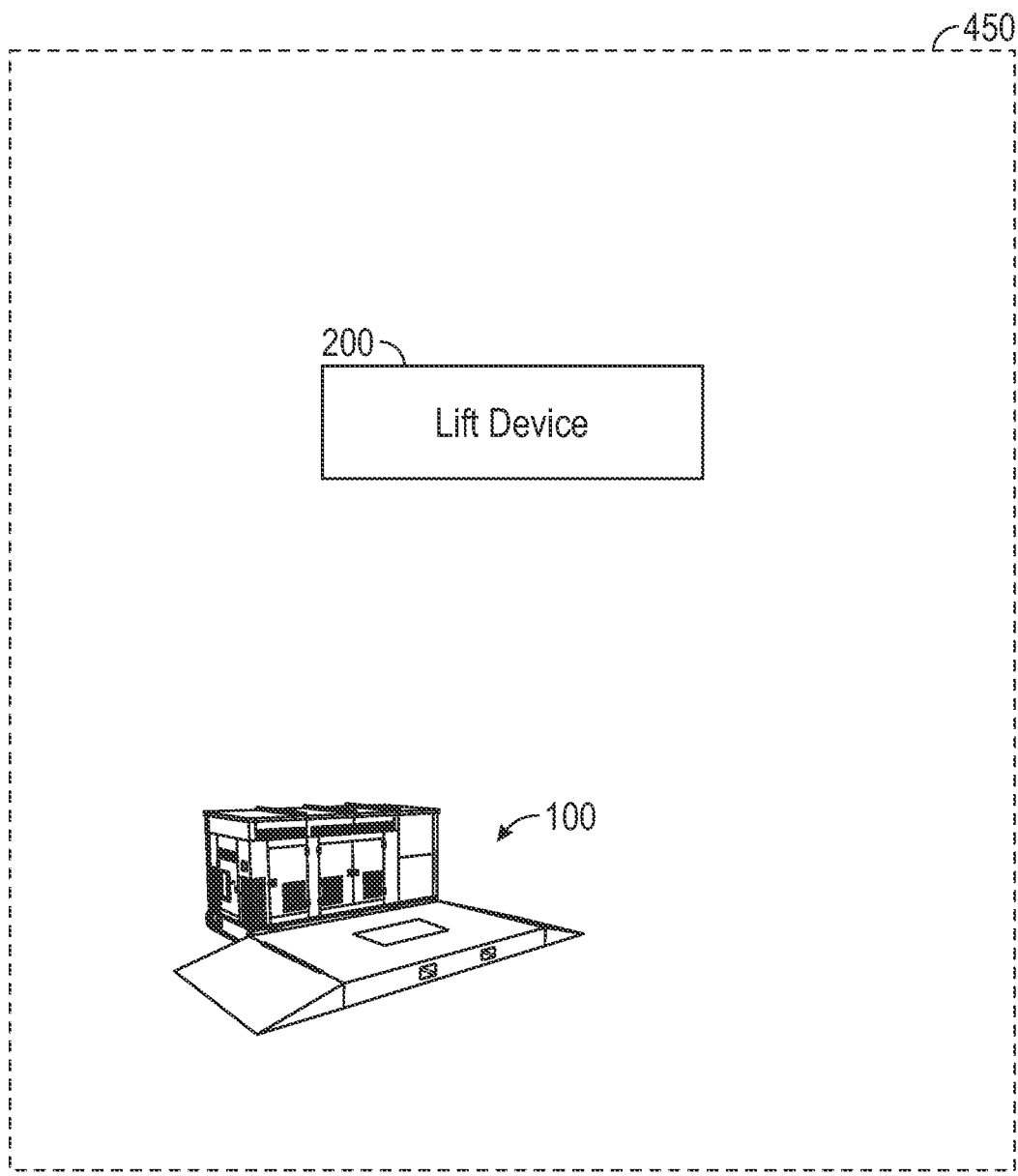
FIG. 35 is a schematic view of the platform charging unit of FIG. 1 within a geofence, according to an exemplary embodiment.

In some embodiments, the lift is operably coupled to the charging system when the lift is located within the geofence to provide a state of charge status to the charging system Referring now to FIG. 35, at least one of the charging system 100 and the platform structure 102 may include or define a perimeter boundary, jobsite boundary, virtual boundary, etc., shown as geofence 450. The geofence 450 is a perimeter or structure to designate a boundary of at least one of the charging system 100 and the platform structure 102. The geofence 450 may be a perimeter of the jobsite, where the geofence 450 follows a boundary instead of a distance from the charging system 100. In other embodiments, the geofence 450 may be a set maximum radius from one of the charging system 100 or the platform structure 102. In still other embodiments, the geofence 450 may be a zoning perimeter. The charging system 100 may be operably coupled to the one or more lift devices 200 when the one or more lift devices 200 are positioned within the geofence 450. In other embodiments, the charging system 100 may be operably coupled to a fleet of vehicles positioned proximate the geofence 450. The charging system 100 may be operably coupled to the one or more lift devices 200 when the one or more lift devices 200 cross over the geofence 450. By way of example, when the one or more lift devices 200 are positioned within the geofence 450, the one or more lift devices 200 may include a control system operably coupled to one of the charging system 100 and the platform structure 102. In other embodiments, the charging system 100 and the platform structure 102 may not include a geofence 450. In such an embodiment, the one or more machines may include a control system configured to locate a proximate charging system 100 or platform structure 102. Additionally or alternatively, the geofence 450 may be a pre-set boundary, prior to the charging system 100 being positioned therein, where the geofence 450 is defined by a jobsite or zoning boundary.

The charging system 100 and/or platform structure 102 may be located within a singular location within the geofence 450. The singular location may be a central location within the geofence 450 where the charging system 100 and/or platform structure 102 is equidistant to the edge of the geofence 450. In other embodiments, one or more charging systems 100 and/or platform structures 102 may be positioned at one or more locations within the geofence 450. In such an embodiment, the one or more machines may interact with the charging system 100 and/or platform structure 102 that is most proximate the one or more machines. By way of example, the one or more charging system 100 and/or platform structures 102 may be positioned in a plurality of locations within the geofence 450 such that the lift devices 200 may have feasible access to the one or more charging systems 100.

The lift device 200 and the charging system 100 are communicably coupled to the geofence 450, when the lift device 200 and the charging system 100 are positioned within the geofence 450. In other embodiments, the lift device 200 and the charging system 100 are communicably coupled to the geofence 450, when the lift device 200 and the charging system 100 are not positioned within the geofence 450.

As will be discussed in greater detail herein, the charging system 100 may be operably coupled to a control system via Wi-Fi, GPS, Bluetooth, etc. The control system may trigger a pre-programmed action based on a machine being positioned within the geofence 450. In other embodiments, the control system may trigger the pre-programmed action based on a machine being communicably coupled to the geofence 450. According to an exemplary embodiment, the control system may define a protocol to determine if the charging station is in need of a geofence 450. The protocol may be an establishment of a location of the geofence in comparison to local ordinances. Additionally or alternatively, the protocol may be a determination of the location of the charging system 100 to the geofence 450 (e.g., within a geofence 450, outside of a geofence 450, etc.).

The protocol may define a set or number of rules and/or guidelines for the lift device 200 and/or charging system 100 to follow. The charging system 100 may initiate the protocol steps upon determination of the lift device 200 within the geofence 450. For example, the charging system 100 may detect that one or more lift devices 200 are positioned proximate or within the geofence 450, and, in response, initiate the protocol steps to begin determination of machine needs, location, resources, etc. The protocol steps may define a signal to the one or more lift devices 200 present within the geofence 450, a signal to a communication system to establish operating standards, a signal to the charging system 100 to determine operating needs of the charging system 100, etc. The protocol may be communicably couple to local communication systems where the protocol may use the local ordinances to determine whether the geofence 450 may be established and what other local information may be necessary. If the protocol determines that the geofence 450 can be established, the charging system 100 may begin to detect lift devices 200 positioned within the geofence. If the protocol determines that the geofence 450 cannot be established, the charging system 100 may not detect the presence of lift devices 200 positioned within the geofence 450. In such an embodiment, the charging system 100 may be operably coupled to the lift device 200 where the lift device 200 may proceed to the charging system 100 when the lift device 200 determines a lack of charge, mechanical need, or the like.

Figure 36:
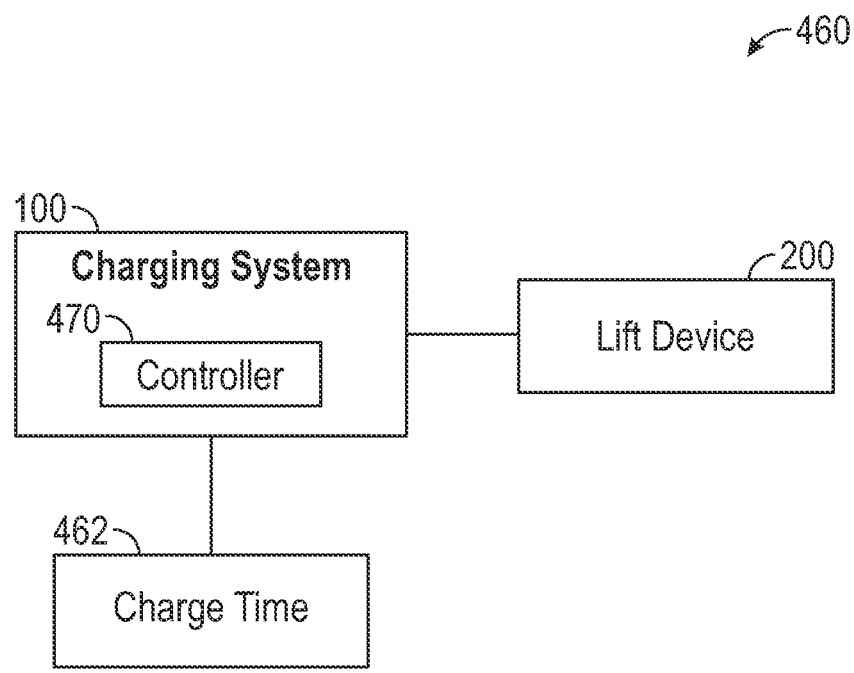
FIG. 36 is a block diagram of a control system for the platform charging unit of FIG. 1, according to an exemplary embodiment.

Referring now to FIG. 36, a control system 460 for the charging system 100 is shown. The control system 460 is operably coupled to the lift device 200 such to determine a charge time 462 for the machine. The charge time 462 may be a time for which the lift device 200 may reach a full charge status. In other embodiments, the charge time 462 may be a charge time for which the lift device 200 may reach an operation status. The operation status may be a charge time that allows the machine to work for a particular period of time. In other embodiments, the operation status may be a charge time that allows the machine to operate for a particular task.

The lift device 200 may include a radio frequency ID (RFID) tag that is operably coupled to the both the geofence 450 and the charging system 100. The charging system 100 may detect the RFID tag when the lift device 200 is positioned within the geofence 450. When the charging system 100 detects the RFID tag, and a controller 470 monitors the status of the lift device 200, the controller 470 sends a command to the lift device 200 to move towards the charging system 100. The controller 470 may represent any of the controllers described herein (e.g., the controller 420, the controller 224, etc.).

As can be appreciated, the control system 460 may be configured to determine an estimated charge time for a lift device 200 that interfaces with the charging system 100. The control system 460 may include a controller 470. The controller 470 may be configured to receive a status from the lift device 200. The machine status may be a current power status, where the controller 470 determines a current charge of the lift device 200. In other embodiments, the machine status may be a state of charge status, where the controller 470 determines a current time of charge of the lift device 200 with the charging system 100 maintaining a consistent output.

The controller 470 may perform a real-time analysis of the charging system 100. As can be appreciated, the charging system 100 may have a variable power output to the lift device 200. The controller 470 may monitor those output levels for the current charging state and determine an amount of time it will take to fully charge the lift device 200.

In other examples, the controller 470 may monitor those output levels for the current charging state and determine an amount of time it will take to charge the lift device 200 to a desired charge level. Furthermore, the controller 470 may determine an amount of battery needed to be charged (e.g., 25%, 50%, 75%, etc.), where the controller 470 may use that data in coordination with the current charging state data to determine an amount of time it will take to fully charge the lift device 200. In other examples, the controller 470 may use both the current battery data and the current charging state data to determine an amount of time it will take to charge the lift device 200 to a desired charge level.

According to an exemplary embodiment, the charging system 100 may be operably coupled to the lift device 200 when the lift device 200 is distal from the charging system 100. The controller 470 may monitor the lift device 200 to determine a current state of charge of the machine and further determine when the lift device 200 will be in need of charging. Prior to the lift device 200 interacting with the charging system 100, the controller 470 may utilize the current state of charge of the lift device 200 and the current charging rate of the charging system 100 to determine an amount of time to fully charge the lift device 200. In some embodiments, an operator may determine, based on the amount of time to fully charge the lift device 200, whether to charge the lift device 200 or not.

Micro Battery Charging Solution

At least one embodiment relates to a lift including a chassis, a primary battery, an antenna loop electrically coupled to the primary battery and configured to receive energy from a magnetic field generated by an induction coil within a platform of a charging system and transmit current to the primary battery to charge the primary battery, and a removable charger supported by the chassis and selectively coupled to the primary battery. The removable charger is configured to provide a supply of direct current to the primary battery to charge the primary battery.

In some embodiments, the removable charger is configured to provide a direct current energy supply of 0-350 kW. In some such embodiments, the removable charger is configured to provide a direct current energy supply of 50 kW.

In some embodiments, the removable charger is selectively coupled to the primary battery via a removable electrical connector.

In some embodiments, the removable electrical connector is at least one of a Combined Charge System (CC S) or a Charge de Mode (CHAdeMO) electrical connector.

In some embodiments, the removable charger includes a secondary battery and an antenna loop electrically coupled to the secondary battery and configured to receive energy from a magnetic field generated by an induction coil within a platform of a charging system and transmit current to the secondary battery to charge the secondary battery.

In some embodiments, the removable charger is configured to provide the direct current when a charge level of the primary battery is below a minimum threshold.

In some embodiments, the removable charger is configured to cease providing the direct current when a charge level of the primary battery is at or above a maximum threshold.

Figure 37:
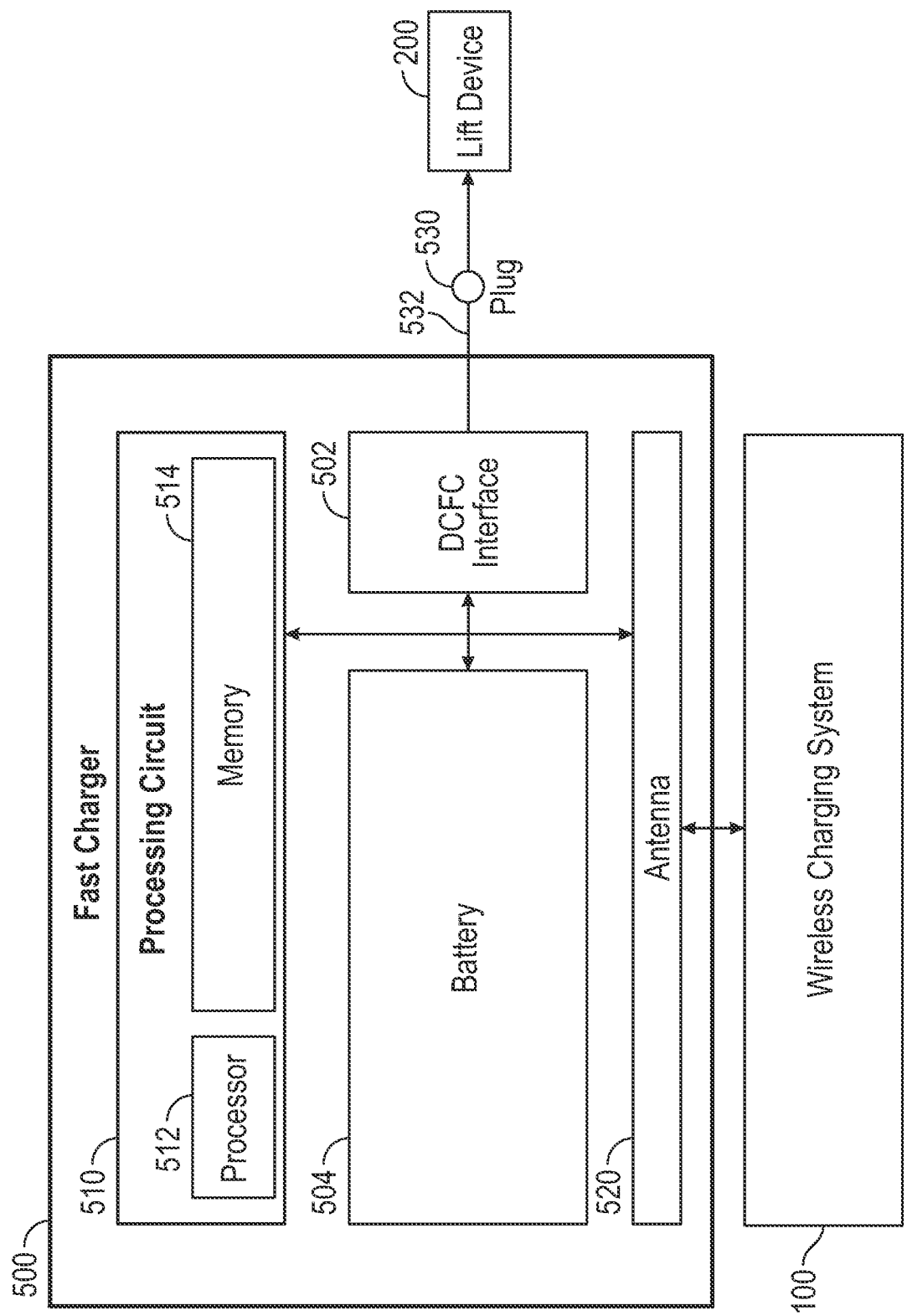
FIG. 37 is a block diagram of a micro battery charger for use with the platform charging unit of FIG. 1, according to an exemplary embodiment.
Figure 38:
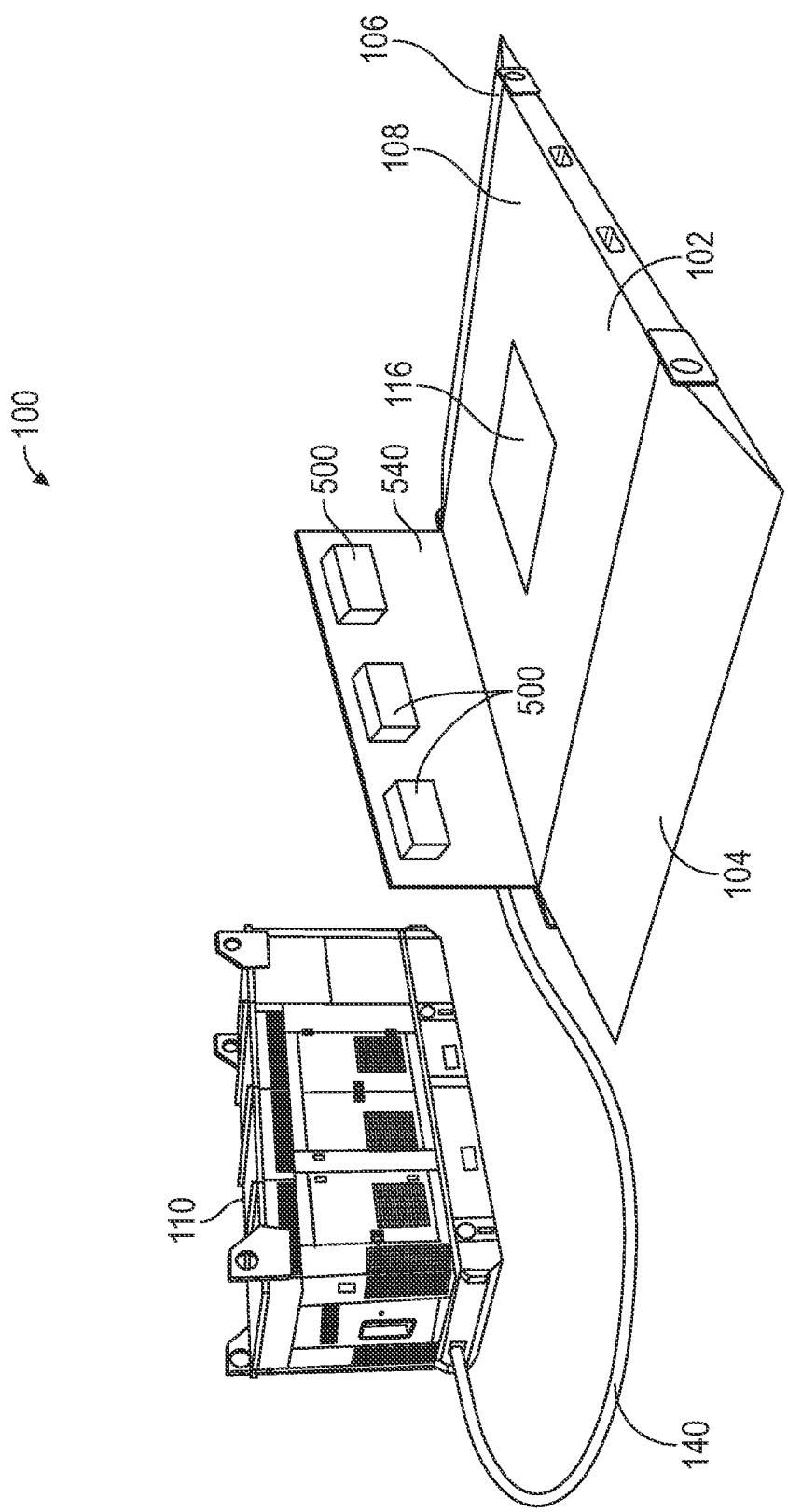
FIG. 38 is a perspective view of the micro battery charger of FIG. 37 positioned on the platform charging unit of FIG. 1, according to an exemplary embodiment.
Figure 39:
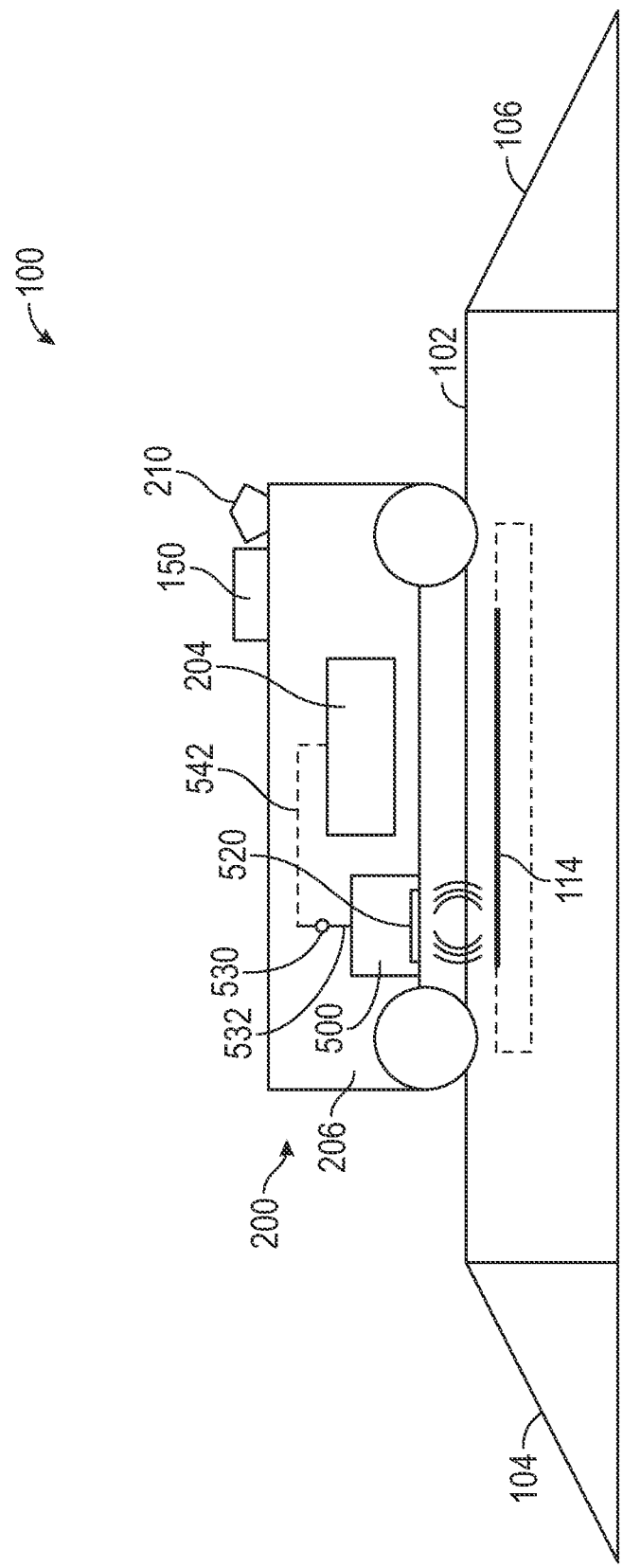
FIG. 39 is a schematic side view of the lift of FIG. 2 coupled to the micro battery charger of FIG. 37.

Referring now to FIGS. 37-39, the lift device 200 can also be charged by a mobile direct current (DC) micro battery charger, shown as fast charger 500. The fast charger 500 generally includes a battery 504 (e.g., one or more batteries) and a DC fast charging (DCFC) interface 502 configured to provide high-power charging to an attached lift device. For example, the DCFC interface 502 may operate as a Level 3 charger, and provide 50-350 kW of power to the battery 204 of the lift device 200. Still in some embodiments, the fast charger 500 may provide more or less power. In some examples, the fast charger 500 can also serve as a replacement of the battery 204 and directly power the lift device 200. For example, a lift device 200 with a faulty battery 204 may be equipped with a fast charger 500 that is configured to provide power to the lift device 200 in place of the faulty battery 204.

As depicted in FIG. 37, in some embodiments the fast charger 500 includes a processing circuit, shown as controller 510, with a processor 512 and memory 514 for storing instructions to be executed by the processor 512. The functionality of the controller 510 may be performed by any of the other controllers described herein. The controller 510 can control the operations of the fast charger 500 including wirelessly charging the battery 504 via an antenna 520 and/or the DCFC interface 502, as well as controlling the provision of high-power DC current to the lift device 200 via the DCFC interface 502. The DCFC interface 502 can support a variety of different electrical components, including transformers that are configured to step up voltage received from the battery 504.

In some examples, the fast charger 500 is received within a housing. The housing can have a rectangular shape, and can be configured to be removably coupled to the lift device 200 at various different locations to facilitate DC fast charging, including during operation of the lift device 200. In some examples, the fast charger 500 includes one or more mounting flanges or brackets configured to interface with corresponding receivers on lift device 200 (not shown), to allow the fast charger 500 to be mounted at various locations on the lift device 200. In some examples, the fast charger is mounted with an interference fit. The position of the fast charger 500 can be chosen to facilitate both the charging of the lift device 200 and the charging of the fast charger 500. For example, to configure the fast charger 500 for use with the charging system 100, the fast charger 500 can be mounted on a side of the chassis 206 of the lift device 200 at a height such that an antenna 520 of the fast charger 500 is able to receive power from the electromagnet field generated by the induction coil 114 of the charging system 100. In such an arrangement both the fast charger 500 and the lift device 200 can charge using the induction coil 114. The housing of the fast charger 500, or a portion of the housing, can be formed from a hard polymer or other suitably electrically neutral substance that does not interfere with charging the fast charger wirelessly via the antenna 520.

In some examples, the antenna 520 is configured to receive power from the induction coil 114 of the charging system 100. For example, the antenna 520 may operate according to the same principles as the antenna coil 202. When the antenna 520 is positioned within a magnetic field such as that generated by the induction coil 114 a current is generated within the antenna 520 that can then be provided to the battery 504 to help charge the battery 504. As depicted in FIG. 38, one or more fast chargers 500 can be supported by a rack 540 over the charging area 116 of the charging system 100 for passive charging when not supported by a lift device 200. In some examples, the fast chargers 500 are positioned to charge from the same induction coil 114 that charges the lift device 200. In some examples, additional induction coils 114 are installed and/or positioned in the platform structure 102 for charging the fast chargers 500.

The fast charger 500 can be a modular assembly configured to be supported and selectively wired to (e.g., removably coupled to) the lift device 200. The fast charger 500 can be wired to the battery 204 of a lift device 200 via a removable electrical connector such that it can be quickly disconnected from one lift device and connected to another. For example, and as depicted in FIG. 39, the fast charger 500 includes a plug 530 for coupling the fast charger 500 to the battery 204. The plug 530 generally includes a positive terminal and a negative terminal, and is positioned at a distal end of a cable 532 extending away from the fast charger 500. In some examples, the plug 530 is compatible with one or more standard Level 3 charging interfaces (CCS, CHAdeMO, etc.). The plug 530 can be coupled to the battery 204, which can include a terminal or a bus that can receive and or connect to the plug 530. Because the plug 530 is in electrical communication with the battery 504 of the fast charger 500, placing the plug 530 in electrical communication with the battery 204 creates an electrical communication between the battery 504 and the battery 204. Accordingly, current from the battery 504 can be transmitted to the battery 204 to recharge it. The wired connection allows increased charging speed compared to charging the lift device 200 via the charging system 100, as well as for charging during movement and/or operation of the lift device 200 when it is unable to remain static on the charging system 100 for a sufficient amount of time.

To interact with a lift device 200 as depicted in FIG. 39 the fast charger 500 is coupled (e.g., hung, bolted, strapped, etc.) to the chassis 206 of the lift device 200. For example, the fast charger 500 can be hung on a bracket (not shown) of the lift device 200. The fast charger 500 is then electrically coupled to the lift device 200 by connecting the plug 530 to the internal wiring system 542 of the lift device 200. In some examples, the fast charger 500 is electrically coupled to the lift device 200 via one or more electrical contacts of the fast charger 500 which come into contact with corresponding electrical contacts of the lift device 200 when the fast charger 500 is mechanically coupled to the lift device 200. For example, when hung from a bracket the electrical contacts may be aligned and forced into contact.

With the fast charger 500 electrically coupled to the lift device 200, the fast charger 500 and lift device 200 can communicate and share information including a battery status or charge level. The fast charger 500 can supplement the power of the battery 204 by supplying high-power DC current to the battery 204 when needed. In some examples, an operator of a lift machine can activate the fast charger 500 via an instruction inputted on the lift device 200 and transferred to the fast charger 500 via the electrical connection. In some examples, the fast charger 500 actively monitors the charging status of the battery 204 and automatically initiates DC fast charging when required. For example, a lift device 200 may have 2% of its battery charge remaining but require 5% to move the lift device onto the platform structure 102. The fast charger 500 can be attached to the lift device 200 and provide backup power at a high rate of charge such that the lift device can be recharged even when power is being used to move/operate the lift device.

When discharged or when not installed on a lift device, the fast charger 500 can be stored on the platform structure 102 and passively recharging via the antenna 520 according to a similar charging process as performed by the lift device 200. Accordingly, and as depicted in FIG. 38, the fast chargers 500 can maintain a constant charge status while waiting to be coupled to a lift device 200. Still in other embodiments, the fast charger 500 can use the same plug 530 that it uses to connect the lift device 200 to connect to a source of electricity and charge its own battery. In some embodiments, the fast charger 500 can also be charged by any other means for charging of a battery.

Wireless Transfer of Power to Rotating Portion of Machine

At least one embodiment relates to a lift device including a chassis including a first inductive coupler positioned on a central axis. The lift device includes a turntable supported by the chassis and configured to rotate relative to the chassis about the central axis. The turntable includes a lift apparatus configured to raise and lower a platform and a second inductive coupler coaxial with the first inductive coupler. The second inductive coupler provides contactless power/data to the turntable from a magnetic field generated by passing a variable current through the first inductive coupler.

In some embodiments, the lift device further includes an indicator providing an indication when the second inductive coupler is positioned within the magnetic field.

In some embodiments, an insulated gap is formed between the first inductive coupler and the second inductive coupler.

In some embodiments, the insulated gap is filled with air.

In some embodiments, the insulated gap is filled with plastic.

In some embodiments, the position of the second inductive coupler relative to the first inductive coupler remains approximately unchanged during rotation of the turntable.

In some embodiments, during rotation of the turntable, the second inductive coupler continuously lies within the magnetic field generated by the first inductive coupler.

In some embodiments, the magnetic field includes a first magnetic field generated by passing current through a data transmission coil of the first inductive coupler and a second magnetic field generated by passing a variable current through a power transmission coil of the first inductive coupler.

In some embodiments, the platform is supported by a boom pivotably coupled to the turntable.

In some embodiments, the first inductive coupler simultaneously provides power/data to the chassis from a magnetic field generated by passing a variable current through the second inductive coupler.

At least one embodiment relates to a lift device including a chassis and a turntable supported by the chassis and configured to rotate relative to the chassis about a central axis. The turntable includes a second inductive coupler positioned on the central axis and inductively coupled to a first inductive coupler supported by the chassis and coaxial with the second inductive coupler. The turntable is supplied contactless power/data from the chassis by passing a variable current through the first inductive coupler.

In some embodiments, the second inductive coupler receives the power and data for the turntable from a magnetic field generated by passing a variable current through a coil of the first inductive coupler.

In some embodiments, the lift device further includes an indicator providing an indication when the second inductive coupler is positioned within the magnetic field.

In some embodiments, the turntable is supplied contactless power/data from the chassis by the second inductive coupler interfacing with a magnetic field generated by the current passing through the first inductive coupler.

In some embodiments, the chassis is supplied contactless power/data from the turntable by passing a variable current through the second inductive coupler.

In some embodiments, the lift device further includes a prime mover supported by the chassis and configured to provide rotational motion to one or more wheels supported by the base to move the lift device and a user interface supported by the platform. During operation of the lift device, a command generated by the user interface is passed to the prime mover over an insulated gap between the turntable and the cassis by the second inductive coupler and the first inductive coupler.

In some embodiments, the lift device further includes a battery supported by the chassis and electrically coupled to the turntable via the inductive coupling between the first inductive coupler and the second inductive coupler.

At least one embodiment relates to a method for providing power to a turntable of a lift device. The method includes providing a chassis configured to support the turntable. The turntable is configured to rotate relative to the chassis about a central axis and includes a lift apparatus. The method further includes providing a first inductive coupler supported by a chassis of the lift device and positioned on the central axis, providing a second inductive coupler supported by the turntable and coaxial with but separate from the first inductive coupler, and electrically coupling the turntable to the chassis by inducing in the second inductive coupler to generate a second current by passing a first current through the first inductive coupler.

Lifts often include slip joints for providing power and data to a rotating turntable from a stationary chassis. The slip joints require physical contact and wear over time due to the friction between the contact surfaces. Additionally, lifts with wireless optical connections may provide data but cannot also provide power wirelessly, and they require a line-of-sight between the couplers that must be exposed to the environment.

Figure 40:
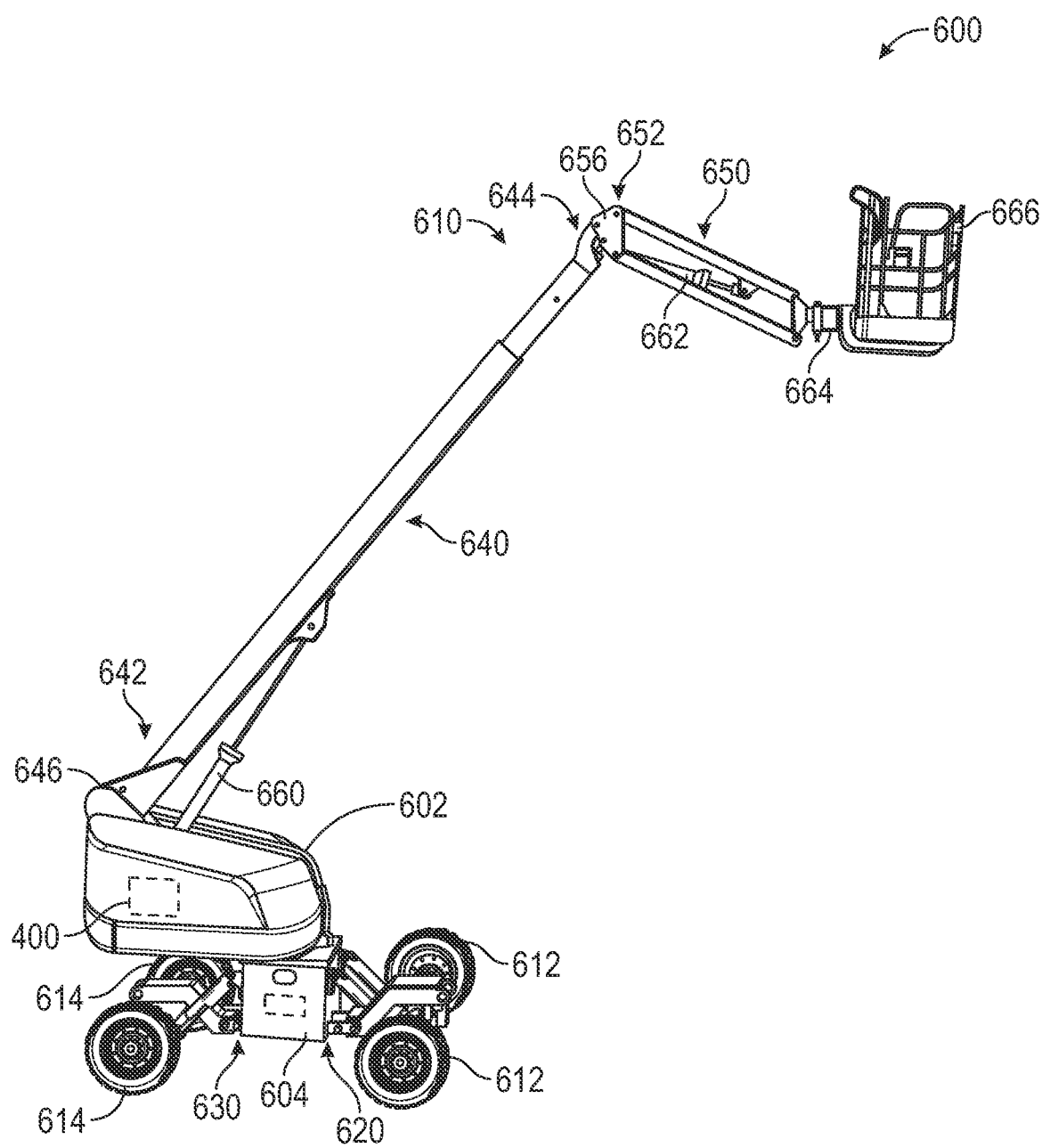
FIG. 40 is a perspective view of a lift including a chassis and a turntable, according to an exemplary embodiment.
Figure 41:
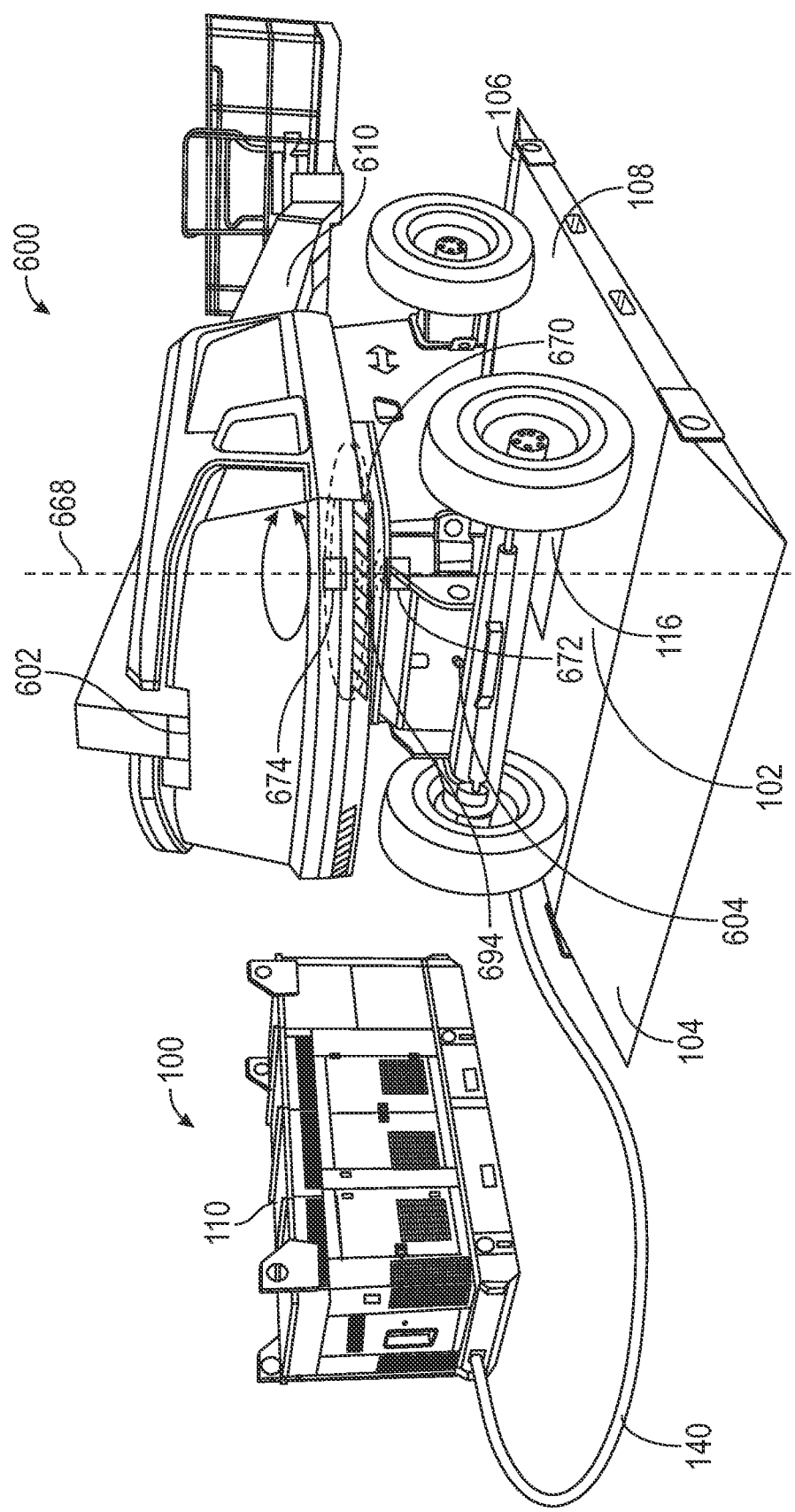
FIG. 41 is a perspective view of the lift of FIG. 40, in which the turntable is in wireless communication with the chassis.
Figure 42:
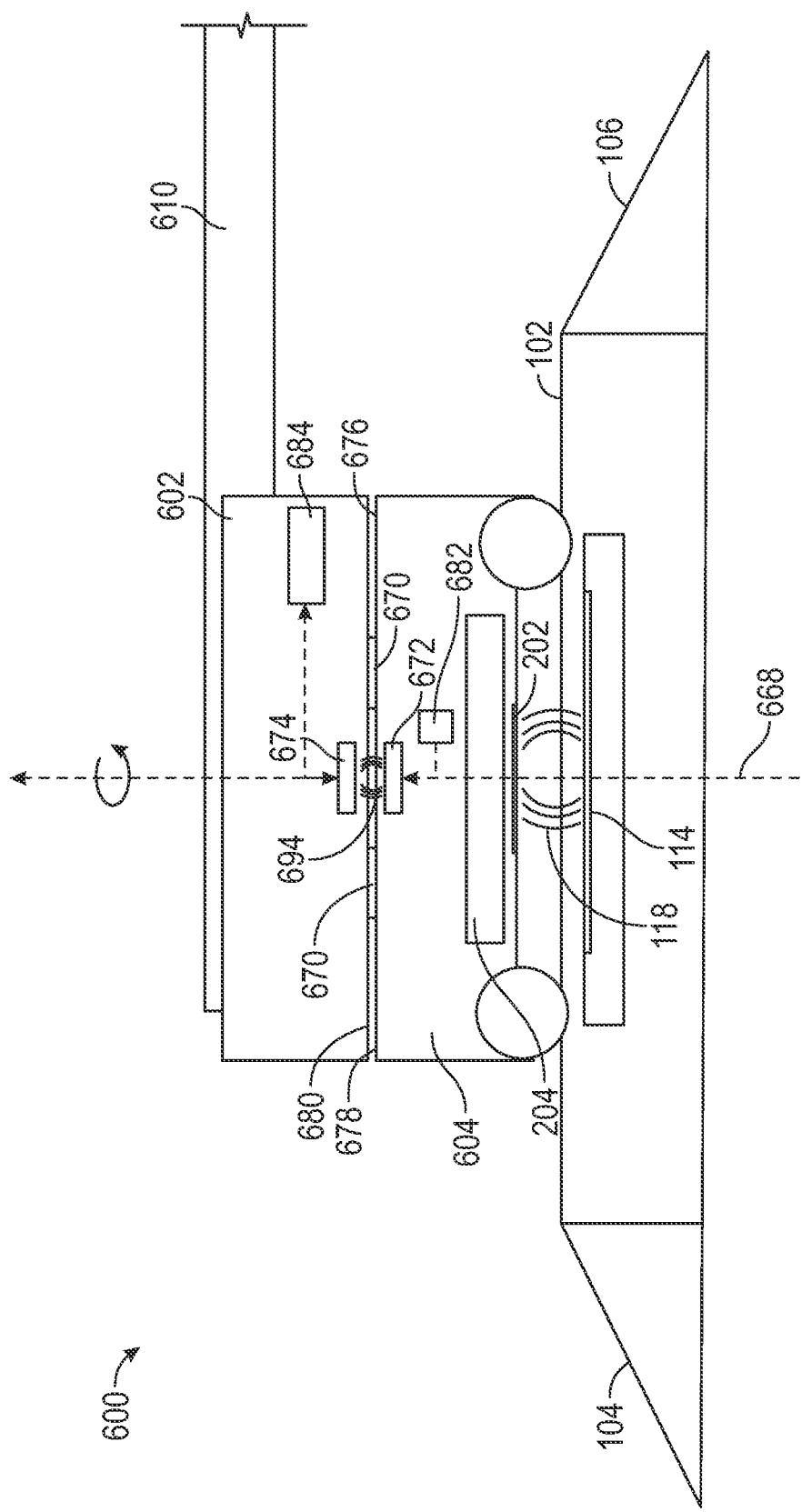
FIG. 42 is a schematic side view of the lift of FIG. 40 positioned on the platform charging unit of FIG. 1.

Referring now to FIGS. 40-42, a lift device with rotation-independent wireless power and data transfer is shown. The lift device (e.g., an aerial work platform, a telehandler, a boom lift, etc.), shown as boom lift device 600, includes a chassis, shown as chassis 604. The lift device 600 may be an example of the lift device 200. In other embodiments, the lift device 600 is another type of vehicle with a rotatable structure, shown as turntable 602, on top of the chassis 604 (e.g., a fire apparatus, a military vehicle, an airport rescue fire fighting ("ARFF") truck, a boom truck, a refuse vehicle, a fork lift, etc.). As shown in FIG. 40 the chassis 604 supports and a boom assembly, lift assembly, or actuator assembly, shown as boom 610. In some embodiments, the lift device 600 can be charged by the charging system 100

According to an exemplary embodiment, the turntable 602 is rotatable relative to the chassis 604. According to an exemplary embodiment, the turntable 602 includes a counterweight positioned at a rear of the turntable 602. In other embodiments, the counterweight is otherwise positioned and/or at least a portion of the weight thereof is otherwise distributed throughout the lift device 600 (e.g., on the chassis 604, on a portion of the boom 610, etc.). As shown in FIG. 40, a first end, shown as front end 620, of the chassis 604 is supported by a first plurality of tractive elements, shown as front tractive elements 612, and an opposing second end, shown as rear end 630, of the chassis 604 is supported by a second plurality of tractive elements, shown as front tractive elements 614. According to the exemplary embodiment shown in FIG. 40, the front tractive elements 612 and the front tractive elements 614 include wheels. In other embodiments, the front tractive elements 612 and/or the front tractive elements 614 include a track element.

As shown in FIG. 40, the boom 610 includes a first boom section, shown as lower boom 640, and a second boom section, shown as upper boom 650. In other embodiments, the boom 610 includes a different number and/or arrangement of boom sections (e.g., one, three, etc.). According to an exemplary embodiment, the boom 610 is an articulating boom assembly. In one embodiment, the upper boom 650 is shorter in length than lower boom 640. In other embodiments, the upper boom 650 is longer in length than the lower boom 640. According to another exemplary embodiment, the boom 610 is a telescopic, articulating boom assembly. By way of example, the upper boom 650 and/or the lower boom 640 may include a plurality of telescoping boom sections that are configured to extend and retract along a longitudinal centerline thereof to selectively increase and decrease a length of the boom 610.

As shown in FIG. 40, the lower boom 640 has a first end (e.g., lower end, etc.), shown as base end 642, and an opposing second end, shown as intermediate end 644. According to an exemplary embodiment, the base end 642 of the lower boom 640 is pivotally coupled (e.g., pinned, etc.) to the turntable 602 at a joint, shown as lower boom pivot 646. As shown in FIG. 40, the boom 610 includes a first actuator (e.g., pneumatic cylinder, electric actuator, hydraulic cylinder, etc.), shown as lower lift cylinder 660. The lower lift cylinder 660 has a first end coupled to the turntable 602 and an opposing second end coupled to the lower boom 640. According to an exemplary embodiment, the lower lift cylinder 660 is positioned to raise and lower the lower boom 640 relative to the turntable 602 about the lower boom pivot 646.

As shown in FIG. 40, the upper boom 650 has a first end, shown as intermediate end 652, and an opposing second end, shown as implement end 654. According to an exemplary embodiment, the intermediate end 652 of the upper boom 650 is pivotally coupled (e.g., pinned, etc.) to the intermediate end 644 of the lower boom 640 at a joint, shown as upper boom pivot 656. As shown in FIG. 40, the boom 610 includes an implement, shown as platform assembly 666, coupled to the implement end 654 of the upper boom 650 with an extension arm, shown as jib arm 664. In some embodiments, the jib arm 664 is configured to facilitate pivoting the platform assembly 666 about a lateral axis (e.g., pivot the platform assembly 666 up and down, etc.). In some embodiments, the jib arm 664 is configured to facilitate pivoting the platform assembly 666 about a vertical axis (e.g., pivot the platform assembly 666 left and right, etc.). In some embodiments, the jib arm 664 is configured to facilitate extending and retracting the platform assembly 666 relative to the implement end 654 of the upper boom 650. As shown in FIG. 40, the boom 610 includes a second actuator (e.g., pneumatic cylinder, electric actuator, hydraulic cylinder, etc.), shown as upper lift cylinder 662. According to an exemplary embodiment, the upper lift cylinder 662 is positioned to actuate (e.g., lift, rotate, elevate, etc.) the upper boom 650 and the platform assembly 666 relative to the lower boom 640 about the upper boom pivot 656.

According to an exemplary embodiment, the platform assembly 666 is a structure that is particularly configured to support one or more workers. In some embodiments, the platform assembly 666 includes an accessory or tool configured for use by a worker. Such tools may include pneumatic tools (e.g., impact wrench, airbrush, nail gun, ratchet, etc.), plasma cutters, welders, spotlights, etc. In some embodiments, the platform assembly 666 includes a control panel to control operation of the lift device 600 (e.g., the turntable 602, the boom 610, etc.) from the platform assembly 666. In other embodiments, the platform assembly 666 includes or is replaced with an accessory and/or tool (e.g., forklift forks, etc.).

The lift device 600 may provide various features and/or performance characteristics that are advantageous for lift device operation. Such advantages may include: (i) providing a platform capacity of up to 600 pounds or more, (ii) providing a platform height of up to 46.5 feet or more, (iii) providing a horizontal reach of up to 39 feet or more, (iv) providing a platform rotation of up to 180 degrees or more, (v) providing a boom swing of up to 360 degrees, (vi) providing a drive speed of up to 4.5 miles per hour or more, (vii) providing a gradeability of up to 45 degrees or more, (viii) providing a turning radius of 16 feet or less, (ix) providing a variable ground clearance between less than 6 inches to more than 22 inches, and/or (x) providing up to +/−10 degrees or more of chassis pitch and roll, among still other advantages.

As shown in FIGS. 41 and 42, the turntable 602 is configured to rotate, relative to the chassis 604, around the axis 668 on a swing bearing, shown as turntable bearing 670. According to an exemplary embodiment, power and data is transferred between the chassis 604 and the turntable 602 via inductive couplers, shown as wireless couplers 672, 674. The wireless couplers are designed to transfer power and data across an air gap without the need for electric contacts such as those found in slip rings.

In some examples, the wireless couplers 672, 674 function in the same manner as the induction coil 114 and the antenna coil 202 of the charging system 100. For example, the wireless coupler 672 can convert the data and current signals it receives via wires into a magnetic field that inductively couples it to the wireless coupler 674 and inducing the wireless coupler 674 to generate corresponding current and data signals that can then be provided transmission via wire throughout the rest of the turntable 602. The wireless couplers may include one or more coils for generating the magnetic field. For example, a first coil of the wireless coupler 672 may receive the current signals and generate a power transmission field and a second coil of the wireless coupler 672 may receive the data signals and generate a data transmission field. The power transmission field and the data transmission can be interfaced and received by corresponding coils in the wireless coupler 674. The data signals transmitted by the wireless couplers 672, 674 can include Ethernet signals, digital sensor and input signals, etc. The current can be up to 2 A of current at 24 volts, though other levels of power transmission are possible.

The wireless couplers 672, 674 are positioned approximately coaxially, that is on the same axis of rotation (i.e., the axis 668), with their active surfaces facing each other on approximately parallel planes, but separated by an air gap 676. During rotation of the rotating part (i.e., the turntable 602 and therefore the wireless coupler 674), the wireless coupler 674 changes its orientation but maintains its approximate position in relation to the stationary part (i.e., the wireless coupler 672), and therefore maintains its position within the magnetic field the wireless coupler 672 is generating. Accordingly, power and data continue to flow during the rotation due to the wireless coupler 674 never leaving the magnetic field generated by the wireless coupler 672.

While the above is described in regards to a lift device 600 illustrated as a boom lift, it should be understood that the same description is applicable to other mobile working machines with rotating parts that need to be in electrically communication with another part of the machine. This may include rotating telehandlers, excavators, cranes, firefighting apparatuses, etc. Regardless of the specific application, the general principles apply. That is a pair of wireless couplers can be supplied, one on the rotating part and one on the stationary or non-rotating part. The wireless couplers are positioned such that their active surfaces face each other and the distance between the wireless couplers is sufficiently small to allow for efficient transfer of power and data. The wireless couplers are further positioned on the same axis coaxial with the axis of rotation of the rotating part, such that during rotation of the rotating part the wireless couplers maintain their positions relative to each other. Accordingly, the wireless couplers remain within the magnetic fields generated by the other and maintain the power and data connection during the rotation.

The width of the air gap can vary according to the requirements of the turntable bearing. In some embodiments, the width of the air gap is limited by the strength of the magnetic field generated by the wireless coupler 672, ensuring the magnetic field is strong enough to induce the corresponding power and data signals in the wireless coupler 674. In some embodiments, the air gap 676 is between 0-200 mm. For example, the air gap 676 may be between 0-10 mm. In general though, the size of the air gap is correlated to the strength of the wireless couplers 672, 674 to maximize the transmission efficiency, accordingly larger air gaps are also possible so long as the wireless couplers 672, 674 are able to transmit power and data successfully.

As depicted in FIG. 42, the wireless coupler 672 is located at or near the top surface 678 of the chassis 604 on or centered about an axis of rotation, shown as axis 668, and is connected to the battery 204 and controller 682. The wireless coupler 674 is located at or near the bottom surface 680 of the turntable 602 and also on or centered about the axis 668. In some examples, the wireless couplers 672, 674 are positioned behind the top surface 678 and the bottom surface 680, respectively, shielding them from debris, dust and water. In such embodiments, to facilitate efficient power and data transfer, the top surface 678 and the bottom surface 680, or in some examples just the portions of the top surface 678 and the bottom surface 680 directly in front of the wireless couplers 672, 674, are composed of non-metallic materials (e.g., plastic, wood, glass). It is a benefit of the above-described system that the wireless couplers 672, 674 can be shielded and still operate. Other connection methods such as being hardwired or using optical data transfer techniques require exposed surfaces that could be susceptible to damage and wear from the outside environment. A further benefit is the provision of both power and data via the same wireless couplers 672, 674 allows for simplified construction and arrangement, including for example the creation of a natural fail safe point that if cut can interrupt the operation the chassis 604 and/or turntable 602.

Referring still to FIG. 42, power from the battery 204 and data from the controller 682 are delivered to wireless coupler 672 which transmits the power and data via a magnetic field, shown as field 694, to the wireless coupler 674. The field 694 spans the air gap 676 between the top surface 678 of the chassis 604 and the bottom surface 680 of the turntable 602 and at least partially into the wireless coupler 674. The wireless coupler 674 being positioned along the axis 668 lies within the magnetic field generated by the wireless coupler 672. The magnetic field induces data and current signals within wireless coupler 674 which correspond to those received by the wireless coupler 672 and which can then be delivered throughout the turntable 602. In some examples, wireless power and data transfer between wireless couplers 672, 674 is bi-directional (e.g., full duplex transmission). For example, a user interface located on the platform assembly 666 may pass commands to the controller 682 via the wireless power and data connection 234 generated by the wireless couplers 672, 674, while corresponding commands to the turntable 602 can be delivered from the controller 682 to the turntable controller 684.

Although battery 204 is depicted in the chassis 604 of the lift device 600, in some embodiments the battery 204 can be positioned in the turntable 602, such that power can flow from battery 204 through wireless coupler 674, to wireless coupler 672 and into chassis 604. For example, power from the turntable 602 can be wirelessly transferred to the chassis 604 to power movement of the chassis. Further, in such a configuration the controller 682 and the controller 684 can perform the same and/or similar functions as described in relation to the other controller, respectively.

Although depicted as an induction coil 114, various other types of wireless charging mechanisms can be used. For example, magnetic resonance charging, electric field coupling, or radio receptioning can be used in lieu of electromagnetic induction. While operationally different, the structure for each different type of wireless charging mechanism described above can be considered encompassed within the term "induction coil."

Using the above described charging systems and methods, a jobsite can incorporate a wireless charging unit that can help to continuously charge lift devices and other equipment. The wireless platform can create a faster and more efficient way to charge devices remotely, which helps to ensure that devices at a jobsite are operable beyond the life of a single charge of a battery. While conventional equipment is typically only able to operate for as long as a single charge of a battery lasts, the charging system disclosed herein permits for extended use of equipment.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the wireless charging system as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A wireless charging system, comprising:
a platform having a substantially horizontal upper surface configured to support a vehicle;
an induction coil coupled to the platform, wherein the induction coil is configured to receive electrical energy from an energy source and generate a magnetic field above the substantially horizontal upper surface, the magnetic field being positioned to wirelessly transfer the electrical energy to the vehicle while the vehicle is positioned atop the platform;
a first ramp pivotally coupled to a first side of the platform and extending away from the platform;
a second ramp pivotally coupled to a second side of the platform opposite the first side;
an electrical cabinet coupled to the platform and containing at least one of (a) the energy source, (b) an inverter, or (c) a transformer;
wherein the platform is pivotally coupled to the electrical cabinet, and wherein the first ramp, the second ramp, and the platform are repositionable into a stowed configuration in which the electrical cabinet extends between the first ramp and the second ramp.

2. The wireless charging system of claim 1, wherein the energy source includes at least one of (a) a battery received within the electrical cabinet, (b) a utility source in electrical communication with the electrical cabinet, or (c) a generator received within the electrical cabinet.

3. The wireless charging system of claim 1, further comprising one or more lifting lugs extending upward from an upper surface of the electrical cabinet.

4. The wireless charging system of claim 1, further comprising a display configured to provide a graphical user interface including at least one of (a) a rate at which a battery of the vehicle is charging, (b) a state of charge of the battery of the vehicle, or (c) a status of the wireless charging system.

5. The wireless charging system of claim 1, further comprising a first guide rail and a second guide rail coupled to the platform and extending longitudinally along the substantially horizontal upper surface, wherein the first guide rail and the second guide rail extend above the substantially horizontal upper surface, and wherein the first guide rail is laterally offset from the second guide rail.

6. The wireless charging system of claim 5, wherein the induction coil is positioned laterally between the first guide rail and the second guide rail.

7. The wireless charging system of claim 6, further comprising a third guide rail extending longitudinally across the platform, wherein the third guide rail extends above the substantially horizontal upper surface, and wherein the third guide rail is laterally offset from the first guide rail and the second guide rail.

8. The wireless charging system of claim 7, further comprising a ramp coupled to a side of the platform and extending away from the platform, wherein each of the first guide rail, second guide rail, and third guide rail extend longitudinally along the ramp.

9. The wireless charging system of claim 1, further comprising a sensor coupled to the platform and configured to initiate generation of the magnetic field by the induction coil in response to detecting a presence of the vehicle on the platform.

10. The wireless charging system of claim 1, further comprising:
a visual indicator; and
a controller operatively coupled to the induction coil and the visual indicator and configured to control the visual indicator to provide a visual indication in response to initiation of the transfer of the electrical energy to the vehicle.

11. A wireless charging system, comprising:
an energy source including at least one of (a) a battery, (b) a utility source, or (c) a generator;
a lift device, comprising:
a chassis;
a tractive element coupled to the chassis;
a battery pack coupled to the chassis;
an actuator coupled to the chassis and operatively coupled to the battery pack; and
a first wireless charging interface operatively coupled to the battery pack;
a wireless charging unit, comprising:
a platform having a substantially horizontal upper surface;
a first ramp and a second ramp pivotally coupled to the platform;
an electrical cabinet pivotally coupled to the platform and containing at least one of (a) the energy source, (b) a connection to the energy source, (c) an inverter, or (d) a transformer;
a lifting lug coupled to the electrical cabinet;
a first guide rail and a second guide rail coupled to the platform, extending longitudinally along the substantially horizontal upper surface, and laterally offset from one another;
a second wireless charging interface removably coupled to the platform, wherein the second wireless charging interface is configured to wirelessly transfer energy from the energy source to the first wireless charging interface to charge the battery pack of the lift device;
a sensor coupled to the platform and configured to initiate the transfer of the energy by the second wireless charging interface in response to detecting a presence of the lift device on the platform;
a visual indicator coupled to the chassis; and
a controller operatively coupled to the second wireless charging interface and the visual indicator and configured to control the visual indicator to provide a visual indication in response to initiation of the transfer of the energy by the second wireless charging interface; and
a display configured to provide a graphical user interface including at least one of (a) a rate at which the battery pack of the lift device is charging or (b) a state of charge of the battery pack of the lift device.

12. A wireless charging system, comprising:
a platform having a substantially horizontal upper surface configured to support a vehicle;
an induction coil coupled to the platform, wherein the induction coil is configured to receive electrical energy from an energy source and generate a magnetic field above the substantially horizontal upper surface, the magnetic field being positioned to wirelessly transfer the electrical energy to the vehicle while the vehicle is positioned atop the platform;
a first ramp coupled to a first side of the platform and extending away from the platform;
a second ramp coupled to a second side of the platform opposite the first side;
an electrical cabinet pivotally coupled to the platform and containing at least one of (a) the energy source, (b) an inverter, or (c) a transformer; and
one or more lifting lugs extending upward from an upper surface of the electrical cabinet.

13. A wireless charging system, comprising:
a platform having a substantially horizontal upper surface configured to support a vehicle;
an induction coil coupled to the platform, wherein the induction coil is configured to receive electrical energy from an energy source and generate a magnetic field above the substantially horizontal upper surface, the magnetic field being positioned to wirelessly transfer the electrical energy to the vehicle while the vehicle is positioned atop the platform;
a first guide rail and a second guide rail coupled to the platform and extending longitudinally along the substantially horizontal upper surface, wherein the first guide rail and the second guide rail extend above the substantially horizontal upper surface, and wherein the first guide rail is laterally offset from the second guide rail; and
a ramp coupled to a side of the platform and rotatable between a stowed position where the ramp is positioned atop the platform and a deployed position where the ramp extends away from the platform, wherein the first guide rail and the second guide rail extend longitudinally along the ramp when the ramp is in the deployed position.

14. The wireless charging system of claim 13, wherein the induction coil is positioned laterally between the first guide rail and the second guide rail.

15. The wireless charging system of claim 14, further comprising a third guide rail extending longitudinally across the platform, wherein the third guide rail extends above the substantially horizontal upper surface, and wherein the third guide rail is laterally offset from the first guide rail and the second guide rail.

16. The wireless charging system of claim 15, wherein each of the first guide rail, second guide rail, and third guide rail extend longitudinally along the ramp when the ramp is in the deployed position.

* * * * *